United States Patent
Hwang et al.

(10) Patent No.: US 11,579,606 B2
(45) Date of Patent: Feb. 14, 2023

(54) USER EQUIPMENT, SYSTEM, AND CONTROL METHOD FOR CONTROLLING DRONE

(71) Applicant: LG ELECTRONICS INC., Seoul (KR)

(72) Inventors: Miran Hwang, Seoul (KR); Joyoung Lim, Seoul (KR); Kwangsik Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 253 days.

(21) Appl. No.: 16/993,816

(22) Filed: Aug. 14, 2020

(65) Prior Publication Data

US 2021/0191390 A1   Jun. 24, 2021

(30) Foreign Application Priority Data

Dec. 18, 2019 (KR) .......................... 10-2019-0169948

(51) Int. Cl.
*G05D 1/00*           (2006.01)
*H04N 5/232*          (2006.01)
(Continued)

(52) U.S. Cl.
CPC ......... *G05D 1/0022* (2013.01); *B64C 39/024* (2013.01); *B64D 47/08* (2013.01); *G01S 5/02216* (2020.05); *G05D 1/0038* (2013.01); *G05D 1/0094* (2013.01); *G05D 1/101* (2013.01); *G06N 20/00* (2019.01); *G08G 5/0034* (2013.01); *G08G 5/0069* (2013.01);
(Continued)

(58) Field of Classification Search
CPC .. G05D 1/0022; G05D 1/0038; G05D 1/0094; G05D 1/101; G05D 1/0016; G05D 1/0202; B64C 39/024; B64C 2201/027; B64C 2201/127; B64C 2201/14; B64C 2201/146; B64D 47/08; G01S 5/02216; G06N 20/00; G06N 3/08; G08G 5/0034; G08G 5/0069; G08G 5/0013; G08G 5/0052; G08G 5/0086; H04N 5/23296; H04N 7/185; H04N 5/23206; H04N 5/23219; H04N 5/23299; H04N 5/23216; H04W 4/40; H04W 4/023; G06V 20/17; G06T 7/11; G06T 7/62
USPC .......................................................... 701/2
See application file for complete search history.

(56) References Cited

U.S. PATENT DOCUMENTS

2015/0125028 A1* 5/2015 Liao ..................... G06V 10/987
                                                       382/103
2018/0184401 A1* 6/2018 Ghosh ................... H04W 72/04
(Continued)

FOREIGN PATENT DOCUMENTS

CN       108337544 A  *  2/2018
KR    2006-0010064 A  *  2/2006

*Primary Examiner* — Muhammad Shafi
(74) *Attorney, Agent, or Firm* — Birch, Stewart, Kolasch & Birch, LLP

(57) ABSTRACT

Provided is a user equipment for controlling a drone. The user equipment analyzes an original video to control the drone to photograph a reproduction video giving a feeling identical to or similar to the original video. An electronic device may be connected to an artificial intelligence module, a robot, an augmented reality (AR) device, a virtual reality (VR) device, a device related to 5G service, and the like.

18 Claims, 35 Drawing Sheets

(51) Int. Cl.
*H04W 4/40* (2018.01)
*G08G 5/00* (2006.01)
*G05D 1/10* (2006.01)
*B64C 39/02* (2023.01)
*B64D 47/08* (2006.01)
*G06N 20/00* (2019.01)
*G01S 5/02* (2010.01)
*H04N 7/18* (2006.01)

(52) U.S. Cl.
CPC ......... *H04N 5/23296* (2013.01); *H04N 7/185* (2013.01); *H04W 4/40* (2018.02); *B64C 2201/027* (2013.01); *B64C 2201/127* (2013.01); *B64C 2201/14* (2013.01)

(56) References Cited

U.S. PATENT DOCUMENTS

2019/0139422 A1* 5/2019 Cheah ................ G01C 21/1656
2019/0317531 A1* 10/2019 Tankersley ............ B64C 39/024

* cited by examiner

Model-A:Direct C2    Model-B:Indirect C2

USER EQUIPMENT, SYSTEM, AND CONTROL METHOD FOR CONTROLLING DRONE

CROSS-REFERENCE TO RELATED APPLICATION

This application claims the benefit of Korean Patent Application No. 10-2019-0169948 filed on Dec. 18, 2019, the entire disclosure of which are hereby incorporated by reference herein for all purposes.

BACKGROUND OF THE INVENTION

Field of the Disclosure

The present disclosure relates to a user equipment, a system and a control method for controlling a drone in order to photograph an image or a video.

Related Art

An unmanned air vehicle is a generic term for an airplane capable of flying and manipulating by induction of radio waves without a pilot, and a helicopter-shaped unmanned aerial vehicle/uninhabited aerial vehicle (UAV). Recently, the unmanned aerial vehicles have been increasingly used in various private and commercial fields such as video shooting, unmanned delivery service, and disaster monitoring in addition to military uses such as reconnaissance and attack.

Private and commercial unmanned aerial vehicles cannot help being limitedly operated due to insufficient regulations, certifications, and legal systems, and it is difficult for those who use unmanned aerial vehicles to realize the potential danger or the danger to the public. In particular, collision accidents, flying in a secure area, and invasion of privacy are increasing due to indiscriminate use of unmanned aerial vehicles.

Many countries are working to improve new regulations, standards, policies, and procedures related to an operation of unmanned aerial vehicles.

Recently, as images or videos are frequently photographed using an unmanned aerial vehicle, it is required to provide various image or video photographing modes to a user when photographing an image or video using the unmanned aerial vehicle.

In particular, as many videos imitating or reproducing an impressive scene in a movie are generated and shared on the web, recent users are demanding more drones capable of photographing reproduction images or videos giving a feeling identical to or similar to that of an original video.

SUMMARY OF THE DISCLOSURE

The present disclosure provides a user equipment, a system, and a method of controlling a drone that enable to photograph a reproduction image or video giving a feeling identical to or similar to an original video or video by controlling a drone.

In an aspect, a user equipment for controlling a drone includes a first wireless communication unit; and a processor configured to control the drone in data communication with the drone through the first wireless communication unit, wherein the processor is configured to analyze enlargement magnification and a view angle of a second camera used for photographing a first video, and a composition of a first subject included in the first video, when data on the first video are input to the user equipment, to provide a first camera control signal that controls the first camera in order to photograph a second subject with enlargement magnification, a view angle, and a composition identical to or similar to enlargement magnification, a view angle, and a composition used when the second camera photographs the first video, to provide a first drone control signal that moves the drone to a location in which the drone can photograph the second subject by the first camera control signal, and to transmit the first drone control signal and the first camera control signal to the drone through the first wireless communication unit.

The processor may split the first video into a plurality of first split videos in frames per second and calculate a first area ratio occupied by the first subject in each first split video.

The processor may split the second video into a plurality of second split videos into the frames per second to calculate a second area ratio occupied by the second subject for each second split video, and the second area ratio may be identical to or similar to the first area ratio.

The first drone control signal may include a location control signal that adjusts a location of the drone so that the drone is offset by a predetermined distance from the second subject, and the first camera control signal may include a photographing control signal that controls enlargement magnification, a view angle, depth, and illuminance of the first camera.

The processor may determine that zoom-in photographing has been performed on the first subject, when a change amount in the first area ratio is greater than or equal to a first criterion in a specific section of the first video, and determine that zoom-out photographing has been performed on the first subject, when a change amount in the first area ratio is less than or equal to a second criterion in a specific section of the first video.

The processor may provide a photographing control signal that zoom in or zoom out the first camera according to whether the zoom-in or zoom-out photographing is performed.

The processor may provide a location control signal that further adjusts a distance between the drone and the second subject in addition to the photographing control signal.

The processor may be configured to perform artificial intelligence (AI) learning, and to learn enlargement magnification, a view angle, a focal length, depth, and illuminance of the second camera used for photographing the first video, a type and composition of a first subject included in the first video, and overall hardware specifications of the drone and the first camera by AI to provide the first drone control signal and the first camera control signal.

The processor may calculate a second area ratio occupied by the second subject in a preview video for the second subject and provide a first camera control signal that controls enlargement magnification, a view angle, depth, and illuminance of the first camera based on the second area ratio and a first drone control signal that adjusts a location of the drone so that the drone is offset by a predetermined distance from the second subject.

The user equipment may further include a first memory configured to store information about the drone and data on the first video and the second video, wherein the information about the drone may include information about overall hardware specifications of the drone including a model name, a size, a distance between diagonal axes, a battery number and capacity, a weight, a maximum takeoff weight, a maximum payload, a hovering accuracy range, a maximum angular speed, a maximum pitch angle, a maximum ascending speed, a maximum descending speed, a maximum speed, a maximum practical ascending altitude limit, a maximum wind speed capable of resisting wind, a maximum flight time for each payload, a motor model name, a propeller model name, presence or absence of a landing gear, an operating temperature, a type and model name of a mounted sensor, a wireless signal reception distance, and a pixel, magnification, and a view angle of a mounted camera of the drone.

The user equipment may further include a first location data processor capable of processing data on a location thereof, a location of the second subject, and a location of the drone, wherein the processor may provide a second drone control signal that controls the drone to move to correspond to a movement direction and speed of the second subject when the second subject moves.

The first wireless communication unit may communicate with at least two access points located around the drone and the user equipment using an IEEE 802.11mc protocol, and provide location data of the user equipment and the drone by performing triangulation of the at least two access points with a round trip time (RTT) method.

The data on the first video may be stored in at least one of an external server, a web-based server, a cloud server, and storage of the user equipment.

In another aspect, a system for controlling a drone includes a drone in which a first camera is mounted; and a first user equipment capable of performing data communication with the drone and controlling a movement of the drone, wherein the first user equipment analyzes enlargement magnification and a view angle of a second camera used for production of the first video, and a composition of a first subject included in the first video, when data on a first video are input to the user equipment, provides a first camera control signal that controls the first camera to photograph a second subject with enlargement magnification, a view angle, and a composition of the second camera and to generate a second video, and provides a first drone control signal that controls a movement of the drone so that the drone is offset by a predetermined distance from the second subject.

The first user equipment may split the first video and the second video into a plurality of first split videos and second split videos, respectively, calculate a first area ratio occupied by the first subject for each first split video, and calculate a second area ratio occupied by the second subject for each second split video.

The first user equipment may transmit the first drone control signal and the first camera control signal to the drone to control a movement of the drone and photographing of the first camera.

The first user equipment may include an AI module capable of performing AI learning.

The drone may photograph while tracking the second subject.

The drone may recognize a face of the second subject.

The second subject may be at least one of a user, an object designated by the user, a plurality of objects including the user, and a plurality of objects excluding the user.

The first user equipment may determine that zoom-in photographing has been performed on the first subject, when a change amount in the first area ratio is greater than or equal to a first criterion in a specific section of the first video, and determine that zoom-out photographing has been performed on the first subject, when a change amount in the first area ratio is less than or equal to a second criterion in a specific section of the first video.

The first user equipment may provide a photographing control signal such that the first camera is zoomed in or out according to whether the zoom-in photographing or the zoom-out photographing has been performed.

The system may further include a second user equipment capable of performing data communication with each of the drone and the first user equipment, and the second user equipment may provide location data and exchange location data with the drone and the first user equipment.

The system may further include at least one access point that can be wirelessly connected to each of the drone and the first user equipment, wherein the drone, the first user equipment, and the access point may communicate with each other with an IEEE 802.11mc protocol.

The first user equipment may communicate with at least one of the drone and the access point using an IEEE 802.11mc protocol, and perform triangulation by a round trip time (RTT) method to generate and provide location data of the drone and the first user equipment.

The first user equipment may generate GPS coordinate correction data of the drone to transmit the GPS coordinate correction data to the drone, and the drone may generate GPS coordinate correction data of the first user equipment to transmit the GPS coordinate correction data to the first user equipment.

The system may include a server for storing data on the first video, and the server may include an external server, a web-based server, and a cloud server.

The first user equipment may detect a face from a video in which the drone photographs the second subject.

In another aspect, a method of controlling a drone includes downloading a first video to a user equipment; analyzing enlargement magnification, a view angle, depth, and illuminance of a second camera used for photographing the first video, and a composition of a first subject included in the first video; generating a first camera control signal that controls the first camera in order to photograph a second subject with enlargement magnification, a view angle, depth, and illuminance identical to or similar to enlargement magnification, a view angle, depth, and illuminance used when the second camera photographs the first video; generating a first drone control signal for moving the drone to a location capable of photographing the second subject by the first camera control signal; and transmitting the first drone control signal and the first camera control signal to the drone, wherein the first camera is a camera mounted in the drone.

The analyzing of enlargement magnification may include dividing the first video into a plurality of first split videos in frames per second; and calculating a first area ratio occupied by the first subject in each of the first split videos.

After the calculating of a first area ratio, the method may further include calculating a focal length, a view angle, enlargement magnification, depth, and illuminance required for the first camera by applying the first area ratio and calculating a distance in which the drone should be spaced apart from the second subject by applying the first area ratio.

The calculating of a distance may include comparing information about a hardware configuration of the first camera and information about a hardware configuration of the second camera, calculating a distance in which the first camera should be spaced apart from the second subject using the comparison result of the comparing of information about a hardware configuration, and generating a flying path of the drone based on a distance in which the first camera should be spaced apart from the second subject.

The calculating of a distance may further include receiving a zoom-in or zoom-out photographing request, determining the maximum zoom-in or zoom-out magnification performance of the first camera, and calculating a distance in which the drone should be spaced apart from the second subject in a state in which the maximum zoom-in or zoom-out magnification is applied to the first camera.

The calculating of a first area ratio may include determining that zoom-in photographing has been performed on the first subject, when a change amount in the first area ratio is greater than or equal to a first criterion in a specific section of the first video, and determining that zoom-out photographing has been performed on the first subject, when a change amount in the first area ratio is less than or equal to a second criterion in a specific section of the first video.

After the transmitting of the first drone control signal and the first camera control signal, the method may further include downloading a second video in which the second subject is photographed to the user equipment, dividing the second video into a plurality of second split videos in frames per second, calculating a second area ratio occupied by the second subject for each of the second split videos, and comparing the first area ratio and the second area ratio.

The comparing of the first area ratio and the second area ratio may include regenerating a first camera control signal, regenerating the first drone control signal, and retransmitting the first drone control signal and the first camera control signal to the drone, if a difference value between the first area ratio and the second area ratio is not included in a predetermined range.

Before the downloading of a first video, the method may further include searching for a history of a video viewed by the user, a video found by the user using the web, and a video found or viewed by the user through an SNS and recommending a candidate video of the first video to the user based on the history.

DESCRIPTION OF EXEMPLARY EMBODIMENTS

Figure 1:
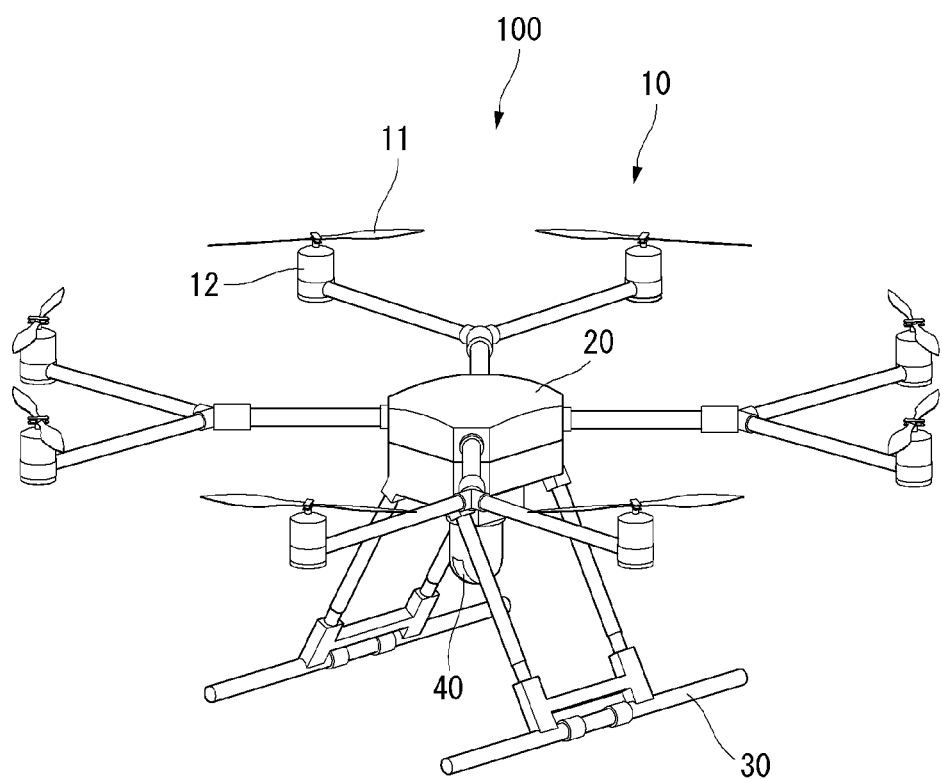
FIG. 1 shows a perspective view of an unmanned aerial vehicle according to an embodiment of the disclosure.

Hereinafter, embodiments disclosed in this disclosure are described in detail with reference to the accompanying drawings. The same or similar reference numerals are assigned to the same or similar elements regardless of their reference numerals, and redundant descriptions thereof are omitted.

When it is said that one element is "connected" or "coupled" to the other element, it should be understood that one element may be directly connected or coupled" to the other element, but a third element may exist between the two elements.

Furthermore, the accompanying drawings are merely intended to make easily understood the exemplary embodiments disclosed in this disclosure, and the technical spirit disclosed in this disclosure is not restricted by the accompanying drawings and includes all modifications, equivalents, and substitutions which fall within the spirit and technological scope of the disclosure.

Terms including ordinal numbers, such as the first and the second, may be used to describe various elements, but the elements are not restricted by the terms. The terms are used to only distinguish one element from the other element.

When it is said that one element is "connected" or "coupled" to the other element, it should be understood that one element may be directly connected or coupled" to the other element, but a third element may exist between the two elements. In contrast, when it is said that one element is "directly connected" or "directly coupled" to the other element, it should be understood that a third element does not exist between the two elements.

An expression of the singular number may include an expression of the plural number unless clearly defined otherwise in the context.

It is to be understood that in this application, a term, such as "include" or "have", is intended to designate that a characteristic, number, step, operation, element, part or a combination of them described in the disclosure is present, and does not exclude the presence or addition possibility of one or more other characteristics, numbers, steps, operations, elements, parts, or combinations of them in advance.

Hereinafter, preferred embodiments according to the disclosure are described in detail with reference to the accompanying drawings. The same reference numerals are assigned to the same or similar elements regardless of their reference numerals, and redundant descriptions thereof are omitted.

FIG. 1 shows a perspective view of an unmanned aerial robot according to an embodiment of the disclosure.

First, the unmanned aerial vehicle (or an unmanned aerial robot) 100 is manually manipulated by an administrator on the ground, or it flies in an unmanned manner while it is automatically piloted by a configured flight program. The unmanned aerial vehicle 100, as in FIG. 1, is configured with a main body 20, the horizontal and vertical movement propulsion device 10, and landing legs 130.

The main body 20 is a body portion on which a module, such as a task unit 40, is mounted.

The horizontal and vertical movement propulsion device 10 is configured with one or more propellers 11 positioned vertically to the main body 20. The horizontal and vertical movement propulsion device 10 according to an embodiment of the disclosure includes a plurality of propellers 11 and motors 12, which are spaced apart. In this case, the horizontal and vertical movement propulsion device 10 may have an air jet propeller structure not the propeller 11.

A plurality of propeller supports is radially formed in the main body 20. The motor 12 may be mounted on each of the propeller supports. The propeller 11 is mounted on each motor 12.

The horizontal and vertical movement propulsion device 10 is configured with one or more propellers 11 positioned vertically to the main body 20. The horizontal and vertical movement propulsion device 10 according to an embodiment of the disclosure includes a plurality of propellers 11 and motors 12, which are spaced apart. In this case, the horizontal and vertical movement propulsion device 10 may have an air jet propeller structure not the propeller 11.

A plurality of propeller supports is radially formed in the main body 20. The motor 12 may be mounted on each of the propeller supports. The propeller 11 is mounted on each motor 12.

The plurality of propellers 11 may be disposed symmetrically with respect to the main body 20. Furthermore, the rotation direction of the motor 12 may be determined so that the clockwise and counterclockwise rotation directions of the plurality of propellers 11 are combined. The rotation direction of one pair of the propellers 11 symmetrical with respect to the main body 20 may be configured identically (e.g., clockwise). Furthermore, the other pair of the propellers 11 may have a rotation direction opposite (e.g., counterclockwise) that of the one pair of the propellers 11.

The landing legs 30 are disposed with being spaced apart at the bottom of the main body 20. Furthermore, a buffering support member (not shown) for minimizing an impact attributable to a collision with the ground when the unmanned aerial vehicle 100 makes a landing may be mounted on the bottom of the landing leg 30. The unmanned aerial vehicle 100 may have various aerial vehicle structures different from that described above.

Figure 2:
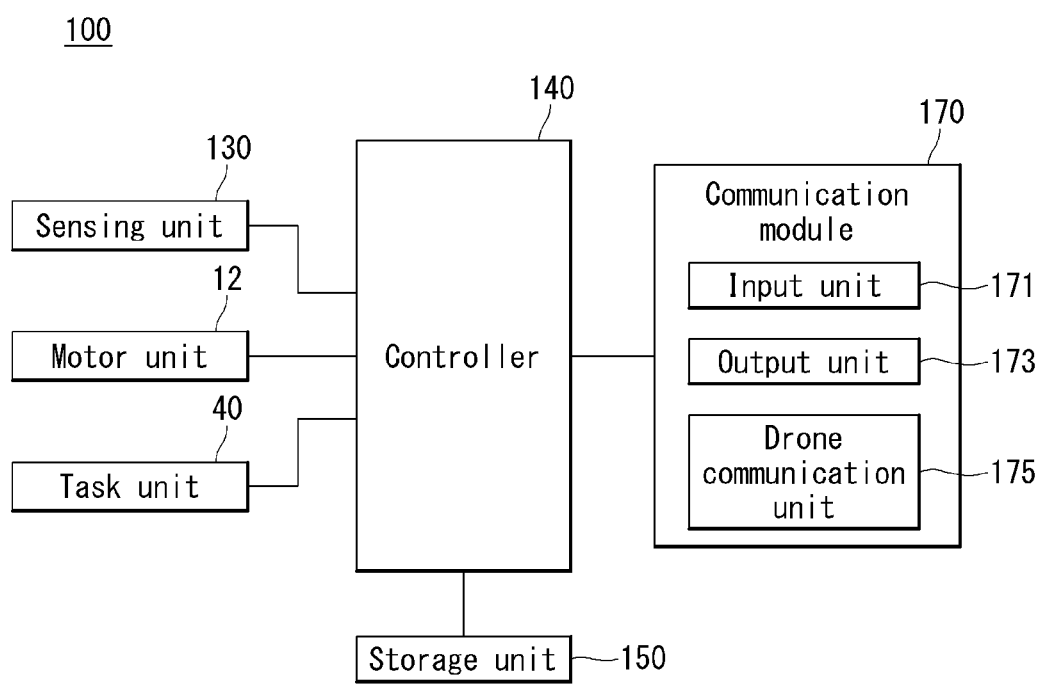
FIG. 2 is a block diagram showing a control relation between major elements of the unmanned aerial vehicle of FIG. 1.

FIG. 2 is a block diagram showing a control relation between major elements of the unmanned aerial vehicle of FIG. 1.

Referring to FIG. 2, the unmanned aerial vehicle 100 measures its own flight state using a variety of types of sensors in order to fly stably. The unmanned aerial vehicle 100 may include a sensing unit 130 including at least one sensor.

The flight state of the unmanned aerial vehicle 100 is defined as rotational states and translational states.

The rotational states mean "yaw", "pitch", and "roll." The translational states mean longitude, latitude, altitude, and velocity.

In this case, "roll", "pitch", and "yaw" are called Euler angle, and indicate that the x, y, z three axes of an aircraft body frame coordinate have been rotated with respect to a given specific coordinate, for example, three axes of NED coordinates N, E, D. If the front of an aircraft is rotated left and right on the basis of the z axis of a body frame coordinate, the x axis of the body frame coordinate has an angle difference with the N axis of the NED coordinate, and this angle is called "yaw" (Y). If the front of an aircraft is rotated up and down on the basis of the y axis toward the right, the z axis of the body frame coordinate has an angle difference with the D axis of the NED coordinates, and this angle is called a "pitch" ($\theta$). If the body frame of an aircraft is inclined left and right on the basis of the x axis toward the front, the y axis of the body frame coordinate has an angle to the E axis of the NED coordinates, and this angle is called "roll" ($\phi$).

The unmanned aerial vehicle 100 uses 3-axis gyroscopes, 3-axis accelerometers, and 3-axis magnetometers in order to measure the rotational states, and uses a GPS sensor and a barometric pressure sensor in order to measure the translational states.

The sensing unit 130 of the disclosure includes at least one of the gyroscopes, the accelerometers, the GPS sensor, the image sensor or the barometric pressure sensor. In this case, the gyroscopes and the accelerometers measure the states in which the body frame coordinates of the unmanned aerial vehicle 100 have been rotated and accelerated with respect to earth centered inertial coordinate. The gyroscopes and the accelerometers may be fabricated as a single chip called an inertial measurement unit (IMU) using a micro-electro-mechanical systems (MEMS) semiconductor process technology.

Furthermore, the IMU chip may include a microcontroller for converting measurement values based on the earth centered inertial coordinates, measured by the gyroscopes and the accelerometers, into local coordinates, for example, north-east-down (NED) coordinates used by GPSs.

The gyroscopes measure angular velocity at which the body frame coordinate x, y, z three axes of the unmanned aerial vehicle 100 rotate with respect to the earth centered inertial coordinates, calculate values (Wx.gyro, Wy.gyro, Wz.gyro) converted into fixed coordinates, and convert the values into Euler angles ($\phi$gyro, $\theta$gyro, $\psi$gyro) using a linear differential equation.

The accelerometers measure acceleration for the earth centered inertial coordinates of the body frame coordinate x, y, z three axes of the unmanned aerial vehicle 100, calculate values (fx,acc, fy,acc, fz,acc) converted into fixed coordinates, and convert the values into "roll ($\phi$acc)" and "pitch ($\theta$acc)." The values are used to remove a bias error included in "roll ($\phi$gyro)" and "pitch ($\theta$gyro)" using measurement values of the gyroscopes.

The magnetometers measure the direction of magnetic north points of the body frame coordinate x, y, z three axes of the unmanned aerial vehicle 100, and calculate a "yaw" value for the NED coordinates of body frame coordinates using the value.

The GPS sensor calculates the translational states of the unmanned aerial vehicle 100 on the NED coordinates, that is, a latitude (Pn.GPS), a longitude (Pe.GPS), an altitude (hMSL.GPS), velocity (Vn.GPS) on the latitude, velocity (Ve.GPS) on longitude, and velocity (Vd.GPS) on the altitude, using signals received from GPS satellites. In this case, the subscript MSL means a mean sea level (MSL).

The barometric pressure sensor may measure the altitude (hALP.baro) of the unmanned aerial vehicle 100. In this case, the subscript ALP means an air-level pressor. The barometric pressure sensor calculates a current altitude from a take-off point by comparing an air-level pressor when the unmanned aerial vehicle 100 takes off with an air-level pressor at a current flight altitude.

The camera sensor may include an image sensor (e.g., CMOS image sensor), including at least one optical lens and multiple photodiodes (e.g., pixels) on which an image is focused by light passing through the optical lens, and a digital signal processor (DSP) configuring an image based on signals output by the photodiodes. The DSP may generate a moving image including frames configured with a still image, in addition to a still image.

The unmanned aerial vehicle 100 includes a communication module 170 for inputting or receiving information or outputting or transmitting information. The communication module 170 may include a drone communication unit 175 for transmitting/receiving information to/from a different external device. The communication module 170 may include an input unit 171 for inputting information. The communication module 170 may include an output unit 173 for outputting information.

The output unit 173 may be omitted from the unmanned aerial vehicle 100, and may be formed in a terminal 300.

For example, the unmanned aerial vehicle 100 may directly receive information from the input unit 171. For another example, the unmanned aerial vehicle 100 may receive information, input to a separate terminal 300 or server 200, through the drone communication unit 175.

For example, the unmanned aerial vehicle 100 may directly output information to the output unit 173. For another example, the unmanned aerial vehicle 100 may transmit information to a separate terminal 300 through the drone communication unit 175 so that the terminal 300 outputs the information.

The drone communication unit 175 may be provided to communicate with an external server 200, an external terminal 300, etc. The drone communication unit 175 may receive information input from the terminal 300, such as a smartphone or a computer. The drone communication unit 175 may transmit information to be transmitted to the terminal 300. The terminal 300 may output information received from the drone communication unit 175.

The drone communication unit 175 may receive various command signals from the terminal 300 or/and the server 200. The drone communication unit 175 may receive area information for driving, a driving route, or a driving command from the terminal 300 or/and the server 200. In this case, the area information may include flight restriction area (A) information and approach restriction distance information.

The input unit 171 may receive On/Off or various commands. The input unit 171 may receive area information. The input unit 171 may receive object information. The input unit 171 may include various buttons or a touch pad or a microphone.

The output unit 173 may notify a user of various pieces of information. The output unit 173 may include a speaker and/or a display. The output unit 173 may output information on a discovery detected while driving. The output unit 173 may output identification information of a discovery. The output unit 173 may output location information of a discovery.

The unmanned aerial vehicle 100 includes a processor 140 for processing and determining various pieces of information, such as mapping and/or a current location. The processor 140 may control an overall operation of the unmanned aerial vehicle 100 through control of various elements that configure the unmanned aerial vehicle 100.

The processor 140 may receive information from the communication module 170 and process the information. The processor 140 may receive information from the input unit 171, and may process the information. The processor 140 may receive information from the drone communication unit 175, and may process the information.

The processor 140 may receive sensing information from the sensing unit 130, and may process the sensing information.

The processor 140 may control the driving of the motor 12. The processor 140 may control the operation of the task unit 40.

The unmanned aerial vehicle 100 includes a storage unit 150 for storing various data. The storage unit 150 records various pieces of information necessary for control of the unmanned aerial vehicle 100, and may include a volatile or non-volatile recording medium.

A map for a driving area may be stored in the storage unit 150. The map may have been input by the external terminal 300 capable of exchanging information with the unmanned aerial vehicle 100 through the drone communication unit 175, or may have been autonomously learnt and generated by the unmanned aerial vehicle 100. In the former case, the external terminal 300 may include a remote controller, a PDA, a laptop, a smartphone or a tablet on which an application for a map configuration has been mounted, for example.

Figure 3:
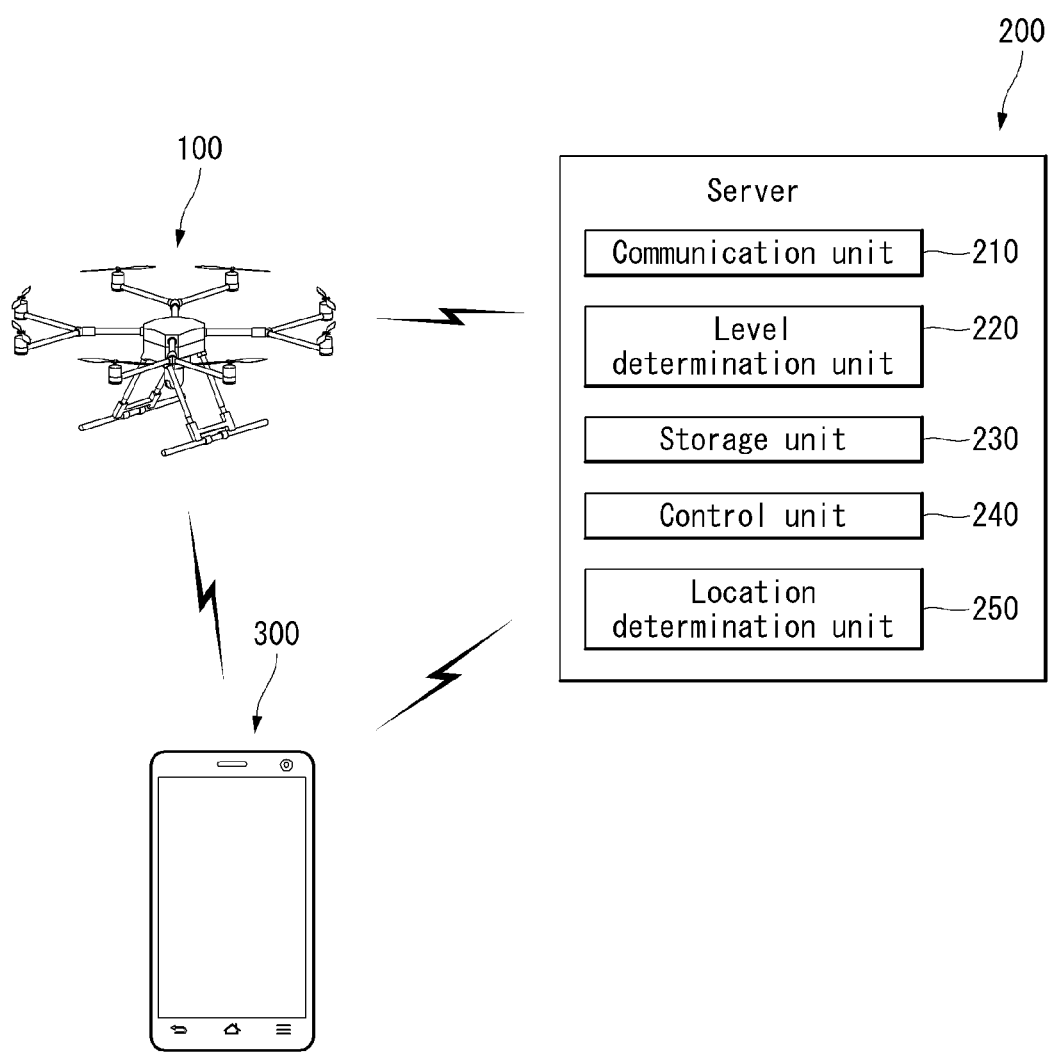
FIG. 3 is a block diagram showing a control relation between major elements of an unmanned aerial vehicle according to an embodiment of the disclosure.

FIG. 3 is a block diagram showing a control relation between major elements of an aerial control system according to an embodiment of the disclosure.

Referring to FIG. 3, the aerial control system according to an embodiment of the disclosure may include the unmanned aerial vehicle 100 and the server 200, or may include the unmanned aerial vehicle 100, the terminal 300, and the server 200. The unmanned aerial vehicle 100, the terminal 300, and the server 200 are interconnected using a wireless communication method.

Global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc. may be used as the wireless communication method.

A wireless Internet technology may be used as the wireless communication method. The wireless Internet technology includes a wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and 5G, for example. In particular, a faster response is possible by transmitting/ receiving data using a 5G communication network.

FIG. 3 is a block diagram illustrating a control relation between main components of a system for controlling a UAV according to an embodiment of the disclosure.

Referring to FIG. 3, according to an embodiment of the disclosure, a system for controlling a unmanned aerial vehicle (UAV) may include a UAV 100 and a server 200 or may include a UAV 100, a terminal 300, and a server 200. The UAV 100, the terminal 300, and the server 200 are connected with each other via a wireless communication method.

The wireless communication method may use, e.g., global system for mobile communication (GSM), code division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or LTE-advanced (LTE-A).

The wireless communication method may use wireless internet technology. The wireless Internet technology includes, e.g., WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), or 5G. In particular, responding may be performed more quickly by transmitting and receiving data using a 5G communication network.

As shown in FIG. 3, the server 200 may include a first communication unit 210, a level determination unit 220, a storage unit 230, a control unit 240, and a location determination unit 250.

The server communication unit 210 performs data communication that transmits and receives information to/from a drone communication unit 175 of the UAV 100, i.e., a drone 100.

The level determination unit 220 gathers and determines the altitude, orientation, and priority duty information for the UAV 100.

The server storage unit 230 records various pieces information necessary to control the UAV 100 and various pieces of information necessary to control the terminal 300 and to communicate with the terminal 300 and may include a volatile or non-volatile recording medium.

The control unit 240 generates direct control signals for the drone 100.

The location determination unit 250 may gather the location, speed, and corridor of the drone 100 and topography information for the area the corridor passes through and may grasp the location of the drone 100.

In this disclosure, a base station has a meaning as a terminal node of a network that directly performs communication with a terminal. In this disclosure, a specific operation illustrated as being performed by a base station may be performed by an upper node of the base station in some cases. That is, it is evident that in a network configured with a plurality of network nodes including a base station, various operations performed for communication with a terminal may be performed by the base station or different network nodes other than the base station. A "base station (BS)" may be substituted with a term, such as a fixed station, a Node B, an evolved-NodeB (eNB), a base transceiver system (BTS), an access point (AP), or a next generation NodeB (gNB). Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, downlink (DL) means communication from a base station to a terminal. Uplink (UL) means communication from a terminal to a base station. In the downlink, a transmitter may be part of a base station, and a receiver may be part of a terminal. In the uplink, a transmitter may be part of a terminal, and a receiver may be part of a base station.

Specific terms used in the following description have been provided to help understanding of the disclosure. The use of such a specific term may be changed into another form without departing from the technical spirit of the disclosure.

Embodiments of the disclosure may be supported by standard documents disclosed in at least one of IEEE 802, 3GPP and 3GPP2, that is, radio access systems. That is, steps or portions not described in order not to clearly disclose the technical spirit of the disclosure in the embodiments of the disclosure may be supported by the documents. Furthermore, all terms disclosed in this document may be described by the standard documents.

In order to clarity the description, 3GPP 5G is chiefly described, but the technical characteristic of the disclosure is not limited thereto.

UE and 5G Network Block Diagram Example

Figure 4:
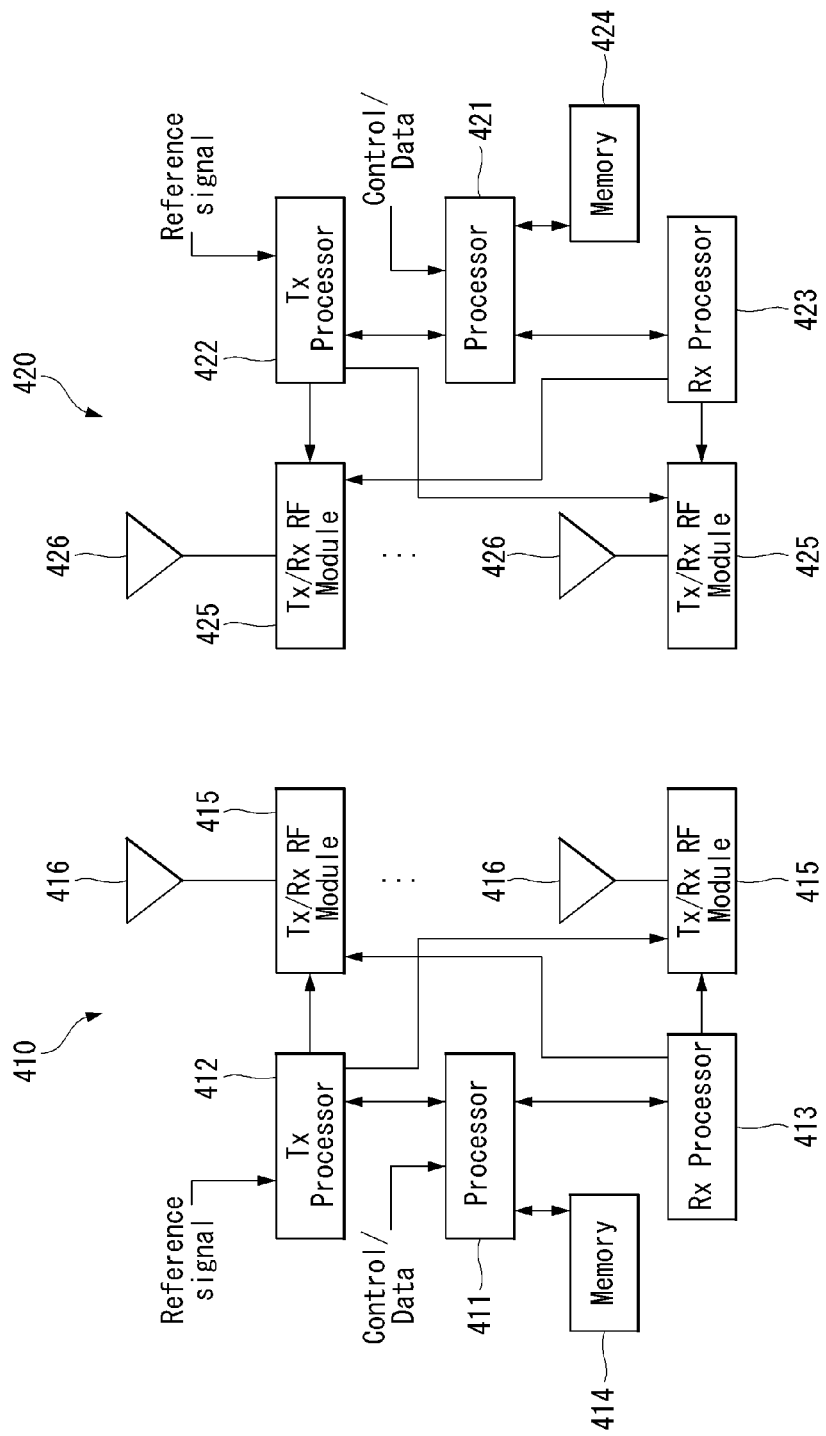
FIG. 4 illustrates a block diagram of a wireless communication system to which methods proposed in this disclosure may be applied.

FIG. 4 illustrates a block diagram of a wireless communication system to which methods proposed in this disclosure may be applied.

Referring to FIG. 4, a drone is defined as a first communication device (410 of FIG. 4). A processor 411 may perform a detailed operation of the drone.

The drone may be represented as an unmanned aerial vehicle or an unmanned aerial robot.

A 5G network communicating with a drone may be defined as a second communication device (420 of FIG. 4). A processor 421 may perform a detailed operation of the drone. In this case, the 5G network may include another drone communicating with the drone.

A 5G network may be represented as a first communication device, and a drone may be represented as a second communication device.

For example, the first communication device or the second communication device may be a base station, a network node, a transmission terminal, a reception terminal, a wireless apparatus, a wireless communication device or a drone.

For example, a terminal or a user equipment (UE) may include a drone, an unmanned aerial vehicle (UAV), a mobile phone, a smartphone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD). For example, the HMD may be a display device of a form, which is worn on the head. For example, the HMD may be used to implement VR, AR or MR. Referring to FIG. 4, the first communication device 410, the second communication device 420 includes a processor 411, 421, a memory 414, 424, one or more Tx/Rx radio frequency (RF) modules 415, 425, a Tx processor 412, 422, an Rx processor 413, 423, and an antenna 416, 426. The Tx/Rx module is also called a transceiver. Each Tx/Rx module 415 transmits a signal each antenna 426. The processor implements the above-described function, process and/or method. The processor 421 may be related to the memory 424 for storing a program code and data. The memory may be referred to as a computer-readable recording medium. More specifically, in the DL (communication from the first communication device to the second communication device), the transmission (TX) processor 412 implements various signal processing functions for the L1 layer (i.e., physical layer). The reception (RX) processor implements various signal processing functions for the L1 layer (i.e., physical layer).

UL (communication from the second communication device to the first communication device) is processed by the first communication device 410 using a method similar to that described in relation to a receiver function in the second communication device 420. Each Tx/Rx module 425 receives a signal through each antenna 426. Each Tx/Rx module provides an RF carrier and information to the RX processor 423. The processor 421 may be related to the memory 424 for storing a program code and data. The memory may be referred to as a computer-readable recording medium.

UE and 5G Network Block Diagram Example

FIG. 4 illustrates a block diagram of a wireless communication system to which methods proposed in this disclosure may be applied.

Referring to FIG. 4, a drone is defined as a first communication device (410 of FIG. 4). A processor 411 may perform a detailed operation of the drone.

The drone may be represented as an unmanned aerial vehicle or an unmanned aerial robot.

A 5G network communicating with a drone may be defined as a second communication device (420 of FIG. 4). A processor 421 may perform a detailed operation of the drone. In this case, the 5G network may include another drone communicating with the drone.

A 5G network may be represented as a first communication device, and a drone may be represented as a second communication device.

For example, the first communication device or the second communication device may be a base station, a network node, a transmission terminal, a reception terminal, a wireless apparatus, a wireless communication device or a drone.

For example, a terminal or a user equipment (UE) may include a drone, an unmanned aerial vehicle (UAV), a mobile phone, a smartphone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD). For example, the HMD may be a display device of a form, which is worn on the head. For example, the HMD may be used to implement VR, AR or MR. Referring to FIG. 4, the first communication device 410, the second communication device 420 includes a processor 411, 421, a memory 414, 424, one or more Tx/Rx radio frequency (RF) modules 415, 425, a Tx processor 412, 422, an Rx processor 413, 423, and an antenna 416, 426. The Tx/Rx module is also called a transceiver. Each Tx/Rx module 415 transmits a signal each antenna 426. The processor implements the above-described function, process and/or method. The processor 421 may be related to the memory 424 for storing a program code and data. The memory may be referred to as a computer-readable recording medium. More specifically, in the DL (communication from the first communication device to the second communication device), the transmission (TX) processor 412 implements various signal processing functions for the L1 layer (i.e., physical layer). The reception (RX) processor implements various signal processing functions for the L1 layer (i.e., physical layer).

UL (communication from the second communication device to the first communication device) is processed by the first communication device 410 using a method similar to that described in relation to a receiver function in the second communication device 420. Each Tx/Rx module 425 receives a signal through each antenna 426. Each Tx/Rx module provides an RF carrier and information to the RX processor 423. The processor 421 may be related to the memory 424 for storing a program code and data. The memory may be referred to as a computer-readable recording medium.

Signal Transmission/Reception Method in Wireless Communication System

Figure 5:
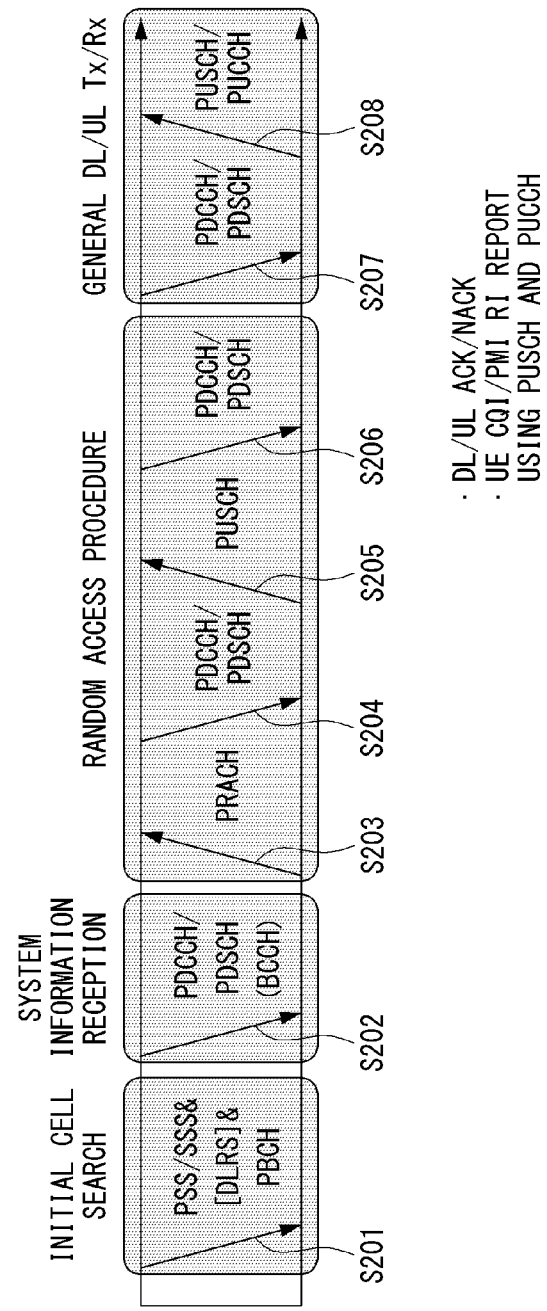
FIG. 5 is a diagram showing an example of a signal transmission/reception method in a wireless communication system.

FIG. 5 is a diagram showing an example of a signal transmission/reception method in a wireless communication system.

Referring to FIG. 5, when power of a UE is newly turned on or the UE newly enters a cell, the UE performs an initial cell search task, such as performing synchronization with a BS (S501). To this end, the UE may receive a primary synchronization channel (P-SCH) and a secondary synchronization channel (S-SCH) from the BS, may perform synchronization with the BS, and may obtain information, such as a cell ID. In the LTE system and NR system, the P-SCH and the S-SCH are called a primary synchronization signal (PSS) and a secondary synchronization signal (SSS), respectively. After the initial cell search, the UE may obtain broadcast information within the cell by receiving a physical broadcast channel PBCH) form the BS. Meanwhile, the UE may identify a DL channel state by receiving a downlink reference signal (DL RS) in the initial cell search step. After the initial cell search is terminated, the UE may obtain more detailed system information by receiving a physical downlink control channel (PDCCH) and a physical downlink shared channel (PDSCH) based on information carried on the PDCCH (S502).

Meanwhile, if the UE first accesses the BS or does not have a radio resource for signal transmission, the UE may perform a random access procedure (RACH) on the BS (steps S503 to step S506). To this end, the UE may transmit a specific sequence as a preamble through a physical random access channel (PRACH) (S503 and S505), and may receive a random access response (RAR) message for the preamble through a PDSCH corresponding to a PDCCH (S504 and S506). In the case of a contention-based RACH, a contention resolution procedure may be additionally performed.

The UE that has performed the procedure may perform PDCCH/PDSCH reception (S507) and physical uplink shared channel (PUSCH)/physical uplink control channel (PUCCH) transmission (S508) as common uplink/downlink signal transmission processes. In particular, the UE receives downlink control information (DCI) through the PDCCH. The UE monitors a set of PDCCH candidates in monitoring occasions configured in one or more control element sets (CORESETs) on a serving cell based on corresponding search space configurations. A set of PDCCH candidates to be monitored by the UE is defined in the plane of search space sets. The search space set may be a common search space set or a UE-specific search space set. The CORESET is configured with a set of (physical) resource blocks having time duration of 1-3 OFDM symbols. A network may be configured so that the UE has a plurality of CORESETs. The UE monitors PDCCH candidates within one or more search space sets. In this case, the monitoring means that the UE attempts decoding on a PDCCH candidate(s) within the search space. If the UE is successful in the decoding of one of the PDCCH candidates within the search space, the UE determines that it has detected a PDCCH in a corresponding PDCCH candidate, and performs PDSCH reception or PUSCH transmission based on DCI within the detected PDCCH. The PDCCH may be used to schedule DL transmissions on the PDSCH and UL transmissions on the PUSCH. In this case, the DCI on the PDCCH includes downlink assignment (i.e., downlink (DL) grant) related to a downlink shared channel and at least including a modulation and coding format and resource allocation information, or an uplink (DL) grant related to an uplink shared channel and including a modulation and coding format and resource allocation information.

An initial access (IA) procedure in a 5G communication system is additionally described with reference to FIG. 5.

A UE may perform cell search, system information acquisition, beam alignment for initial access, DL measurement, etc. based on an SSB. The SSB is interchangeably used with a synchronization signal/physical broadcast channel (SS/PBCH) block.

An SSB is configured with a PSS, an SSS and a PBCH. The SSB is configured with four contiguous OFDM symbols. A PSS, a PBCH, an SSS/PBCH or a PBCH is transmitted for each OFDM symbol. Each of the PSS and the SSS is configured with one OFDM symbol and 127 subcarriers. The PBCH is configured with three OFDM symbols and 576 subcarriers.

Cell search means a process of obtaining, by a UE, the time/frequency synchronization of a cell and detecting the cell identifier (ID) (e.g., physical layer cell ID (PCI)) of the cell. A PSS is used to detect a cell ID within a cell ID group. An SSS is used to detect a cell ID group. A PBCH is used for SSB (time) index detection and half-frame detection.

There are 336 cell ID groups. 3 cell IDs are present for each cell ID group. A total of 1008 cell IDs are present. Information on a cell ID group to which the cell ID of a cell belongs is provided/obtained through the SSS of the cell. Information on a cell ID among the 336 cells within the cell ID is provided/obtained through a PSS.

An SSB is periodically transmitted based on SSB periodicity. Upon performing initial cell search, SSB base periodicity assumed by a UE is defined as 20 ms. After cell access, SSB periodicity may be set as one of {5 ms, 10 ms, 20 ms, 40 ms, 80 ms, 160 ms} by a network (e.g., BS).

Next, system information (SI) acquisition is described.

SI is divided into a master information block (MIB) and a plurality of system information blocks (SIBs). SI other than the MIB may be called remaining minimum system information (RMSI). The MIB includes information/parameter for the monitoring of a PDCCH that schedules a PDSCH carrying SystemInformationBlockl (SIB1), and is transmitted by a BS through the PBCH of an SSB. SIB1 includes information related to the availability of the remaining SIBs (hereafter, SIBx, x is an integer of 2 or more) and scheduling (e.g., transmission periodicity, SI-window size). SIBx includes an SI message, and is transmitted through a PDSCH. Each SI message is transmitted within a periodically occurring time window (i.e., SI-window).

A random access (RA) process in a 5G communication system is additionally described with reference to FIG. 5.

A random access process is used for various purposes. For example, a random access process may be used for network initial access, handover, UE-triggered UL data transmission. A UE may obtain UL synchronization and an UL transmission resource through a random access process. The random access process is divided into a contention-based random access process and a contention-free random access process. A detailed procedure for the contention-based random access process is described below.

A UE may transmit a random access preamble through a PRACH as Msg1 of a random access process in the UL. Random access preamble sequences having two different lengths are supported. A long sequence length 839 is applied to subcarrier spacings of 1.25 and 5 kHz, and a short sequence length 139 is applied to subcarrier spacings of 15, 30, 60 and 120 kHz.

When a BS receives the random access preamble from the UE, the BS transmits a random access response (RAR) message (Msg2) to the UE. A PDCCH that schedules a PDSCH carrying an RAR is CRC masked with a random access (RA) radio network temporary identifier (RNTI) (RA-RNTI), and is transmitted. The UE that has detected the PDCCH masked with the RA-RNTI may receive the RAR from the PDSCH scheduled by DCI carried by the PDCCH. The UE identifies whether random access response information for the preamble transmitted by the UE, that is, Msg1, is present within the RAR. Whether random access information for Msg1 transmitted by the UE is present may be determined by determining whether a random access preamble ID for the preamble transmitted by the UE is present. If a response for Msg1 is not present, the UE may retransmit an RACH preamble within a given number, while performing power ramping. The UE calculates PRACH transmission power for the retransmission of the preamble based on the most recent pathloss and a power ramping counter.

The UE may transmit UL transmission as Msg3 of the random access process on an uplink shared channel based on random access response information. Msg3 may include an RRC connection request and a UE identity. As a response to the Msg3, a network may transmit Msg4, which may be treated as a contention resolution message on the DL. The UE may enter an RRC connected state by receiving the Msg4.

Beam Management (BM) Procedure of 5G Communication System

A BM process may be divided into (1) a DL BM process using an SSB or CSI-RS and (2) an UL BM process using a sounding reference signal (SRS). Furthermore, each BM process may include Tx beam sweeping for determining a Tx beam and Rx beam sweeping for determining an Rx beam.

A DL BM process using an SSB is described.

The configuration of beam reporting using an SSB is performed when a channel state information (CSI)/beam configuration is performed in RRC_CONNECTED.

A UE receives, from a BS, a CSI-ResourceConfig IE including CSI-SSB-ResourceSetList for SSB resources used for BM. RRC parameter csi-SSB-ResourceSetList indicates a list of SSB resources used for beam management and reporting in one resource set. In this case, the SSB resource set may be configured with {SSBx1, SSBx2, SSBx3, SSBx4, . . . }. SSB indices may be defined from 0 to 63.

The UE receives signals on the SSB resources from the BS based on the CSI-SSB-ResourceSetList.

If SSBRI and CSI-RS reportConfig related to the reporting of reference signal received power (RSRP) have been configured, the UE reports the best SSBRI and corresponding RSRP to the BS. For example, if reportQuantity of the CSI-RS reportConfig IE is configured as "ssb-Index-RSRP", the UE reports the best SSBRI and corresponding RSRP to the BS.

If a CSI-RS resource is configured in an OFDM symbol(s) identical with an SSB and "QCL-TypeD" is applicable, the UE may assume that the CSI-RS and the SSB have been quasi co-located (QCL) in the viewpoint of "QCL-TypeD." In this case, QCL-TypeD may mean that antenna ports have been QCLed in the viewpoint of a spatial Rx parameter. The UE may apply the same reception beam when it receives the signals of a plurality of DL antenna ports having a QCL-TypeD relation.

Next, a DL BM process using a CSI-RS is described.

An Rx beam determination (or refinement) process of a UE and a Tx beam sweeping process of a BS using a CSI-RS are sequentially described. In the Rx beam determination process of the UE, a parameter is repeatedly set as "ON." In the Tx beam sweeping process of the BS, a parameter is repeatedly set as "OFF."

First, the Rx beam determination process of a UE is described.

The UE receives an NZP CSI-RS resource set IE, including an RRC parameter regarding "repetition", from a BS through RRC signaling. In this case, the RRC parameter "repetition" has been set as "ON."

The UE repeatedly receives signals on a resource(s) within a CSI-RS resource set in which the RRC parameter "repetition" has been set as "ON" in different OFDM symbols through the same Tx beam (or DL spatial domain transmission filter) of the BS.

The UE determines its own Rx beam.

The UE omits CSI reporting. That is, if the RRC parameter "repetition" has been set as "ON", the UE may omit CSI reporting.

Next, the Tx beam determination process of a BS is described.

A UE receives an NZP CSI-RS resource set IE, including an RRC parameter regarding "repetition", from the BS through RRC signaling. In this case, the RRC parameter "repetition" has been set as "OFF", and is related to the Tx beam sweeping process of the BS.

The UE receives signals on resources within a CSI-RS resource set in which the RRC parameter "repetition" has been set as "OFF" through different Tx beams (DL spatial domain transmission filter) of the BS.

The UE selects (or determines) the best beam.

The UE reports, to the BS, the ID (e.g., CRI) of the selected beam and related quality information (e.g., RSRP). That is, the UE reports, to the BS, a CRI and corresponding RSRP, if a CSI-RS is transmitted for BM.

Next, an UL BM process using an SRS is described.

A UE receives, from a BS, RRC signaling (e.g., SRS-Config IE) including a use parameter configured (RRC parameter) as "beam management." The SRS-Config IE is used for an SRS transmission configuration. The SRS-Config IE includes a list of SRS-Resources and a list of SRS-ResourceSets. Each SRS resource set means a set of SRS-resources.

The UE determines Tx beamforming for an SRS resource to be transmitted based on SRS-SpatialRelation Info included in the SRS-Config IE. In this case, SRS-SpatialRelation Info is configured for each SRS resource, and indicates whether to apply the same beamforming as beamforming used in an SSB, CSI-RS or SRS for each SRS resource.

If SRS-SpatialRelationInfo is configured in the SRS resource, the same beamforming as beamforming used in the SSB, CSI-RS or SRS is applied, and transmission is performed. However, if SRS-SpatialRelationInfo is not configured in the SRS resource, the UE randomly determines Tx beamforming and transmits an SRS through the determined Tx beamforming.

Next, a beam failure recovery (BFR) process is described.

In a beamformed system, a radio link failure (RLF) frequently occurs due to the rotation, movement or beamforming blockage of a UE. Accordingly, in order to prevent an RLF from occurring frequently, BFR is supported in NR. BFR is similar to a radio link failure recovery process, and may be supported when a UE is aware of a new candidate beam(s). For beam failure detection, a BS configures beam failure detection reference signals in a UE. If the number of beam failure indications from the physical layer of the UE reaches a threshold set by RRC signaling within a period configured by the RRC signaling of the BS, the UE declares a beam failure. After a beam failure is detected, the UE triggers beam failure recovery by initiating a random access process on a PCell, selects a suitable beam, and performs beam failure recovery (if the BS has provided dedicated random access resources for certain beams, they are prioritized by the UE). When the random access procedure is completed, the beam failure recovery is considered to be completed.

Ultra-Reliable and Low Latency Communication (URLLC)

URLLC transmission defined in NR may mean transmission for (1) a relatively low traffic size, (2) a relatively low arrival rate, (3) extremely low latency requirement (e.g., 0.5, 1 ms), (4) relatively short transmission duration (e.g., 2 OFDM symbols), and (5) an urgent service/message. In the case of the UL, in order to satisfy more stringent latency requirements, transmission for a specific type of traffic (e.g., URLLC) needs to be multiplexed with another transmission (e.g., eMBB) that has been previously scheduled. As one scheme related to this, information indicating that a specific resource will be preempted is provided to a previously scheduled UE, and the URLLC UE uses the corresponding resource for UL transmission.

In the case of NR, dynamic resource sharing between eMBB and URLLC is supported. eMBB and URLLC services may be scheduled on non-overlapping time/frequency resources. URLLC transmission may occur in resources scheduled for ongoing eMBB traffic. An eMBB UE may not be aware of whether the PDSCH transmission of a corresponding UE has been partially punctured. The UE may not decode the PDSCH due to corrupted coded bits. NR provides a preemption indication by taking this into consideration. The preemption indication may also be denoted as an interrupted transmission indication.

In relation to a preemption indication, a UE receives a DownlinkPreemption IE through RRC signaling from a BS. When the UE is provided with the DownlinkPreemption IE, the UE is configured with an INT-RNTI provided by a parameter int-RNTI within a DownlinkPreemption IE for the monitoring of a PDCCH that conveys DCI format 2_1. The UE is configured with a set of serving cells by INT-ConfigurationPerServing Cell, including a set of serving cell indices additionally provided by servingCellID, and a corresponding set of locations for fields within DCI format 2_1 by positionInDCI, configured with an information payload size for DCI format 2_1 by dci-PayloadSize, and configured with the indication granularity of time-frequency resources by timeFrequency Sect.

The UE receives DCI format 2_1 from the BS based on the DownlinkPreemption IE.

When the UE detects DCI format 2_1 for a serving cell within a configured set of serving cells, the UE may assume that there is no transmission to the UE within PRBs and symbols indicated by the DCI format 2_1, among a set of the (last) monitoring period of a monitoring period and a set of symbols to which the DCI format 2_1 belongs. For example, the UE assumes that a signal within a time-frequency resource indicated by preemption is not DL transmission scheduled therefor, and decodes data based on signals reported in the remaining resource region.

Massive MTC (mMTC)

Massive machine type communication (mMTC) is one of 5G scenarios for supporting super connection service for simultaneous communication with many UEs. In this environment, a UE intermittently performs communication at a very low transmission speed and mobility. Accordingly, mMTC has a major object regarding how long will be a UE driven how low the cost is. In relation to the mMTC technology, in 3GPP, MTC and NarrowBand (NB)-IoT are handled.

The mMTC technology has characteristics, such as repetition transmission, frequency hopping, retuning, and a guard period for a PDCCH, a PUCCH, a physical downlink shared channel (PDSCH), and a PUSCH.

That is, a PUSCH (or PUCCH (in particular, long PUCCH) or PRACH) including specific information and a PDSCH (or PDCCH) including a response for specific information are repeatedly transmitted. The repetition transmission is performed through frequency hopping. For the repetition transmission, (RF) retuning is performed in a guard period from a first frequency resource to a second frequency resource. Specific information and a response for the specific information may be transmitted/received through a narrowband (e.g., 6 RB (resource block) or 1 RB).

Robot Basic Operation Using 5G Communication

Figure 6:
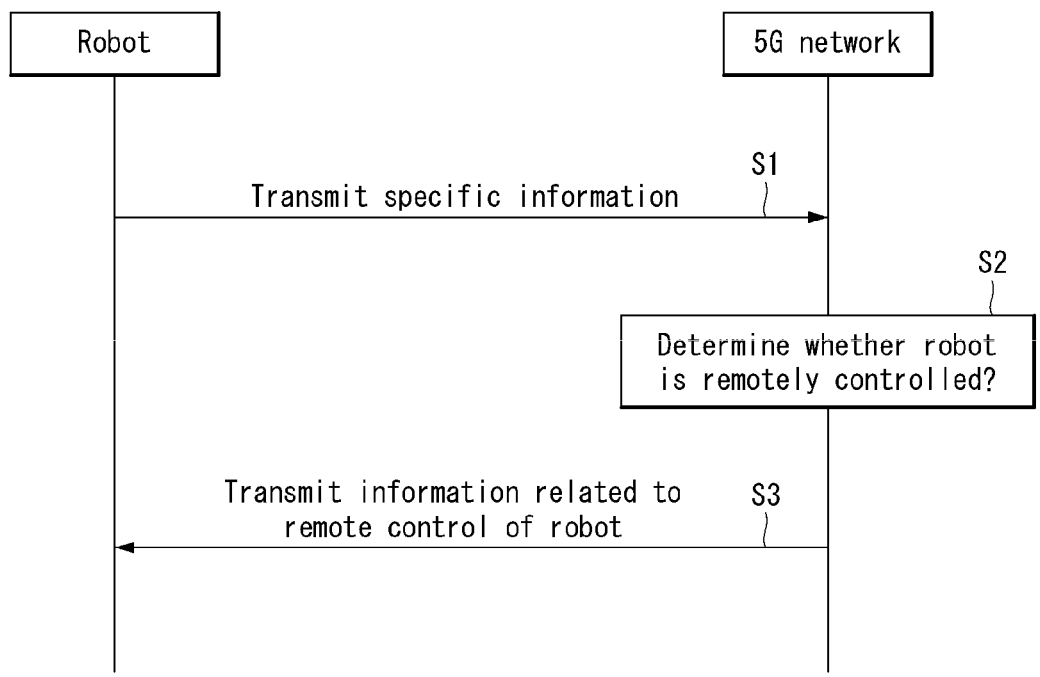
FIG. 6 shows an example of a basic operation of the robot and a 5G network in a 5G communication system.

FIG. 6 shows an example of a basic operation of the robot and a 5G network in a 5G communication system.

A robot transmits specific information transmission to a 5G network (S1). Furthermore, the 5G network may determine whether the robot is remotely controlled (S2). In this case, the 5G network may include a server or module for performing robot-related remote control.

Furthermore, the 5G network may transmit, to the robot, information (or signal) related to the remote control of the robot (S3).

Application Operation Between Robot and 5G Network in 5G Communication System

Hereafter, a robot operation using 5G communication is described more specifically with reference to FIGS. 1 to 6 and the above-described wireless communication technology (BM procedure, URLLC, mMTC).

First, a basic procedure of a method to be proposed later in the disclosure and an application operation to which the eMBB technology of 5G communication is applied is described.

As in steps S1 and S3 of FIG. 3, in order for a robot to transmit/receive a signal, information, etc. to/from a 5G network, the robot performs an initial access procedure and a random access procedure along with a 5G network prior to step S1 of FIG. 3.

More specifically, in order to obtain DL synchronization and system information, the robot performs an initial access procedure along with the 5G network based on an SSB. In the initial access procedure, a beam management (BM) process and a beam failure recovery process may be added. In a process for the robot to receive a signal from the 5G network, a quasi-co location (QCL) relation may be added.

Furthermore, the robot performs a random access procedure along with the 5G network for UL synchronization acquisition and/or UL transmission. Furthermore, the 5G network may transmit an UL grant for scheduling the transmission of specific information to the robot. Accordingly, the robot transmits specific information to the 5G network based on the UL grant. Furthermore, the 5G network transmits, to the robot, a DL grant for scheduling the transmission of a 5G processing result for the specific information. Accordingly, the 5G network may transmit, to the robot, information (or signal) related to remote control based on the DL grant.

A basic procedure of a method to be proposed later in the disclosure and an application operation to which the URLLC technology of 5G communication is applied is described below.

As described above, after a robot performs an initial access procedure and/or a random access procedure along with a 5G network, the robot may receive a DownlinkPre-emption IE from the 5G network. Furthermore, the robot receives, from the 5G network, DCI format 2_1 including pre-emption indication based on the DownlinkPreemption IE. Furthermore, the robot does not perform (or expect or assume) the reception of eMBB data in a resource (PRB and/or OFDM symbol) indicated by the pre-emption indication. Thereafter, if the robot needs to transmit specific information, it may receive an UL grant from the 5G network.

A basic procedure of a method to be proposed later in the disclosure and an application operation to which the mMTC technology of 5G communication is applied is described below.

A portion made different due to the application of the mMTC technology among the steps of FIG. 6 is chiefly described.

In step S1 of FIG. 6, the robot receives an UL grant from the 5G network in order to transmit specific information to the 5G network. In this case, the UL grant includes information on the repetition number of transmission of the specific information. The specific information may be repeatedly transmitted based on the information on the repetition number. That is, the robot transmits specific information to the 5G network based on the UL grant. Furthermore, the repetition transmission of the specific information may be performed through frequency hopping. The transmission of first specific information may be performed in a first frequency resource, and the transmission of second specific information may be performed in a second frequency resource. The specific information may be transmitted through the narrowband of 6 resource blocks (RBs) or 1 RB.

Operation Between Robots Using 5G Communication

Figure 7:
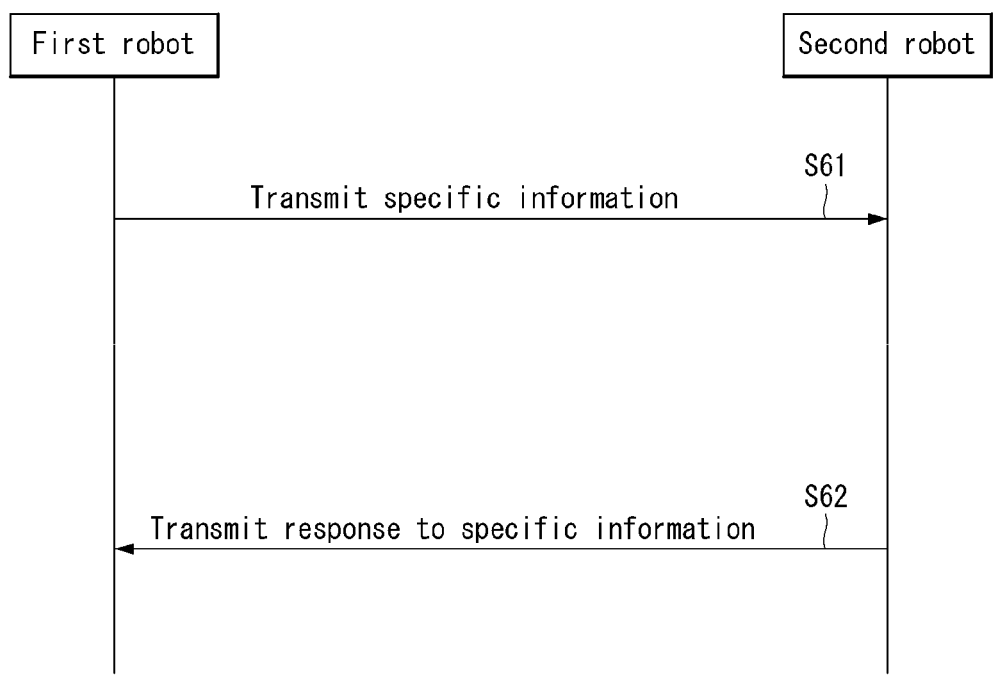
FIG. 7 illustrates an example of a basic operation between robots using 5G communication.

FIG. 7 illustrates an example of a basic operation between robots using 5G communication.

A first robot transmits specific information to a second robot (S61). The second robot transmits, to the first robot, a response to the specific information (S62).

Meanwhile, the configuration of an application operation between robots may be different depending on whether a 5G network is involved directly (sidelink communication transmission mode 3) or indirectly (sidelink communication transmission mode 4) in the specific information, the resource allocation of a response to the specific information.

An application operation between robots using 5G communication is described below.

First, a method for a 5G network to be directly involved in the resource allocation of signal transmission/reception between robots is described.

The 5G network may transmit a DCI format 5A to a first robot for the scheduling of mode 3 transmission (PSCCH and/or PSSCH transmission). In this case, the physical sidelink control channel (PSCCH) is a 5G physical channel for the scheduling of specific information transmission, and the physical sidelink shared channel (PSSCH) is a 5G physical channel for transmitting the specific information. Furthermore, the first robot transmits, to a second robot, an SCI format 1 for the scheduling of specific information transmission on a PSCCH. Furthermore, the first robot transmits specific information to the second robot on the PSSCH.

A method for a 5G network to be indirectly involved in the resource allocation of signal transmission/reception is described below.

A first robot senses a resource for mode 4 transmission in a first window. Furthermore, the first robot selects a resource for mode 4 transmission in a second window based on a result of the sensing. In this case, the first window means a sensing window, and the second window means a selection window. The first robot transmits, to the second robot, an SCI format 1 for the scheduling of specific information transmission on a PSCCH based on the selected resource. Furthermore, the first robot transmits specific information to the second robot on a PSSCH.

The above-described structural characteristic of the drone, the 5G communication technology, etc. may be combined with methods to be described, proposed in embodiments of the disclosure, and may be applied or may be supplemented to materialize or clarify the technical characteristics of methods proposed in embodiments of the disclosure.

Drone

Unmanned aerial system: a combination of a UAV and a UAV controller

Unmanned aerial vehicle: an aircraft that is remotely piloted without a human pilot, and it may be represented as an unmanned aerial robot, a drone, or simply a robot.

UAV controller: device used to control a UAV remotely

ATC: Air Traffic Control

NLOS: Non-line-of-sight

UAS: Unmanned Aerial System

UAV: Unmanned Aerial Vehicle

UCAS: Unmanned Aerial Vehicle Collision Avoidance System

UTM: Unmanned Aerial Vehicle Traffic Management

C2: Command and Control

Figure 8:
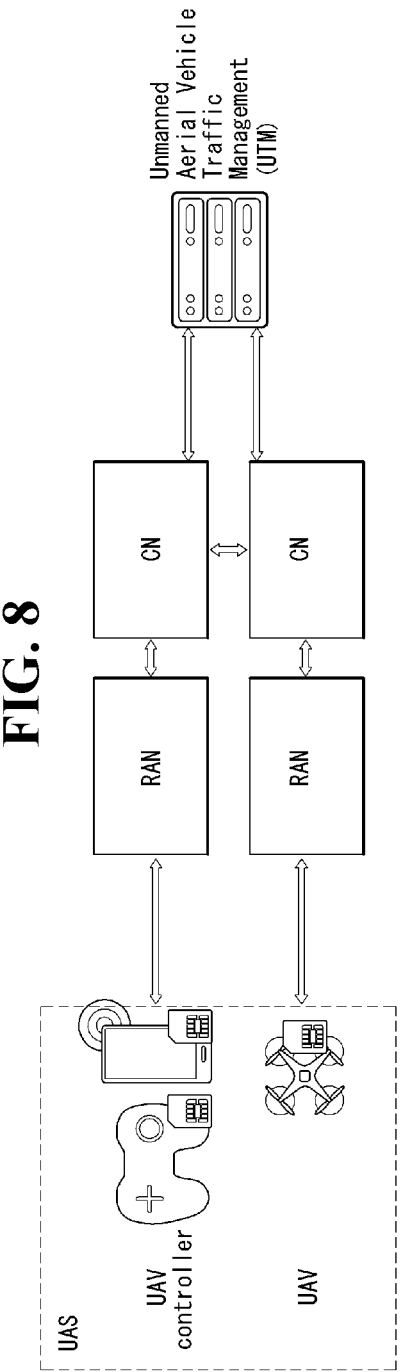
FIG. 8 is a diagram showing an example of the concept diagram of a 3GPP system including a UAS.

FIG. 8 is a diagram showing an example of the concept diagram of a 3GPP system including a UAS.

An unmanned aerial system (UAS) is a combination of an unmanned aerial vehicle (UAV), sometimes called a drone, and a UAV controller. The UAV is an aircraft not including a human pilot device. Instead, the UAV is controlled by a terrestrial operator through a UAV controller, and may have autonomous flight capabilities. A communication system between the UAV and the UAV controller is provided by the 3GPP system. In terms of the size and weight, the range of the UAV is various from a small and light aircraft that is frequently used for recreation purposes to a large and heavy aircraft that may be more suitable for commercial purposes. Regulation requirements are different depending on the range and are different depending on the area.

Communication requirements for a UAS include data uplink and downlink to/from a UAS component for both a serving 3GPP network and a network server, in addition to a command and control (C2) between a UAV and a UAV controller. Unmanned aerial system traffic management (UTM) is used to provide UAS identification, tracking, authorization, enhancement and the regulation of UAS operations and to store data necessary for a UAS for an operation. Furthermore, the UTM enables a certified user (e.g., air traffic control, public safety agency) to query an identity (ID), the meta data of a UAV, and the controller of the UAV.

The 3GPP system enables UTM to connect a UAV and a UAV controller so that the UAV and the UAV controller are identified as a UAS. The 3GPP system enables the UAS to transmit, to the UTM, UAV data that may include the following control information.

Control information: a unique identity (this may be a 3GPP identity), UE capability, manufacturer and model, serial number, take-off weight, location, owner identity, owner address, owner contact point detailed information, owner certification, take-off location, mission type, route data, an operating status of a UAV.

The 3GPP system enables a UAS to transmit UAV controller data to UTM. Furthermore, the UAV controller data may include a unique ID (this may be a 3GPP ID), the UE function, location, owner ID, owner address, owner contact point detailed information, owner certification, UAV operator identity confirmation, UAV operator license, UAV operator certification, UAV pilot identity, UAV pilot license, UAV pilot certification and flight plan of a UAV controller.

The functions of a 3GPP system related to a UAS may be summarized as follows.

- A 3GPP system enables the UAS to transmit different UAS data to UTM based on different certification and an authority level applied to the UAS.
- A 3GPP system supports a function of expanding UAS data transmitted to UTM along with future UTM and the evolution of a support application.
- A 3GPP system enables the UAS to transmit an identifier, such as international mobile equipment identity (IMEI), a mobile station international subscriber directory number (MSISDN) or an international mobile subscriber identity (IMSI) or IP address, to UTM based on regulations and security protection.
- A 3GPP system enables the UE of a UAS to transmit an identity, such as an IMEI, MSISDN or IMSI or IP address, to UTM.
- A 3GPP system enables a mobile network operator (MNO) to supplement data transmitted to UTM, along with network-based location information of a UAV and a UAV controller.
- A 3GPP system enables MNO to be notified of a result of permission so that UTM operates.
- A 3GPP system enables MNO to permit a UAS certification request only when proper subscription information is present.
- A 3GPP system provides the ID(s) of a UAS to UTM.
- A 3GPP system enables a UAS to update UTM with live location information of a UAV and a UAV controller.
- A 3GPP system provides UTM with supplement location information of a UAV and a UAV controller.
- A 3GPP system supports UAVs, and corresponding UAV controllers are connected to other PLMNs at the same time.
- A 3GPP system provides a function for enabling the corresponding system to obtain UAS information on the support of a 3GPP communication capability designed for a UAS operation.
- A 3GPP system supports UAS identification and subscription data capable of distinguishing between a UAS having a UAS capable UE and a USA having a non-UAS capable UE.
- A 3GPP system supports detection, identification, and the reporting of a problematic UAV(s) and UAV controller to UTM.

In the service requirement of Rel-16 ID_UAS, the UAS is driven by a human operator using a UAV controller in order to control paired UAVs. Both the UAVs and the UAV controller are connected using two individual connections over a 3GPP network for a command and control (C2) communication. The first contents to be taken into consideration with respect to a UAS operation include a mid-air collision danger with another UAV, a UAV control failure danger, an intended UAV misuse danger and various dangers of a user (e.g., business in which the air is shared, leisure activities). Accordingly, in order to avoid a danger in safety, if a 5G network is considered as a transmission network, it is important to provide a UAS service by QoS guarantee for C2 communication.

Figure 9:
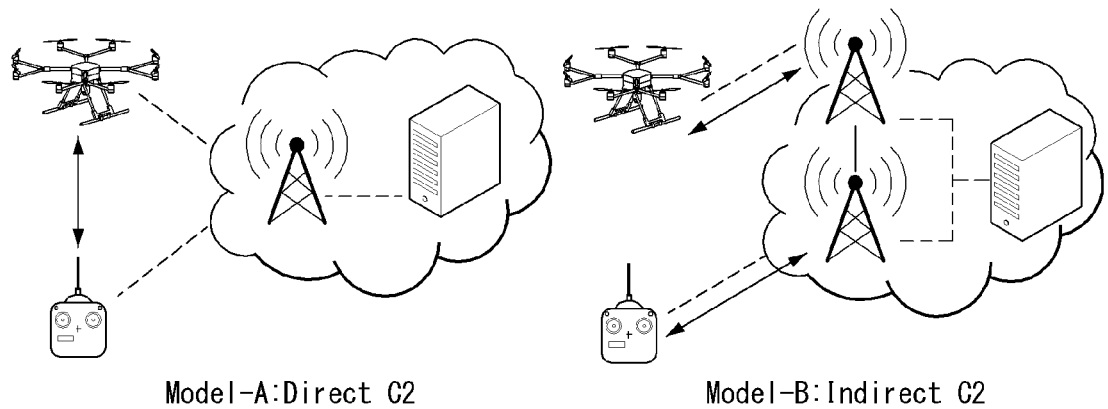
FIG. 9 shows examples of a C2 communication model for a UAV.

FIG. 9 shows examples of a C2 communication model for a UAV.

Model—A is direct C2. A UAV controller and a UAV directly configure a C2 link (or C2 communication) in order to communicate with each other, and are registered with a 5G network using a wireless resource that is provided, configured and scheduled by the 5G network, for direct C2 communication. Model—B is indirect C2. A UAV controller and a UAV establish and register respective unicast C2 communication links for a 5G network, and communicate with each other over the 5G network. Furthermore, the UAV controller and the UAV may be registered with the 5G network through different NG-RAN nodes. The 5G network supports a mechanism for processing the stable routing of C2 communication in any cases. A command and control use C2 communication for forwarding from the UAV controller/UTM to the UAV. C2 communication of this type (model-B) includes two different lower classes for incorporating a different distance between the UAV and the UAV controller/UTM, including a line of sight (VLOS) and a non-line of sight (non-VLOS). Latency of this VLOS traffic type needs to take into consideration a command delivery time, a human response time, and an assistant medium, for example, video streaming, the indication of a transmission waiting time. Accordingly, sustainable latency of the VLOS is shorter than that of the Non-VLOS. A 5G network configures each session for a UAV and a UAV controller. This session communicates with UTM, and may be used for default C2 communication with a UAS.

As part of a registration procedure or service request procedure, a UAV and a UAV controller request a UAS operation from UTM, and provide a pre-defined service class or requested UAS service (e.g., navigational assistance service, weather), identified by an application ID(s), to the UTM. The UTM permits the UAS operation for the UAV and the UAV controller, provides an assigned UAS service, and allocates a temporary UAS-ID to the UAS. The UTM provides a 5G network with information necessary for the C2 communication of the UAS. For example, the information may include a service class, the traffic type of UAS service, requested QoS of the permitted UAS service, and the subscription of the UAS service. When a request to establish C2 communication with the 5G network is made, the UAV and the UAV controller indicate a preferred C2 communication model (e.g., model-B) along with the UAS-ID allocated to the 5G network. If an additional C2 communication connection is to be generated or the configuration of the existing data connection for C2 needs to be changed, the 5G network modifies or allocates one or more QoS flows for C2 communication traffic based on requested QoS and priority in the approved UAS service information and C2 communication of the UAS.

UAV Traffic Management (1) Centralized UAV Traffic Management

A 3GPP system provides a mechanism that enables UTM to provide a UAV with route data along with flight permission. The 3GPP system forwards, to a UAS, route modification information received from the UTM with latency of less than 500 ms. The 3GPP system needs to forward notification, received from the UTM, to a UAV controller having a waiting time of less than 500 ms.

(2) De-Centralized UAV Traffic Management

A 3GPP system broadcasts the following data (e.g., if it is requested based on another regulation requirement, UAV identities, UAV type, a current location and time, flight route information, current velocity, operation state) so that a UAV identifies a UAV(s) in a short-distance area for collision avoidance.

A 3GPP system supports a UAV in order to transmit a message through a network connection for identification between different UAVs. The UAV preserves owner's personal information of a UAV, UAV pilot and UAV operator in the broadcasting of identity information.

A 3GPP system enables a UAV to receive local broadcasting communication transmission service from another UAV in a short distance.

A UAV may use direct UAV versus UAV local broadcast communication transmission service in or out of coverage of a 3GPP network, and may use the direct UAV versus UAV local broadcast communication transmission service if transmission/reception UAVs are served by the same or different PLMNs.

A 3GPP system supports the direct UAV versus UAV local broadcast communication transmission service at a relative velocity of a maximum of 320 kmph. The 3GPP system supports the direct UAV versus UAV local broadcast communication transmission service having various types of message payload of 50-1500 bytes other than security-related message elements.

A 3GPP system supports the direct UAV versus UAV local broadcast communication transmission service capable of guaranteeing separation between UAVs. In this case, the UAVs may be considered to have been separated if they are in a horizontal distance of at least 50 m or a vertical distance of 30 m or both. The 3GPP system supports the direct UAV versus UAV local broadcast communication transmission service that supports the range of a maximum of 600 m.

A 3GPP system supports the direct UAV versus UAV local broadcast communication transmission service capable of transmitting a message with frequency of at least 10 message per second, and supports the direct UAV versus UAV local broadcast communication transmission service capable of transmitting a message whose inter-terminal waiting time is a maximum of 100 ms.

A UAV may broadcast its own identity locally at least once per second, and may locally broadcast its own identity up to a 500 m range.

Security

A 3GPP system protects data transmission between a UAS and UTM. The 3GPP system provides protection against the spoofing attack of a UAS ID. The 3GPP system permits the non-repudiation of data, transmitted between the UAS and the UTM, in the application layer. The 3GPP system supports the integrity of a different level and the capability capable of providing a personal information protection function with respect to a different connection between the UAS and the UTM, in addition to data transmitted through a UAS and UTM connection. The 3GPP system supports the classified protection of an identity and personal identification information related to the UAS. The 3GPP system supports regulation requirements (e.g., lawful intercept) for UAS traffic.

When a UAS requests the authority capable of accessing UAS data service from an MNO, the MNO performs secondary check (after initial mutual certification or simultaneously with it) in order to establish UAS qualification verification to operate. The MNO is responsible for transmitting and potentially adding additional data to the request so that the UAS operates as unmanned aerial system traffic management (UTM). In this case, the UTM is a 3GPP entity. The UTM is responsible for the approval of the UAS that operates and identifies the qualification verification of the UAS and the UAV operator. One option is that the UTM is managed by an aerial traffic control center. The aerial traffic control center stores all data related to the UAV, the UAV controller, and live location. When the UAS fails in any part of the check, the MNO may reject service for the UAS and thus may reject operation permission.

3GPP Support for Aerial UE (or Drone) Communication

An E-UTRAN-based mechanism that provides an LTE connection to a UE capable of aerial communication is supported through the following functions.

Subscription-based aerial UE identification and authorization defined in Section TS 23.401, 4.3.31.

Height reporting based on an event in which the altitude of a UE exceeds a reference altitude threshold configured with a network.

Interference detection based on measurement reporting triggered when the number of configured cells (i.e., greater than 1) satisfies a triggering criterion at the same time.

Signaling of flight route information from a UE to an E-UTRAN.

Location information reporting including the horizontal and vertical velocity of a UE.

(1) Subscription-Based Identification of Aerial UE Function

The support of the aerial UE function is stored in user subscription information of an HSS. The HSS transmits the information to an MME in an Attach, Service Request and Tracking Area Update process. The subscription information may be provided from the MME to a base station through an S1 AP initial context setup request during the Attach, tracking area update and service request procedure. Furthermore, in the case of X2-based handover, a source base station (BS) may include subscription information in an X2-AP Handover Request message toward a target BS. More detailed contents are described later. With respect to intra and inter MME S1-based handover, the MME provides subscription information to the target BS after the handover procedure.

(2) Height-Based Reporting for Aerial UE Communication

An aerial UE may be configured with event-based height reporting. The aerial UE transmits height reporting when the altitude of the UE is higher or lower than a set threshold. The reporting includes height and a location.

(3) Interference Detection and Mitigation for Aerial UE Communication

For interference detection, when each (per cell) RSRP value for the number of configured cells satisfies a configured event, an aerial UE may be configured with an RRM event A3, A4 or A5 that triggers measurement reporting. The reporting includes an RRM result and location. For interference mitigation, the aerial UE may be configured with a dedicated UE-specific alpha parameter for PUSCH power control.

(4) Flight Route Information Reporting

An E-UTRAN may request a UE to report flight route information configured with a plurality of middle points defined as 3D locations, as defined in TS 36.355. If the flight route information is available for the UE, the UE reports a waypoint for a configured number. The reporting may also include a time stamp per waypoint if it is configured in the request and available for the UE.

(5) Location Reporting for Aerial UE Communication

Location information for aerial UE communication may include a horizontal and vertical velocity if they have been configured. The location information may be included in the RRM reporting and the height reporting.

Hereafter, (1) to (5) of 3GPP support for aerial UE communication is described more specifically.

DL/UL Interference Detection

For DL interference detection, measurements reported by a UE may be useful. UL interference detection may be performed based on measurement in a base station or may be estimated based on measurements reported by a UE. Interference detection can be performed more effectively by improving the existing measurement reporting mechanism. Furthermore, for example, other UE-based information, such as mobility history reporting, speed estimation, a timing advance adjustment value, and location information, may be used by a network in order to help interference detection. More detailed contents of measurement execution are described later.

DL Interference Mitigation

In order to mitigate DL interference in an aerial UE, LTE Release-13 FD-MIMO may be used. Although the density of aerial UEs is high, Rel-13 FD-MIMO may be advantageous in restricting an influence on the DL terrestrial UE throughput, while providing a DL aerial UE throughput that satisfies DL aerial UE throughput requirements. In order to mitigate DL interference in an aerial UE, a directional antenna may be used in the aerial UE.

In the case of a high-density aerial UE, a directional antenna in the aerial UE may be advantageous in restricting an influence on a DL terrestrial UE throughput. The DL aerial UE throughput has been improved compared to a case where a non-directional antenna is used in the aerial UE. That is, the directional antenna is used to mitigate interference in the downlink for aerial UEs by reducing interference power from wide angles. In the viewpoint that a LOS direction between an aerial UE and a serving cell is tracked, the following types of capability are taken into consideration:

1) Direction of Travel (DoT): an aerial UE does not recognize the direction of a serving cell LOS, and the antenna direction of the aerial UE is aligned with the DoT.

2) Ideal LOS: an aerial UE perfectly tracks the direction of a serving cell LOS and pilots the line of sight of an antenna toward a serving cell.

3) Non-ideal LOS: an aerial UE tracks the direction of a serving cell LOS, but has an error due to actual restriction.

In order to mitigate DL interference with aerial UEs, beamforming in aerial UEs may be used. Although the density of aerial UEs is high, beamforming in the aerial UEs may be advantageous in restricting an influence on a DL terrestrial UE throughput and improving a DL aerial UE throughput. In order to mitigate DL interference in an aerial UE, intra-site coherent JT CoMP may be used. Although the density of aerial UEs is high, the intra-site coherent JT can improve the throughput of all UEs. An LTE Release-13 coverage extension technology for non-bandwidth restriction devices may also be used. In order to mitigate DL interference in an aerial UE, a coordinated data and control transmission method may be used. An advantage of the coordinated data and control transmission method is to increase an aerial UE throughput, while restricting an influence on a terrestrial UE throughput. It may include signaling for indicating a dedicated DL resource, an option for cell muting/ABS, a procedure update for cell (re)selection, acquisition for being applied to a coordinated cell, and the cell ID of a coordinated cell.

UL Interference Mitigation

In order to mitigate UL interference caused by aerial UEs, an enhanced power control mechanisms may be used. Although the density of aerial UEs is high, the enhanced power control mechanism may be advantageous in restricting an influence on a UL terrestrial UE throughput.

The above power control-based mechanism influences the following contents.

UE-specific partial pathloss compensation factor
UE-specific Po parameter
Neighbor cell interference control parameter
Closed-Loop Power Control The power control-based mechanism for UL interference mitigation is described more specifically.

1) UE-Specific Partial Pathloss Compensation Factor

The enhancement of the existing open-loop power control mechanism is taken into consideration in the place where a UE-specific partial pathloss compensation factor $\alpha_{UE}$ is introduced. Due to the introduction of the UE-specific partial pathloss compensation factor $\alpha_{UE}$, different $\alpha_{UE}$ may be configured by comparing an aerial UE with a partial pathloss compensation factor configured in a terrestrial UE.

2) UE-Specific P0 Parameter

Aerial UEs are configured with different Po compared with Po configured for terrestrial UEs. The enhance of the existing power control mechanism is not necessary because the UE-specific Po is already supported in the existing open-loop power control mechanism.

Furthermore, the UE-specific partial pathloss compensation factor $\alpha_{UE}$ and the UE-specific Po may be used in common for uplink interference mitigation. Accordingly, the UE-specific partial path loss compensation factor $\alpha_{UE}$ and the UE-specific Po can improve the uplink throughput of a terrestrial UE, while scarifying the reduced uplink throughput of an aerial UE.

3) Closed-Loop Power Control

Target reception power for an aerial UE is coordinated by taking into consideration serving and neighbor cell measurement reporting. Closed-loop power control for aerial UEs needs to handle a potential high-speed signal change in the sky because aerial UEs may be supported by the sidelobes of base station antennas.

In order to mitigate UL interference attributable to an aerial UE, LTE Release-13 FD-MIMO may be used. In order to mitigate UL interference caused by an aerial UE, a UE-directional antenna may be used. In the case of a high-density aerial UE, a UE-directional antenna may be advantageous in restricting an influence on an UL terrestrial UE throughput. That is, the directional UE antenna is used to reduce uplink interference generated by an aerial UE by reducing a wide angle range of uplink signal power from the aerial UE. The following type of capability is taken into consideration in the viewpoint in which an LOS direction between an aerial UE and a serving cell is tracked:

1) Direction of Travel (DoT): an aerial UE does not recognize the direction of a serving cell LOS, and the antenna direction of the aerial UE is aligned with the DoT.

2) Ideal LOS: an aerial UE perfectly tracks the direction of a serving cell LOS and pilots the line of sight of the antenna toward a serving cell.

3) Non-ideal LOS: an aerial UE tracks the direction of a serving cell LOS, but has an error due to actual restriction.

A UE may align an antenna direction with an LOS direction and amplify power of a useful signal depending on the capability of tracking the direction of an LOS between the aerial UE and a serving cell. Furthermore, UL transmission beamforming may also be used to mitigate UL interference.

Mobility

Mobility performance (e.g., a handover failure, a radio link failure (RLF), handover stop, a time in Qout) of an aerial UE is weakened compared to a terrestrial UE. It is expected that the above-described DL and UL interference mitigation technologies may improve mobility performance for an aerial UE. Better mobility performance in a rural area network than in an urban area network is monitored. Furthermore, the existing handover procedure may be improved to improve mobility performance.

- Improvement of a handover procedure for an aerial UE and/or mobility of a handover-related parameter based on location information and information, such as the aerial state of a UE and a flight route plan
- A measurement reporting mechanism may be improved in such a way as to define a new event, enhance a trigger condition, and control the quantity of measurement reporting.

The existing mobility enhancement mechanism (e.g., mobility history reporting, mobility state estimation, UE support information) operates for an aerial UE and may be first evaluated if additional improvement is necessary. A parameter related to a handover procedure for an aerial UE may be improved based on aerial state and location information of the UE. The existing measurement reporting mechanism may be improved by defining a new event, enhancing a triggering condition, and controlling the quantity of measurement reporting. Flight route plan information may be used for mobility enhancement.

A measurement execution method which may be applied to an aerial UE is described more specifically.

Figure 10:
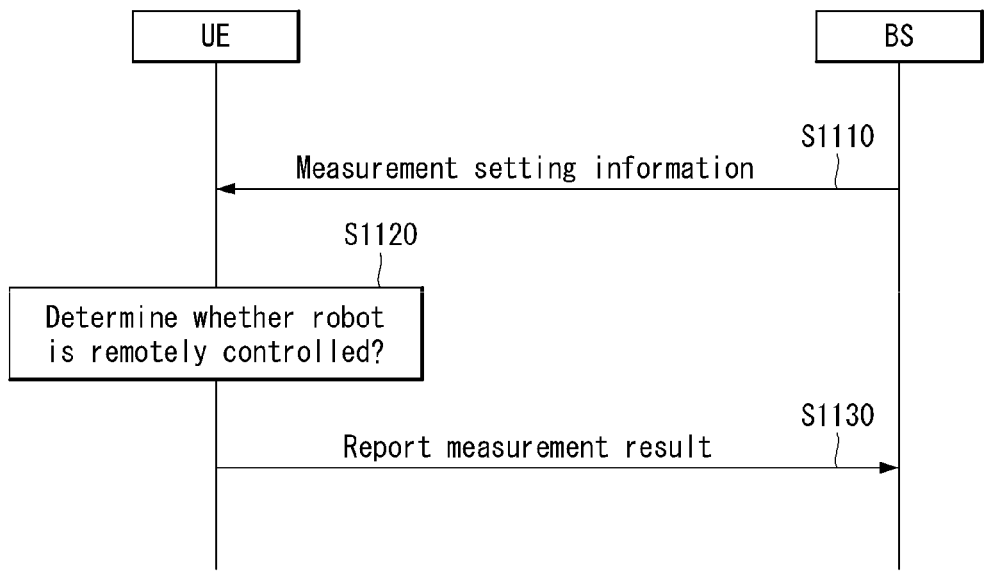
FIG. 10 is a flowchart showing an example of a measurement execution method to which the disclosure may be applied.

FIG. 10 is a flowchart showing an example of a measurement execution method to which the disclosure may be applied.

An aerial UE receives measurement configuration information from a base station (S1010). In this case, a message including the measurement configuration information is called a measurement configuration message. The aerial UE performs measurement based on the measurement configuration information (S1020). If a measurement result satisfies a reporting condition within the measurement configuration information, the aerial UE reports the measurement result to the base station (S1030). A message including the measurement result is called a measurement report message. The measurement configuration information may include the following information.

(1) Measurement object information: this is information on an object on which an aerial UE will perform measurement. The measurement object includes at least one of an intra-frequency measurement object that is an object of measurement within a cell, an inter-frequency measurement object that is an object of inter-cell measurement, or an inter-RAT measurement object that is an object of inter-RAT measurement. For example, the intra-frequency measurement object may indicate a neighbor cell having the same frequency band as a serving cell. The inter-frequency measurement object may indicate a neighbor cell having a frequency band different from that of a serving cell. The inter-RAT measurement object may indicate a neighbor cell of an RAT different from the RAT of a serving cell.

(2) Reporting configuration information: this is information on a reporting condition and reporting type regarding when an aerial UE reports the transmission of a measurement result. The reporting configuration information may be configured with a list of reporting configurations. Each reporting configuration may include a reporting criterion and a reporting format. The reporting criterion is a level in which the transmission of a measurement result by a UE is triggered. The reporting criterion may be the periodicity of measurement reporting or a single event for measurement reporting. The reporting format is information regarding that an aerial UE will configure a measurement result in which type.

An event related to an aerial UE includes (i) an event H1 and (ii) an event H2.

Event H1 (aerial UE height exceeding a threshold)

A UE considers that an entering condition for the event is satisfied when 1) the following defined condition H1-1 is satisfied, and considers that a leaving condition for the event is satisfied when 2) the following defined condition H1-2 is satisfied.

| $Ms-Hys$>Thresh+Offset | Inequality H1-1 (entering condition): |
| $Ms+Hys$<Thresh+Offset | Inequality H1-2 (leaving condition): |

In the above equation, the variables are defined as follows.

Ms is an aerial UE height and does not take any offset into consideration. Hys is a hysteresis parameter (i.e., h1-hysteresis as defined in ReportConfigEUTRA) for an event. Thresh is a reference threshold parameter variable for the event designated in MeasConfig (i.e., heightThreshRef defined within MeasConfig). Offset is an offset value for heightThreshRef for obtaining an absolute threshold for the event (i.e., h1-ThresholdOffset defined in ReportConfigEUTRA). Ms is indicated in meters. Thresh is represented in the same unit as Ms.

Event H2 (Aerial UE Height of Less than Threshold)

A UE considers that an entering condition for an event is satisfied 1) the following defined condition H2-1 is satisfied, and considers that a leaving condition for the event is satisfied 2) when the following defined condition H2-2 is satisfied.

| $Ms+Hys$<Thresh+Offset | Inequality H2-1 (entering condition): |
| $Ms-Hys$>Thresh+Offset | Inequality H2-2 (leaving condition): |

In the above equation, the variables are defined as follows.

Ms is an aerial UE height and does not take any offset into consideration. Hys is a hysteresis parameter (i.e., h1-hysteresis as defined in ReportConfigEUTRA) for an event. Thresh is a reference threshold parameter variable for the event designated in MeasConfig (i.e., heightThreshRef defined within MeasConfig). Offset is an offset value for heightThreshRef for obtaining an absolute threshold for the event (i.e., h2-ThresholdOffset defined in ReportConfigEUTRA). Ms is indicated in meters. Thresh is represented in the same unit as Ms.

(3) Measurement identity information: this is information on a measurement identity by which an aerial UE determines to report which measurement object using which type by associating the measurement object and a reporting configuration. The measurement identity information is included in a measurement report message, and may indicate that a measurement result is related to which measurement object and that measurement reporting has occurred according to which reporting condition.

(4) Quantity configuration information: this is information on about a parameter for configuration of measurement unit, reporting unit and/or filtering of measurement result value.

(5) Measurement gap information: this is information on a measurement gap, that is, an interval which may be used by an aerial UE in order to perform only measurement without taking into consideration data transmission with a serving cell because downlink transmission or uplink transmission has not been scheduled in the aerial UE.

In order to perform a measurement procedure, an aerial UE has a measurement object list, a measurement reporting configuration list, and a measurement identity list. If a measurement result of the aerial UE satisfies a configured event, the UE transmits a measurement report message to a base station.

In this case, the following parameters may be included in a UE-EUTRA-Capability Information Element in relation to the measurement reporting of the aerial UE. IE UE-EUTRA-Capability is used to forward, to a network, an E-RA UE Radio Access Capability parameter and a function group indicator for an essential function. IE UE-EUTRA-Capability is transmitted in an E-UTRA or another RAT. Table 1 is a table showing an example of the UE-EUTRA-Capability IE.

node to a 3GPP node. A UE in flight may be identified using UE-based reporting (e.g., mode indication, altitude or location information during flight, an enhanced measurement reporting mechanism (e.g., the introduction of a new event) or based on mobility history information available in a network.

Subscription Handling for Aerial UE

The following description relates to subscription information processing for supporting an aerial UE function through the E-UTRAN defined in TS 36.300 and TS 36.331. An eNB supporting aerial UE function handling uses information for each user, provided by the MME, in order to determine whether the UE can use the aerial UE function. The support of the aerial UE function is stored in subscription information of a user in the HSS. The HSS transmits the information to the MME through a location update message during an attach and tracking area update procedure. A home operator may cancel the subscription approval of the user for operating the aerial UE at any time. The MME supporting the aerial UE function provides the eNB with subscription information of the user for aerial UE approval through an S1 AP initial context setup request during the attach, tracking area update and service request procedure.

An object of an initial context configuration procedure is to establish all required initial UE context, including E-RAB context, a security key, a handover restriction list, a UE radio function, and a UE security function. The procedure uses UE-related signaling.

In the case of Inter-RAT handover to intra- and inter-MME S1 handover (intra RAT) or E-UTRAN, aerial UE subscription information of a user includes an S1-AP UE context modification request message transmitted to a target BS after a handover procedure.

An object of a UE context change procedure is to partially change UE context configured as a security key or a subscriber profile ID for RAT/frequency priority, for example. The procedure uses UE-related signaling.

TABLE 1

```
-- ASN1START... .. MeasParameters-v1530 ::=   SEQUENCE {qoe-MeasReport-r15
ENUMERATED {supported}   OPTIONAL,   qoe-MTSI-MeasReport-r15
ENUMERATED {supported}   OPTIONAL,   ca-IdleModeMeasurements-r15
ENUMERATED {supported}   OPTIONAL,   ca-IdleModeValidityArea-r15
ENUMERATED {supported}   OPTIONAL,   heightMeas-r15   ENUMERATED
{supported}   OPTIONAL, multipleCellsMeasExtension-r15   ENUMERATED
{supported}   OPTIONAL} ... ..
```

The heightMeas-r15 field defines whether a UE supports height-based measurement reporting defined in TS 36.331. As defined in TS 23.401, to support this function with respect to a UE having aerial UE subscription is essential. The multipleCellsMeasExtension-r15 field defines whether a UE supports measurement reporting triggered based on a plurality of cells. As defined in TS 23.401, to support this function with respect to a UE having aerial UE subscription is essential.

UAV UE Identification

A UE may indicate a radio capability in a network which may be used to identify a UE having a related function for supporting a UAV-related function in an LTE network. A permission that enables a UE to function as an aerial UE in the 3GPP network may be aware based on subscription information transmitted from the MME to the RAN through S1 signaling. Actual "aerial use" certification/license/restriction of a UE and a method of incorporating it into subscription information may be provided from a Non-3GPP In the case of X2-based handover, aerial UE subscription information of a user is transmitted to a target BS as follows:

If a source BS supports the aerial UE function and aerial UE subscription information of a user is included in UE context, the source BS includes corresponding information in the X2-AP handover request message of a target BS.

An MME transmits, to the target BS, the aerial UE subscription information in a Path Switch Request Acknowledge message.

An object of a handover resource allocation procedure is to secure, by a target BS, a resource for the handover of a UE.

If aerial UE subscription information is changed, updated aerial UE subscription information is included in an S1-AP UE context modification request message transmitted to a BS.

Table 2 is a table showing an example of the aerial UE subscription information.

TABLE 2

| IE/Group Name | Presence | Range | IE type and reference |
|---|---|---|---|
| Aerial UE subscription information | M | | ENUMERATED (allowed, not allowed, . . .) |

Aerial UE subscription information is used by a BS in order to know whether a UE can use the aerial UE function.

Combination of Drone and eMBB

A 3GPP system can support data transmission for a UAV (aerial UE or drone) and for an eMBB user at the same time.

A base station may need to support data transmission for an aerial UAV and a terrestrial eMBB user at the same time under a restricted bandwidth resource. For example, in a live broadcasting scenario, a UAV of 100 meters or more requires a high transmission speed and a wide bandwidth because it has to transmit, to a base station, a captured figure or video in real time. At the same time, the base station needs to provide a requested data rate to terrestrial users (e.g., eMBB users). Furthermore, interference between the two types of communications needs to be minimized.

Block Diagram of AI Device

Figure 11:
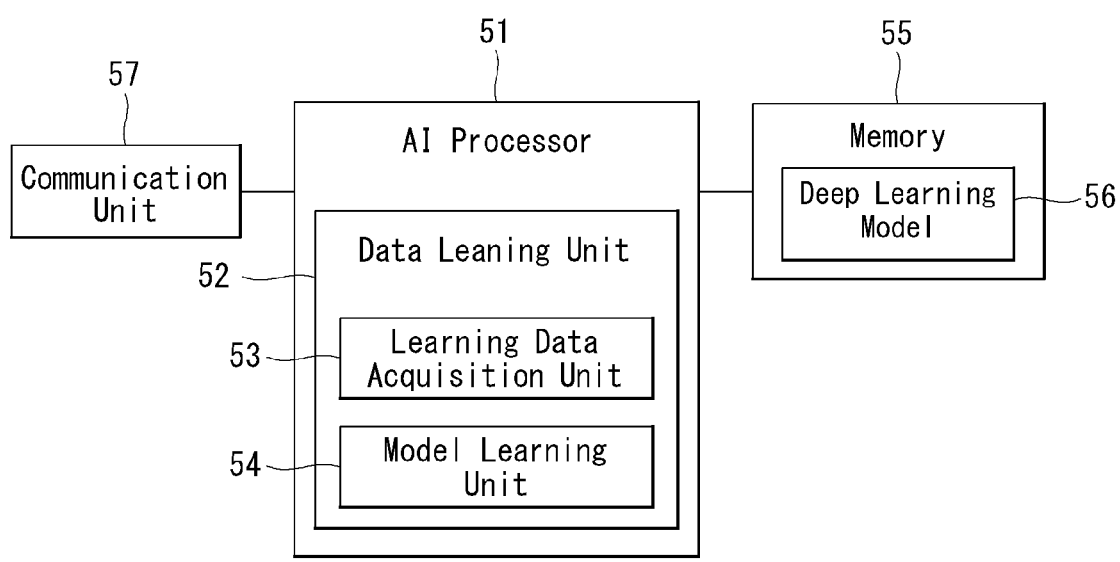
FIG. 11 is a block diagram illustrating an AI device according to an embodiment of the disclosure.
Figure 12:
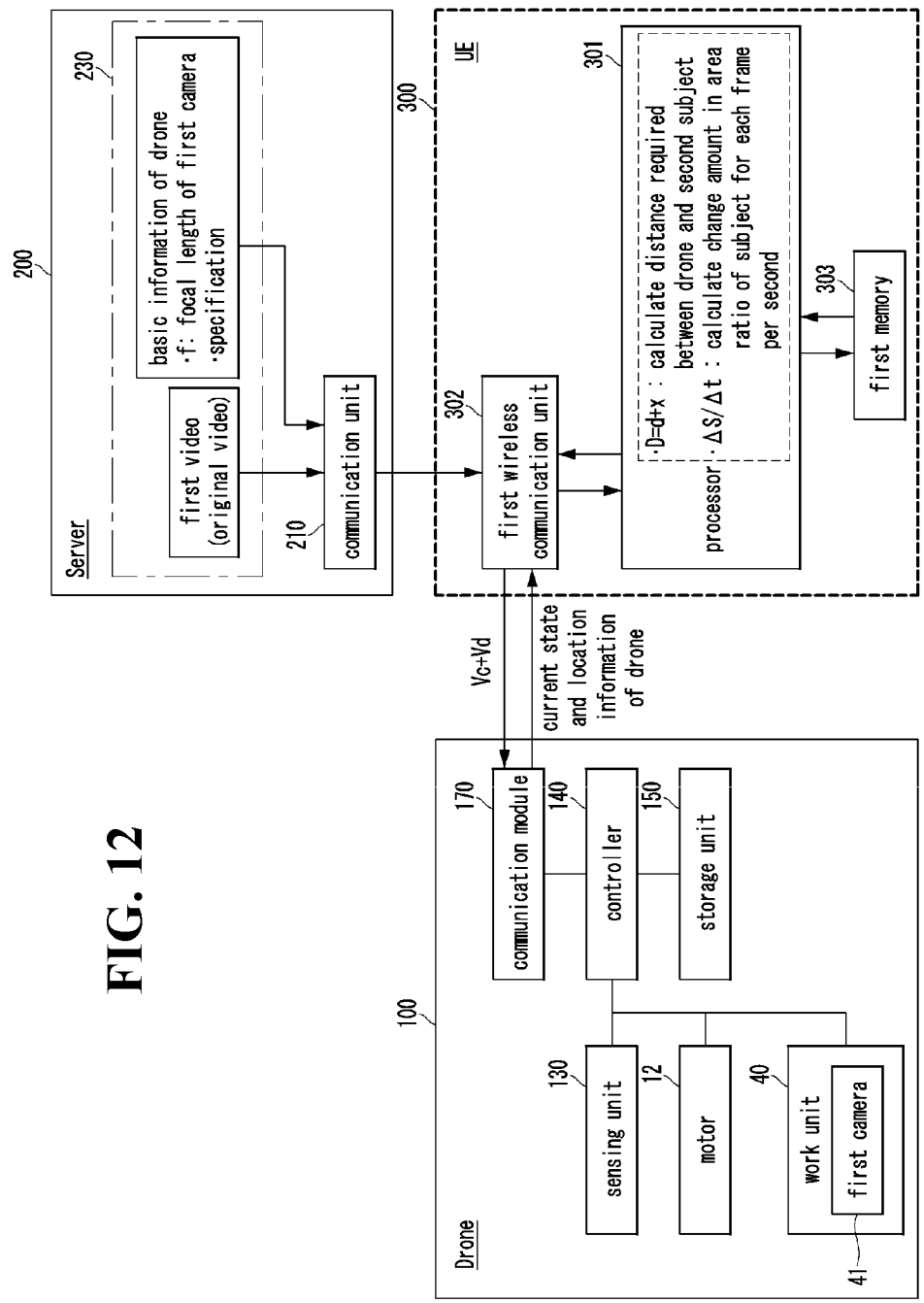
FIG. 12 is a block diagram illustrating a drone control system according to an embodiment of the present disclosure.

FIG. 11 is a block diagram illustrating an AI device according to an embodiment of the disclosure;

The AI device 50 may include an electronic device including an AI module capable of performing AI processing or a server including the AI module. The AI device 50 may be included as at least some component of the device 600 for controlling the UAV according to an embodiment of the disclosure, as shown in FIG. 12, to perform AI processing in the device or in a terminal. In other words, the AI device 50 may be embedded in the device 600 for controlling the UAV 100 according to an embodiment of the disclosure, as shown in FIG. 12.

Where the AI device 50 is included as at least some component of the device 600 shown in FIG. 12, the AI device 50 may be configured in the form of an AI module or an AI processor and be embedded in the device 600 to perform AI processing.

In the disclosure, AI processing may include all computation and tasks for the device 600 of FIG. 12 to control the UAV 100. For example, the device 600 of FIG. 12 may receive sensing data measured by the UAV 100 of FIG. 2 via the sensing unit 130 or flight data generated upon flight, via the drone controller 140, perform machine learning thereon, recognize, process, and/or determine what the UAV 100 has sensed, and generate a control signal for the UAV 100. Further, the AI processing may receive, from the UAV 100, data obtained by interaction with the other electronic devices equipped in the UAV 100, such as the storage unit 150, motor unit 12, task unit 40, and communication module 170, and other unmentioned electronic devices that may be equipped in the UAV 100, perform AI processing thereon, and then control various functions and operations for the flight and/or mission fulfilment of the UAV 100.

The AI device 50 may include an AI processor 51, a memory 55, and/or a communication unit 57.

The AI device 50, which is a computing device that can learn a neural network, may be implemented as various electronic devices such as a server, a desktop PC, a notebook PC, and a tablet PC.

The AI processor 51 can learn a neural network using programs stored in the memory 55. In particular, the AI processor 51 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted Boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 55 can store various programs and data for the operation of the AI device 50. The memory 55 may be a nonvolatile memory, a volatile memory, a flash-memory, a hard disk drive (HDD), a solid state drive (SDD), or the like. The memory 55 is accessed by the AI processor 51 and reading-out/recording/correcting/deleting/updating, etc. of data by the AI processor 51 can be performed. Further, the memory 55 can store a neural network model (e.g., a deep learning model 56) generated through a learning algorithm for data classification/recognition according to an embodiment of the disclosure.

Meanwhile, the AI processor 51 may include a data learning unit 52 that learns a neural network for data classification/recognition. The data learning unit 52 can learn references about what learning data are used and how to classify and recognize data using the learning data in order to determine data classification/recognition. The data learning unit 52 can learn a deep learning model by acquiring learning data to be used for learning and by applying the acquired learning data to the deep learning model.

The data learning unit 52 may be manufactured in the type of at least one hardware chip and mounted on the AI device 50. For example, the data learning unit 52 may be manufactured in a hardware chip type only for artificial intelligence, and may be manufactured as a part of a general purpose processor (CPU) or a graphics processing unit (GPU) and mounted on the AI device 50. Further, the data learning unit 52 may be implemented as a software module. When the data leaning unit 52 is implemented as a software module (or a program module including instructions), the software module may be stored in non-transitory computer readable media that can be read through a computer. In this case, at least one software module may be provided by an OS (operating system) or may be provided by an application.

The data learning unit 52 may include a learning data acquiring unit 53 and a model learning unit 54.

The learning data acquiring unit 53 can acquire learning data required for a neural network model for classifying and recognizing data. For example, the learning data acquiring unit 53 can acquire, as learning data, vehicle data and/or sample data to be input to a neural network model.

The model learning unit 54 can perform learning such that a neural network model has a determination reference about how to classify predetermined data, using the acquired learning data. In this case, the model learning unit 54 can train a neural network model through supervised learning that uses at least some of learning data as a determination reference. Alternatively, the model learning data 54 can train a neural network model through unsupervised learning that finds out a determination reference by performing learning by itself using learning data without supervision. Further, the model learning unit 54 can train a neural network model through reinforcement learning using feedback about whether the result of situation determination according to learning is correct. Further, the model learning unit 54 can train a neural network model using a learning algorithm including error back-propagation or gradient decent.

When a neural network model is learned, the model learning unit 54 can store the learned neural network model in the memory. The model learning unit 54 may store the learned neural network model in the memory of a server connected with the AI device 50 through a wire or wireless network.

The data learning unit 52 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 54 can use learning data acquired for learning for image recognition.

Further, the learning data selector can select data for learning from the learning data acquired by the learning data acquiring unit 53 or the learning data preprocessed by the preprocessor. The selected learning data can be provided to the model learning unit 54. For example, the learning data selector can select only data for objects included in a specific area as learning data by detecting the specific area in an image acquired through a camera of a vehicle.

Further, the data learning unit 52 may further include a model estimator (not shown) to improve the analysis result of a neural network model.

The model estimator inputs estimation data to a neural network model, and when an analysis result output from the estimation data does not satisfy a predetermined reference, it can make the model learning unit 52 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 57 can transmit the AI processing result by the AI processor 51 to an external electronic device.

Here, the external electronic device may be defined as an autonomous vehicle. Further, the AI device 50 may be defined as another vehicle or a 5G network that communicates with the autonomous vehicle. Meanwhile, the AI device 50 may be implemented by being functionally embedded in an autonomous module included in a vehicle. Further, the 5G network may include a server or a module that performs control related to autonomous driving.

Meanwhile, the AI device 50 shown in FIG. 4 was functionally separately described into the AI processor 51, the memory 55, the communication unit 57, etc., but it should be noted that the aforementioned components may be integrated in one module and referred to as an AI module.

The above-described 5G communication technology may be combined with the methods described below according to the disclosure or may be provided to specify or clarify the technical features of the methods proposed herein.

The components of a device and system for controlling a UAV according to an embodiment of the disclosure are described below in detail with reference to FIG. 12. FIG. 12 is a block diagram illustrating main components of a device and system for controlling a UAV according to an embodiment of the disclosure.

Hereinafter, a UE 300 according to an embodiment of the present disclosure will be described with reference to FIG. 12. The UE 300 according to the present embodiment is a device for controlling a drone 100 and means a mobile device capable of performing data communication with the drone 100, a server 200, and another UE 310. Further, FIG. 12 is a block diagram illustrating a drone control system according to an embodiment of the present disclosure.

Referring to FIG. 12, the UE 300 according to the present embodiment includes a processor 301, a first wireless communication unit 302, and a first memory 303.

The processor 301 analyzes an original video generated, input, and/or downloaded by the UE 300 to control the drone 100 and a first camera 41 mounted in the drone 100 to photograph a specific subject with a view angle, magnification, a composition, and depth identical to or similar to that of the original video. Accordingly, the drone 100 according to the present embodiment may photograph a specific subject under the control of the processor 301 to photograph a reproduction video identical to or similar to the original video.

Hereinafter, for convenience of description, an original video may be represented as a first video, and a reproduction video may be represented as a second video. Further, a camera used when photographing the original video may be represented as a second camera, and a camera mounted in the drone 100 as a camera used when photographing the reproduction video may be represented as a first camera. Further, a subject included in the original video, i.e., the first video may be represented as a first subject, and a subject included in the reproduction video, i.e., the second video may be represented as a second subject.

The processor 301 is configured with the above-described AI processor 51 or is configured to include an AI module or an AI processing function. Further, on the premise that the UE 300 may perform data communication with an external server, another UE, and/or another electronic device, an AI processing function to be included in the processor 301 may be included in an external server, another UE, and/or another electronic device, and the processor 301 may be configured to receive AI processing results from them. However, for convenience of description, hereinafter, it is exemplified that the processor 301 according to the present disclosure includes an AI module or an AI processing function.

The first memory 303 may record and temporarily store and/or store the results of calculation and analysis performed by the processor 301. Further, the first memory 303 is configured to record and store data generated in the UE 300, i.e., data about the UE including video data.

The first wireless communication unit 302 enables the UE 300 according to the present embodiment to perform data communication with the external server 200, another UE, and/or another electronic device. The first wireless communication unit 302 may form a wireless communication network between other external devices and the UE 300 using the above-described various communication technologies (e.g., 5G communication). For example, the first wireless communication unit 302 may perform WiFi communication with at least two access points (AP) located around the drone 100, another UE, and the UE 300 with an IEEE 802.11mc protocol. Here, the other electronic device includes the drone 100 disclosed in the present disclosure and thus so WiFi communication may be performed between drones.

The UE 300 including the first wireless communication unit 302 may perform triangulation with at least two access points and/or the drone 100 with a Round Trip Time (RTT) method to provide location data of the UE 300 and the drone 100, and to determine a location relation between the UE 300 and the drone 100. Here, determination of the positional relationship means that GPS location data of the UE 300 and the drone 100 may be supplemented or corrected by measuring a distance between the UE 300 and the drone 100.

The external server 200 may include a communication unit 210 capable of wirelessly performing data communication with the UE 300, and also include a storage unit 230 for storing a first video (original video) and storing information about the drone 100 or the camera. When requested by the UE 300, the external server 200 may transmit data about the first video and/or information about a camera to the UE 300 using the communication unit 210.

Because the drone 100 according to the present embodiment includes the same configuration as that described in FIG. 2 and the above description described with reference to FIG. 2, a detailed description of the configuration will be omitted to avoid a repeated description. However, the drone 100 according to the present embodiment includes a first camera 41 in a work unit 40 and is configured to photograph a video using the first camera 41.

Referring again to FIG. 12, when data on the first video is input to the UE 300, the processor 301 analyzes the first video.

In this case, the first video, which is an original video may be a video stored in the external server 200 or may be a video stored in another UE. Further, the first video may be a video previously stored in the first memory 303 mounted in the UE 300 according to the present embodiment.

Accordingly, the first video may be input to the UE 300 through the first wireless communication unit 302, and first video data in the first memory 303 may be loaded by a user's command or selection.

The processor 301 may analyze the first video to obtain information about an image sensor size, extendable maximum magnification, a view angle, a pixel, and a focal length of a second camera (not shown) used for photographing the first video. The processor 301 analyzes a composition and an area ratio of a first subject included in the first video.

A process in which the processor 301 analyzes the first video may be configured as an AI learning process, and the processor 301 may learn production information such as a model name, a manufacturer, and a serial number of the second camera using the obtained information about the second camera. Further, specific information about the second camera may be stored in the external server 200, and in this case, the processor 301 may find information about the second camera through a network search and use the information for analyzing the first video. Further, specific information about the second camera may be stored in advance in the first memory 303 included in the UE 300, and the processor 301 may access the first memory 303 to access this information.

Further, the processor 301 obtains and learns information about the first camera 41 mounted in the drone 100. Information about the first camera 41 includes information about a size of an image sensor included in the first camera, extendable maximum magnification, a view angle, a pixel, and a focal length and production information such as a model name, a manufacturer, and a serial number of the first camera.

Information about the first camera 41 may be stored in the external server 200, and in this case, the processor 301 may find information about the first camera 41 through a network search and use the information for analysis of the first video. Further, specific information about the first camera 41 may be stored in advance in the first memory 303 included in the UE 300, and the processor 301 may access the first memory 303 to access such information.

The processor 301 analyzes data on the first video, and when the first camera 41 photographs the second subject, the processor 301 generates a first drone control signal and a first camera control signal so as to photograph a second video identical to or similar to the first video.

Here, the first drone control signal and the first camera control signal may mean control signals for the drone 100 and the first camera 41 mounted in the drone 100 initially generated by analyzing the first video by the UE 300.

That is, the processor 301 controls the drone 100 and the first camera 41 to photograph a second subject with enlargement magnification, a view angle, and a composition identical to or similar to enlargement magnification, a view angle, and a composition used when the second camera photographs the first video.

To this end, the processor 301 provides a first camera control signal that controls the first camera based on the result of analyzing the first video. Further, the processor 301 provides a first drone control signal that moves the drone 100 to a specific location capable of photographing the second subject based on the result of analyzing the first video.

In this way, the first camera control signal and the first drone control signal provided in the processor 301 are transmitted to the drone 100 through the first wireless communication unit 302, and the drone 100 is located to be offset by a predetermined distance from the second subject. The first camera 41 is adjusted to photograph the second subject with a specific view angle, magnification, and composition.

Therefore, the UE 300 according to the present disclosure controls the drone 100 and the first camera 41 to photograph a second subject with a view angle, magnification, and composition identical to or similar to a view angle, magnification, and composition in which the first video is photographed. As a result, a second video generated through the drone 100 and the first camera 41 becomes a reproduction video giving a feeling identical to or similar to that of the first video.

Figure 13:
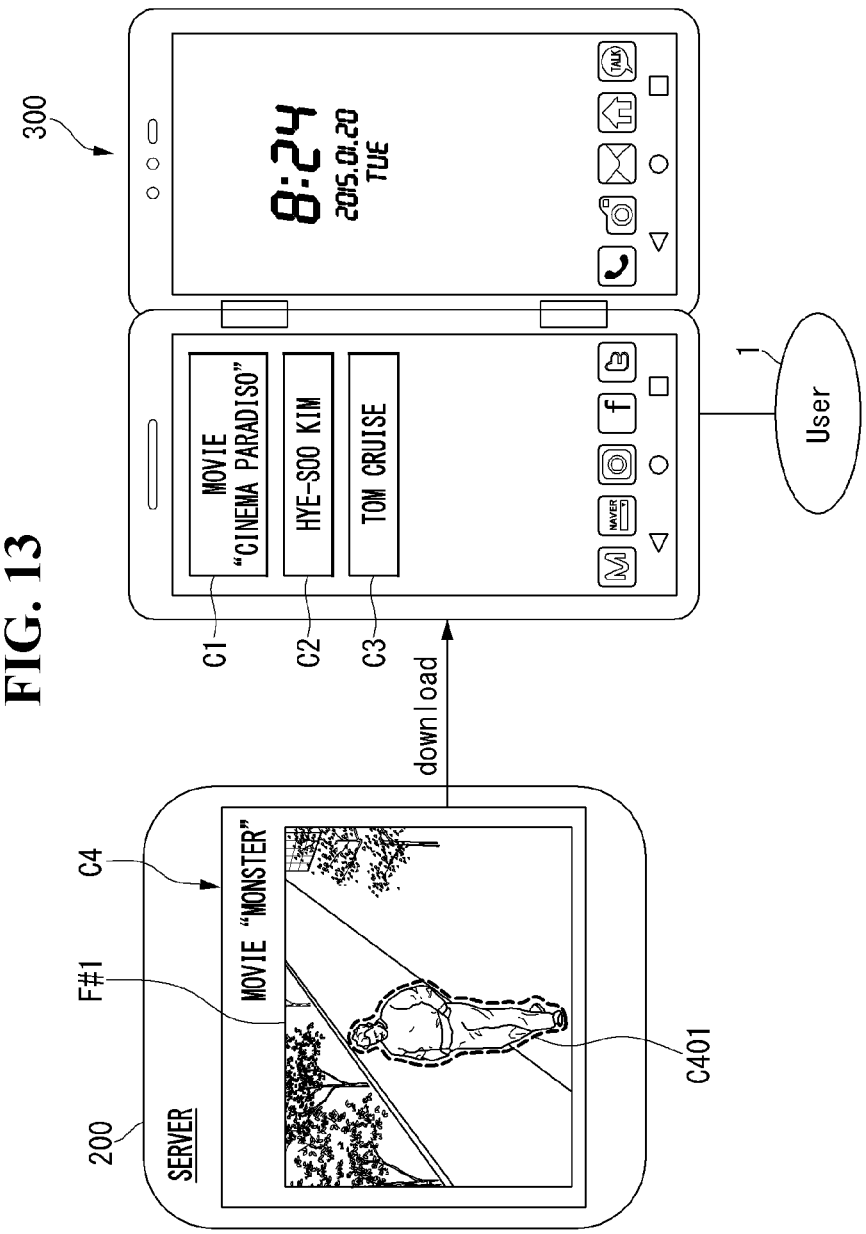
FIG. 13 is a conceptual diagram illustrating that a user equipment obtains a first video according to an embodiment of the present disclosure.
Figure 14:
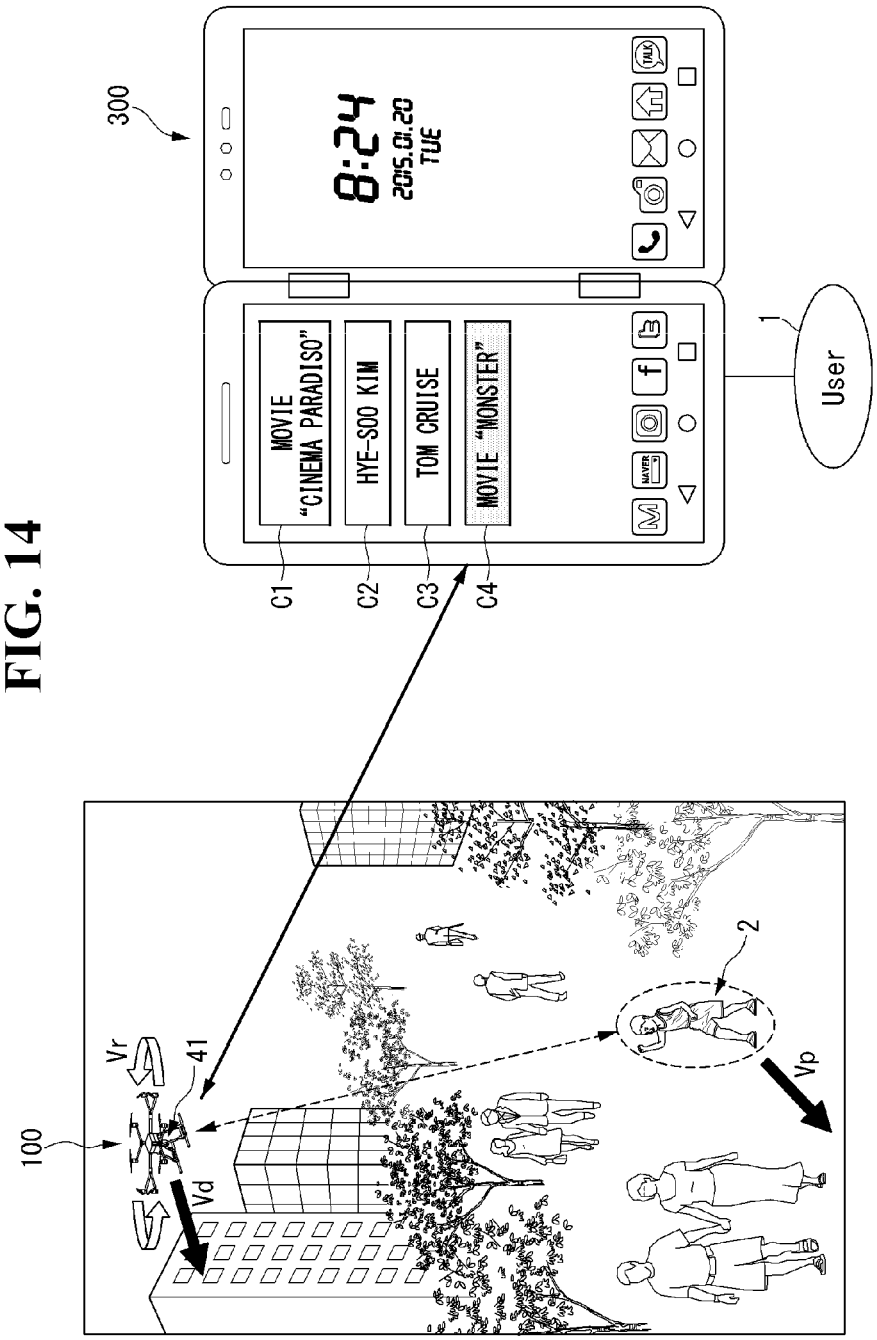
FIG. 14 is a conceptual diagram illustrating that a drone photographs a second subject under the control of a user equipment according to an embodiment of the present disclosure.
Figure 15:
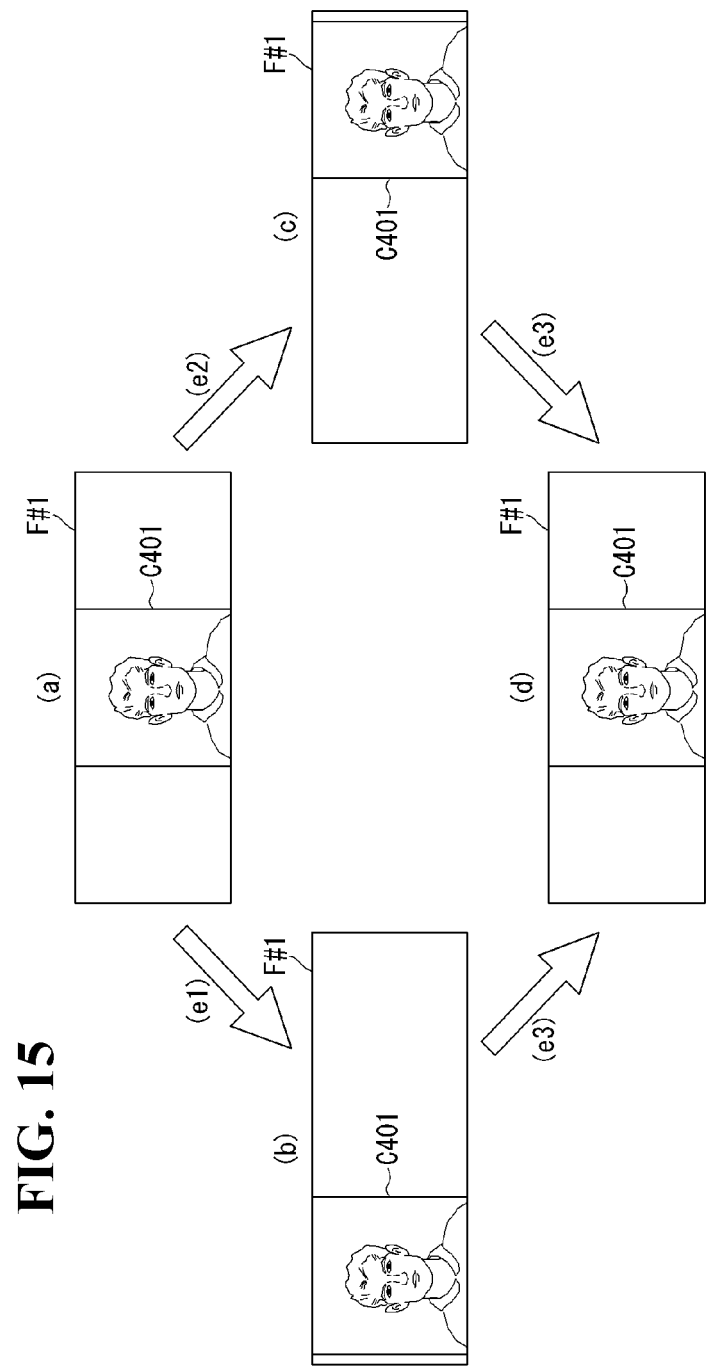
FIGS. 15 and 16 are diagrams illustrating that a user equipment adjusts a drone when a composition of a represented object is different from a composition of a subject represented in a reproduction video according to an embodiment of the present disclosure.
Figure 16:
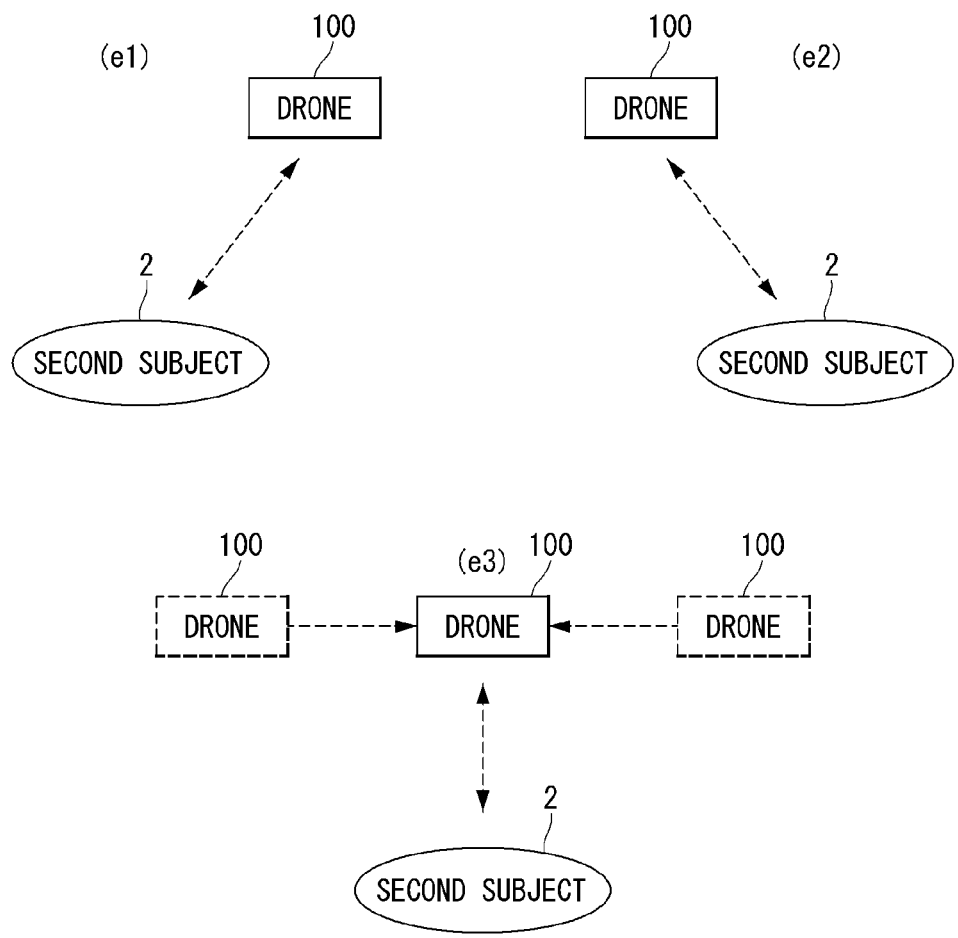

Referring to FIGS. 13 to 16, an example of a scenario will be described in detail in which the UE 300 according to the present embodiment controls the drone 100 to generate a second video, which is a reproduction video that gives a feeling identical to or similar to that of the first video. FIG. 13 is a conceptual diagram illustrating that a UE obtains a first video according to an embodiment of the present disclosure, and FIG. 14 is a conceptual diagram illustrating that a drone photographs a second subject under the control of a UE according to an embodiment of the present disclosure. Further, FIGS. 15 and 16 are diagrams illustrating that a UE adjusts a drone according to an embodiment of the present disclosure when a composition of a represented subject is different from a composition of a subject represented in a reproduction video.

Hereinafter, a scenario in which the UE 300 described with reference to FIGS. 13 to 16 controls the drone 100 is only an example of a scenario that photographs a reproduction video using the UE 300 and the drone 100 according to the present embodiment, and the use possibility of various UEs 300 and the drone 100 of the present disclosure is not limited by such a scenario.

First, referring to FIG. 13, the UE 300 may be in a state in which first to third contents c1, c2, and c3 are stored in the first memory 303. Here, the first content c1 may be a foreign movie "Cinema Paradiso", the second content c2 may be one of contents related to a Korean movie actor "Hye-soo Kim", and the third content c3 may be one of contents related to a foreign movie actor "Tom Cruise".

A user 1 may download a fourth content c4 in addition to the first to third contents c1, c2, and c3 stored in the first memory 303 from the external server 200 to the UE 300. Here, it is exemplified that the fourth content c4 is a Korean movie "Monster".

Further, the first to fourth contents c1, c2, c3, and c4 may be a video including all of the contents, but may be a video expressing only a part of the content. For example, the first content c1 may be a video expressing the entire contents of the foreign movie "Cinema Paradiso," but the fourth content c4 may be a teaser video of the Korean movie "Monster".

When the fourth content c4 is downloaded to the UE 300, the processor 301 analyzes the first video using the fourth content c4 as a first video, i.e., an original video. The processor 301 may analyze information about the second camera used when photographing a first subject c401 included in the fourth content c4 in a first video analysis process. The information about the second camera includes information such as enlargement magnification and a view angle used when photographing the first subject c401, and a size of the image sensor included in the second camera. Further, the processor 301 analyzes the first subject c401 included in the first video and the composition of the first subject c401. The first video is formed by connecting various pictures in which the first subject c401 is photographed to each other, and these pictures may be split into frames per second to be represented as a plurality of split videos. The split video obtained by dividing the first video into frames per second may be referred to as a first split video F #1.

The processor 301 analyzes each of the first split videos included in the first video to distinguish whether the first subject c401 is a person, an animal, or an object. In FIG. 13, the first subject c401 is exemplified as a person in a specific first split video F #1. In this case, the processor 301 may recognize that the first subject c401 is a person using the features of the first subject c401 in the first split video F #1.

Further, the processor 301 analyzes an area occupied by the first subject c401 in the first split video F #1 and a composition of the first subject c401.

Referring to FIG. 15, a composition of the first subject c401 will be described. First, as illustrated in FIG. 15(a), the first subject c401 may be located in the center of the first split video F #1. This may be referred to as a composition in which the first subject c401 is located in the center. In FIG. 15(b), the first subject c401 is located at the left side of the first split video F #1, and this may be referred to as a composition in which the first subject c401 is located at the left side. Further, in FIG. 15C, the first subject c401 is located at the right side of the first split video F #1, and this may be referred to as a composition in which the first subject c401 is located at the right side.

When the first video is configured with a composition in which the first subject c401 is located in the center of the video, as illustrated in FIG. 15(a), the processor 301 determines that the first video has been configured with a composition in which a subject is located in the center. When the drone 100 photographs a second subject 2 with the first camera 41, the processor 301 may control the first camera 41 and the drone 100 such that the second subject 2 is located in the center of the second video.

For example, the processor 301 determines that the first video has been configured with a composition in which the first subject c401 is located in the center of the first video, as illustrated in FIG. 15(a), but as illustrated in FIG. 15(b), the drone 100 and the first camera 41 may photograph so that the second subject 2 is located at the left side of the second video.

In this case, the processor 301 determines that the drone 100 and the first camera 41 are located at the right side further than the second subject 2, as illustrated in FIG. 16(e1), and as illustrated in FIG. 16(e3), the processor 301 may control the drone 100 to move the drone 100 directly above the second subject 2.

The drone 100 moves directly above the second subject 2 under the control of the processor 301 included in the UE 300. Therefore, as illustrated in FIG. 15(d), the drone 100 and the first camera 41 may photograph such that the second subject 2 is represented in the center of the second video.

For another example, the processor 301 determines that the first video has been configured with a composition in which the first subject c401 is located in the center of the first video, as illustrated in FIG. 15(a), but as illustrated in FIG. 15(c), the drone 100 and the first camera 41 may photograph so that the second subject 2 is disposed at the right side of the second video.

In this case, the processor 301 determines that the drone 100 and the first camera 41 are located at the left side further than the second subject 2, as illustrated in FIG. 16(e2), and as illustrated in of FIG. 16(e3), the processor 301 may control the drone 100 to move the drone 100 directly above the second subject 2.

The drone 100 moves directly above the second subject 2 under the control of the processor 301 included in the UE 300. Therefore, as illustrated in FIG. 15(d), the drone 100 and the first camera 41 may photograph such that the second subject 2 is represented in the center of the second video.

In this way, the UE 300 according to the present embodiment analyzes and determines a composition of the subject included in an original video (first video), and when photographing a reproduction video (second video), the UE 300 may photograph the subject to have the same composition as that of the original video.

Further, the UE 300 and the processor 301 according to the present embodiment may analyze a size of an image sensor of a second camera used for photographing the original video (first video), and compare the size of the image sensor with a size of the image sensor of the first camera to be used for photographing a reproduction video (second video). The UE 300 and the processor 301 according to the present embodiment may adjust a depth change of the first camera 41 and a distance between the first camera 41 and the second subject 2 according to the comparison result. In this case, distance adjustment between the first camera 41 and the second subject 2 may be achieved by adjusting a location of the drone 100.

Figure 17:
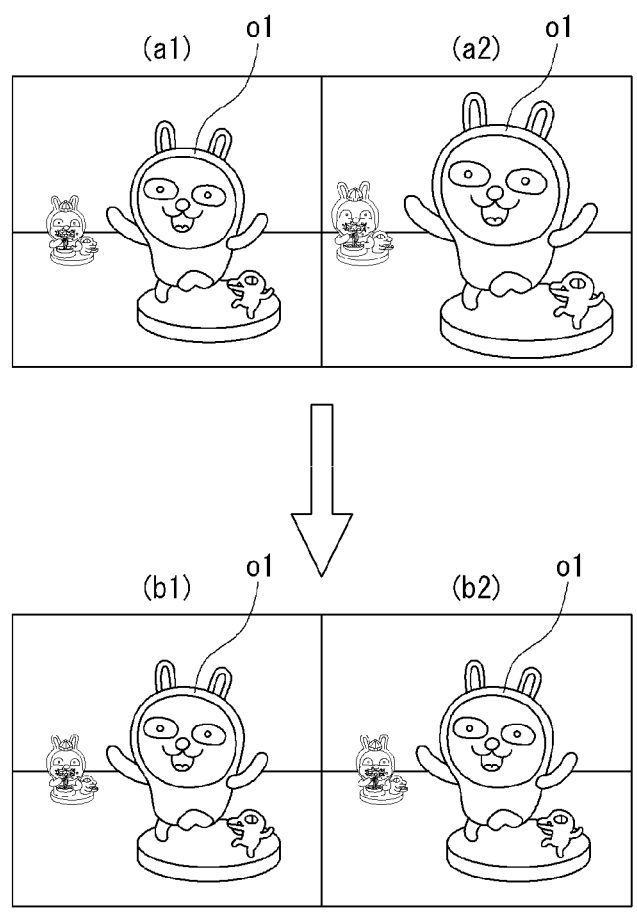
FIG. 17 is a diagram comparing changes in an expression of a photographing video according to a size of an image sensor.

Referring to FIG. 17, when image sensor sizes of the first camera for photographing a reproduction video and the second camera for photographing an original video are different, a method in which the UE 300 controls the drone 100 and the first camera 41 will be described in detail. FIG. 17 is a diagram comparing changes of the expression of a photographing video according to the size of an image sensor.

A case will be exemplified in which an image sensor of the second camera has a size of 36 mm×24 mm corresponding to a full-frame and in which an image sensor of the first camera has a size of 28.7 mm×19 mm corresponding to APS-H.

Here, FIG. 17(a1) illustrates a video obtained by photographing a subject of with a second camera including a full-frame sized image sensor, and FIG. 17(a2) illustrates a video obtained by photographing a subject o2 with the first camera including an APS-H sized image sensor.

When comparing FIGS. 17(a1) and 17(a2), it can be seen that sizes of subjects represented in the photographed video are different because sizes of the image sensors included in the first camera and the second camera are different. In order to minimize a size change of the subject occurring when the size of the image sensor is different, the UE 300 and the processor 301 according to the present embodiment are configured to use distance adjustment between the first camera 41 and the second subject 2 or a zoom-in or zoom-out function of the first camera 41.

FIG. 17(b1) illustrates a video in which a subject o1 is again photographed with the second camera, and FIG. 17(b2) illustrates a video in which the subject o1 is again photographed with the first camera. In this case, sizes of the subject o1 illustrated in FIG. 17(b1) and the subject o1 illustrated in FIG. 17(b2) are the same or almost similar.

This is because the first camera includes an image sensor of a smaller size than the second camera, but the UE 300 and the processor 301 adjust a distance between the first camera and the subject o1 or adjust enlargement magnification of the first camera and thus the UE 300 and the processor 301 were controlled to express the subject o1 in the same size as or a size almost similar to that of the subject o1 photographed by the second camera.

The processor 301 may calculate a first area ratio, which is an area occupied by the first subject c401 in the first split video F #1. That is, the processor 301 calculates an area occupied by the first subject c401 for each first split video split into frames per second to derive a first area ratio and generate first camera control data and drone control data required for photographing a second video based on the first area ratio.

That is, the UE 300 according to the present embodiment analyzes an area occupied by the first subject c401 and a composition of the first subject c401 in each of the first split videos and provides a first drone control signal and a first camera control signal based on the area and the composition.

A process in which the processor 301 analyzes the first video and the first split video F #1 may be performed through AI processing, and the processor 301 provides a first drone control signal and a first camera control signal for photographing a second video, which is a reproduction video giving a feeling identical to or similar to that of the first video based on the analysis result of the first video and the first split video F #1.

That is, that the processor 301 determines what kind of the first subject c401 in each first split video and analyzes an area and composition occupied by the first subject c401 may be all processed by AI processing, and the first drone control signal and the first camera control signal may be provided as a result of AI processing.

The first drone control signal is a control signal for moving the drone 100 to a place where the drone 100 may photograph a second video similar to the first video in consideration of a size, enlargement magnification, and a focal length of the image sensor included in the first camera 41 and includes a location control signal for adjusting a distance between the second subject 2 and the drone 100 to be offset by a predetermined distance. Further, the first camera control signal includes a photographing control signal that controls enlargement magnification, a view angle, depth, and illuminance of the first camera.

Referring to FIG. 14, when the user 1 wants to photograph the second subject 2 using the drone 100, the UE 300 may recommend first to fourth contents c1, c2, c3, and c4 to the user 1 to recommend to photograph a reproduction video identical to or similar to that of the first to fourth contents c1, c2, c3, and c4. When the user 1 selects one of the first to fourth contents c1, c2, c3, and c4, the UE 300 analyzes the content and transmits a provided first drone control signal and first camera control signal to the drone 100. The drone 100 controls a posture to adjust the positional relationship with the second subject 2, and adjusts magnification, depth, and illuminance of the first camera 41 to photograph a second video identical to or similar to the content selected by the user.

As illustrated in FIG. 14, when the user 1 selects a movie "monster", which is the fourth content c4, the UE 300 analyzes the fourth content c4 with the first video and transmits a provided first drone control signal and first camera control signal to the drone 100.

When the drone 100 receives the drone control signal and the first camera control signal, the drone 100 performs preview photographing of the second subject 2. The drone 100 transmits a preview video of the second subject 2 to the UE 300. The UE 300 analyzes a preview video of the second subject 2 to determine whether the second subject 2 is the same type as that of the first subject c401. That is, because the first subject c401 was a person in the first split video F #1 included in the fourth content c4, the processor 301 determines whether the second subject is a person through the preview video of the second subject 2.

When the processor 301 determines that the second subject 2 is not a person, the UE 300 may display a GUI asking whether to photograph a reproduction video identical or similar to the fourth content c4 is correct and give a notification to the user 1. When the processor 301 determines that the second subject 2 is a person, the UE 300 transmits a confirmation signal of the second subject 2 to the drone 100 and enables the drone 100 to execute the previously transmitted first drone control signal and first camera control signal. The drone 100 adjusts a distance to the second subject 2 and a posture thereof by the first drone control signal, and adjusts a view angle, magnification, depth, and illuminance of the first camera by the first camera control signal, thereby preparing to photograph the second subject 2.

Because the second subject 2 is a person, the second subject 2 may move or move a place. In this case, the drone 100 may photograph a second video while tracking a movement, a movement direction, and a speed of the second subject 2. The moving direction and speed of the second subject 2 may be detected by the sensing unit 130 and/or the first camera 41 included in the drone 100, and the drone 100 calculates a moving direction and speed of the second subject 2 with a second subject movement vector value Vp. The drone 100 calculates a drone movement vector value Vd and a drone rotation vector value Vr for tracking the second subject 2. The controller 140 of the drone 100 may calculate the drone movement vector value Vd and the drone rotation vector value Vr, but the drone movement vector value Vd and the drone rotation vector value Vr may be calculated by the UE 300 and be transmitted to the drone 100. That is, when the drone 100 detects a movement of the second subject 2, the drone 100 transmits data on the movement of the second subject 2 to the UE 300, and the UE 300 may calculate a moving vector value Vp of the second subject 2 and calculate a drone moving vector value Vd and a drone rotation vector value Vr for tracking the second subject 2 by the drone 100 to transmit the values to the drone 100. In this case, the drone movement vector value Vd and the drone rotation vector value Vr calculated by the UE 300 may be added-up to the first drone control signal, and the drone 100 may track the second subject 2 by the first drone control signal. Accordingly, even when the second subject 2 moves, the drone 100 may photograph while tracking the second subject 2. Further, the UE 300 may add a photographing correction signal to the first camera control signal in consideration of a movement, a movement direction, and a speed of the second subject 2. Accordingly, even if the second subject 2 moves, the drone 100 may photograph a second video that gives a feeling identical to or similar to that of the first video while tracking the second subject 2.

The UE 300 may simultaneously output the second video and the first video by comparing the second video photographed through the first camera 41 with the first video, and the user 1 may compare and view the second video and the first video.

The processor 301 may split the second video into a plurality of second split videos in frames per second, and calculate a second area ratio occupied by the second object 2 in the second split video for each second split video. The processor 301 may compare the second area ratio with the first area ratio. In this case, the first area ratio and the second area ratio may be the same or similar. When the first area ratio and the second area ratio are similar, the second area ratio may be a value approximating the first area ratio, and an absolute value of a difference value between the first area ratio and the second area ratio may be set within 0.01.

This is because the UE 300 analyzes a focal length, enlargement magnification, a view angle, depth, and illuminance of the second camera used for photographing the first to fourth contents c1, c2, c3, and c4 to control the first camera 41 and the drone 100 so that the first camera photographs the second subject 2 with the same or similar focal length, enlargement magnification, view angle, depth, and illuminance.

Therefore, when using the UE 300 according to the present embodiment, the user 1 may photograph a reproduction video giving a feeling identical to or similar to that of the original video using the drone 100.

In analyzing the first video, the UE 300 according to the present embodiment may determine whether to perform zoom-in or zoom-out photographing of the first subject c401. That is, the processor 301 splits the first video into frames per second to obtain a plurality of first split videos, and calculates a first area ratio of the first subject c401 represented in each first split video. The processor 301 calculates a change amount in the first area ratio between the first split videos adjacent to each other.

If a change amount in the first area ratio between the first split videos adjacent to each other is more than twice, the processor 301 may determine that zoom-in photographing has been performed on the first subject c401. However, if the change amount in the first area ratio is 1/2 or less, the processor 301 may determine that zoom-out photographing has been performed on the first subject c401.

When the drone 100 photographs the second subject 2 using the first camera 41, in order to enable the first camera 41 to photograph the second subject 2 by zooming in or out to correspond to the zoom-in or zoom-out photographed section in the first video, the processor 301 provides a photographing control signal for zooming in or out adjustment of the first camera 41 to transmit the photographing control signal to the drone 100.

Further, the processor 301 may provide a location control signal for additionally adjusting a distance between the drone 100 and the second subject 2 in addition to the photographing control signal. This allows the drone 100 to locate closer to the second subject 2 or to move away from the second subject 2 when a zoom-in/zoom-out performance of the first camera 41 mounted in the drone 100 is inferior to that of the second camera.

For example, as a result of analyzing the first video by the processor 301, the zoom-in/zoom-out performance of the second camera used when photographing the first video is 8 times, but when the zoom-in/zoom-out performance of the first camera 41 mounted in the drone 100 is 4 times, the processor 301 may provide a location control signal so that the drone 100 flies closer the second subject 2 than an initial offset distance in a section where zoom-in photographing is required. By such a location control signal, the drone 100 may fly close to the second subject 2 to obtain a video identical to or similar to a photographing video zoomed in 8 times, even if the first camera 41 is zoomed in 4 times.

Conversely, in a section in which zoom-out photographing is required, the processor 301 may provide a location control signal so that the drone 100 flies farther away from the second subject 2 than an initial offset distance and compensate for lack of a zoom-in/zoom-out performance of the first camera 41 by distance adjustment.

In particular, the UE 300 and the processor 301 according to the present embodiment may be configured to perform artificial intelligence (AI) learning to analyze the first video and to provide a first drone control signal, a first camera control signal, a photographing control signal, and a location control signal according to the AI learning result. That is, when the processor 301 is implemented into an AI processor or includes an AI processing function, in analyzing the first video, the processor 301 may learn enlargement magnification, a view angle, a focal length, depth, and illuminance of the second camera used for photographing the first video and a type and composition of the first subject included in the first video by AI. Further, the processor 301 capable of performing AI processing may learn the overall hardware specification of the drone 100 and the first camera 41 by AI to extract drone data and photographing data necessary for photographing a second video, which is a reproduction video that gives a feeling identical to or similar to that of the first video. The processor 301 may provide a first drone control signal that adjusts a posture, a movement direction, and a speed of the drone 100 and a first camera control signal that adjusts enlargement magnification, a view angle, depth, and illuminance of the first camera 41 based on the extracted data.

The UE 300 according to the present disclosure may be configured to photograph a preview video of the second subject 2 using the first camera 41 mounted in the drone 100 and to provide a first drone control signal and a first camera control signal based on the photographed preview video.

When the processor 301 analyzes the first video through AI processing and provides a first drone control signal and a first camera control signal based on the analyzed first video, the first drone control signal and the first camera control signal are provided with only analysis data in a state in which the second subject 2 is not actually photographed and thus when the drone 100 actually photographs the second subject 2 by the first drone control signal and the first camera control signal, data somewhat different from data predicted by the processor 301 may be generated. The difference causes heterogeneity between the first video and the second video. Therefore, the UE 300 according to the present embodiment may be configured to preferentially photograph a preview video of the second subject 2 using the drone 100 and the first camera 301, and to provide a first drone control signal that controls a movement of the drone 100 and a first camera control signal that controls photographing of the first camera 301 based on the second area ratio calculated by calculating a second area ratio occupied by the second subject 2 in the preview video.

Further, data on a first video and a second video analyzed by the processor 301 may be stored in the first memory 303, and data generated in the drone 100 or information about the drone 100 may be stored in the first memory 303.

Data generated in the drone 100 includes all data related to the flight such as a speed, azimuth, altitude, yaw, pitch, roll, a remaining battery level, and the number of revolutions of each motor generated while the drone 100 is flying.

Further, information about the drone 100 includes information about overall hardware specifications of the drone comprising a model name, a size, a distance between diagonal axes, a battery number and capacity, a weight, a maximum takeoff weight, a maximum payload, a hovering accuracy range, a maximum angular speed, a maximum pitch angle, a maximum ascending speed, a maximum descending speed, a maximum speed, a maximum practical ascending altitude limit, a maximum wind speed capable of resisting wind, a maximum flight time for each payload, a motor model name, a propeller model name, presence or absence of a landing gear, an operating temperature, a type and model name of a mounted sensor, a wireless signal reception distance, and a pixel, magnification, and a view angle of a mounted camera of the drone 100. That is, the information about the drone 100 may mean information about the overall hardware specification of the drone 100.

Figure 18:
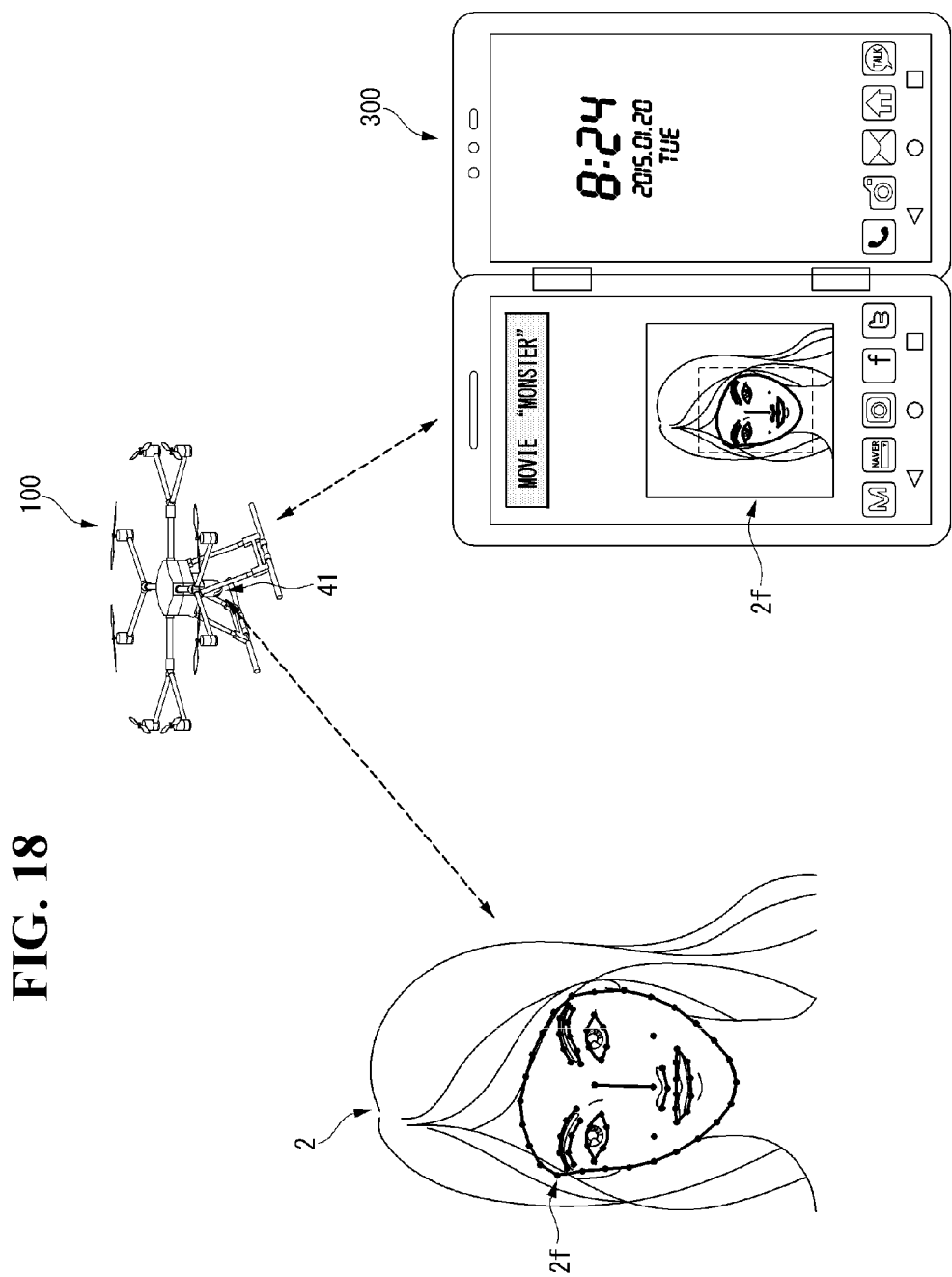
FIG. 18 is a diagram illustrating that a user equipment recognizes a face of a subject using a drone according to an embodiment of the present disclosure.

The UE 300 according to an embodiment of the present disclosure may recognize a face of the subject photographed by the drone 100 and control the drone 100 to recognize and track the face of the subject. The subject here may be a human, but it may be an animal. The UE 300 according to an embodiment of the present disclosure may recognize each face even when the subject is a human or an animal, and control the drone 100 to track and recognize the subject based on the recognized face. Referring to FIG. 18, this function will be described in more detail. FIG. 18 is a diagram illustrating that a UE recognizes a face of a subject using a drone according to an embodiment of the present disclosure.

Referring to FIG. 18, the drone 100 according to the present embodiment may photograph a face 2f of the second subject 2 using the first camera 41 and transmit the photographed face 2f to the UE 300. In this case, the first camera 41 may be configured to transmit an image in which a front face 2f of the second subject 2 is photographed to the UE 300. The UE 300 may recognize the transmitted front face 2f of the second subject 2 and store the front face 2f in the first memory 303, and the drone 100 may recognize the face 2f of the second subject 2 through the first camera 41 to control to photograph the second subject 2 while tracking the second subject 2.

Further, the UE 300 may compare a front face 2f image of the second subject 2 stored in the first memory 303 and a real-time image of the face 2f of the second subject 2 photographed by the first camera 41 while the drone 100 tracks the second subject 2 to control to move the drone 100 according to a moving speed of the second subject 2.

The user may arbitrarily adjust a location of the drone 100 so that the drone 100 may photograph a front face 2f of the second subject 2 while checking the face 2f of the second subject 2 output to the UE 300.

Further, in the present embodiment, data on the first video may be stored in the external server 200. Further, data on the first video may be stored in a web-based server or a cloud server in addition to the external server 200. Further, video data stored in the storage of the UE 300 may be used as an original video, i.e., a first video.

In this way, when an original video is input, the UE 300 according to an embodiment of the present disclosure analyzes the original video and controls to the drone 100 and the camera 41 mounted in the drone 100 to photograph a subject with a view angle, magnification, and a composition identical to or very similar to that of the original video.

Hereinafter, a drone control system according to another embodiment of the present disclosure will be described in detail with reference to FIGS. 19 to 25. In the description of a drone control system 60 according to another embodiment of the present disclosure, in order to avoid repeated descriptions, a detailed description of the same configuration as that of the UE 300 according to an embodiment of the present disclosure is omitted.

Figure 19:
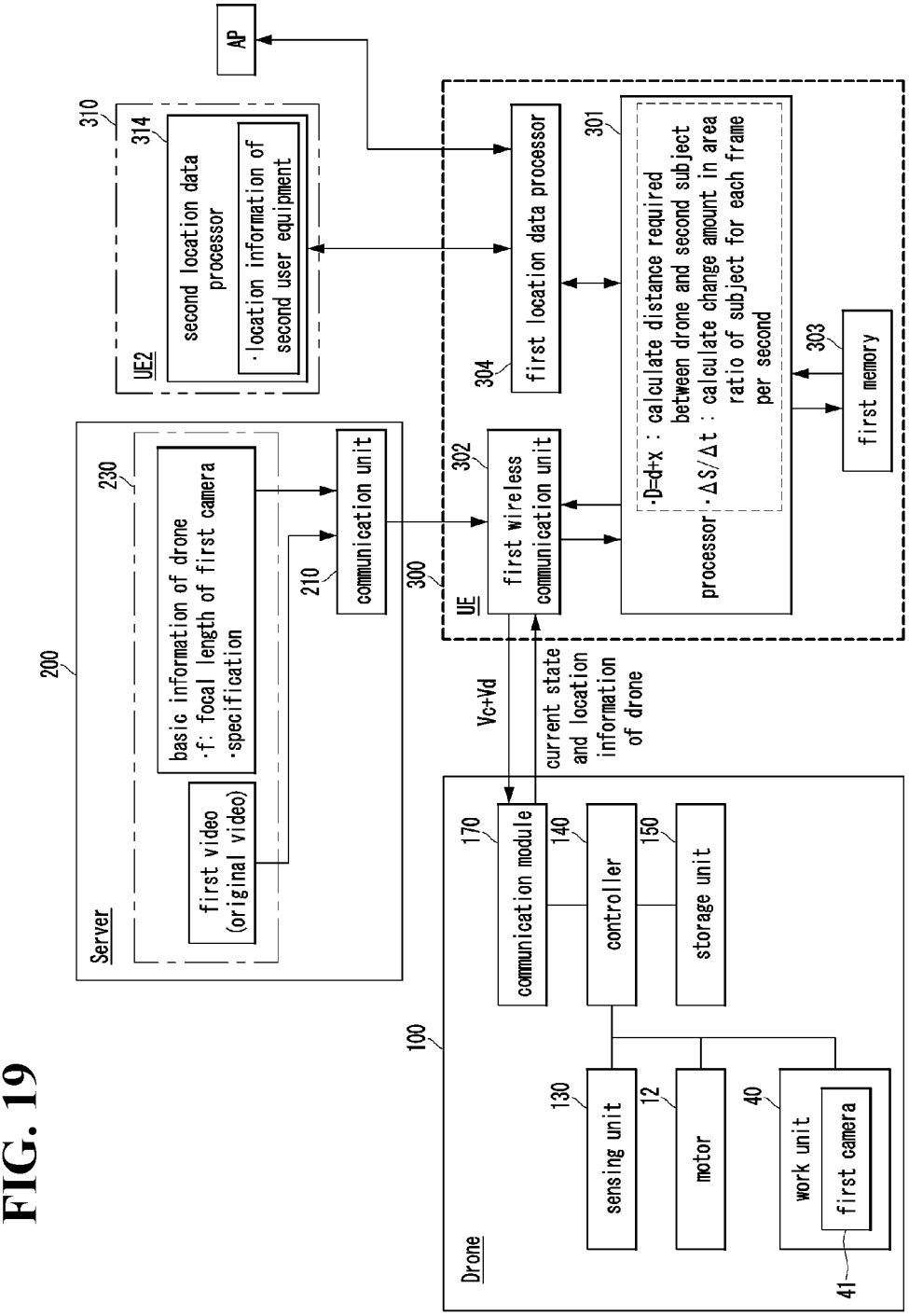
FIG. 19 is a block diagram illustrating a drone control system according to another embodiment of the present disclosure.

Referring to FIG. 19, the drone control system 60 according to another embodiment of the present disclosure includes a drone 100, an external server 200, and a plurality of UEs 300 and 310. FIG. 19 is a block diagram illustrating a drone control system according to another embodiment of the present disclosure.

The drone 100 has the same configuration as that of the above-described description with reference to FIG. 11.

The plurality of UEs 300 and 310 each include a first UE 300 used by a user and a second UE 310 used by a subject. Here, the subject means a second subject 2 appearing in a reproduction video (second video), and both the first UE 300 and the second UE 310 may include the same components.

The first UE 300 includes the same configuration as that of the UE 300 according to the above-described embodiment of the present disclosure. However, the first UE 300 further includes a first location data processor 304, compared with the UE 300 according to the above-described embodiment of the present disclosure. The first location data processor 304 generates location data of the first UE 300 and transmits the location data to the drone 100 and the second UE 310, and receives and processes the location data generated in the drone 100 and the second UE 310. Further, the first location data processor 304 may analyze and organize the location relationship between the first UE 300, the drone 100, and the second UE 310 based on the processed data.

As shown in FIG. 19, the second UE 310 also includes a second location data processor 314, and the second location data processor 314 is configured in the same manner as the first location data processor 304.

Further, a first camera 41 is mounted in the drone 100 according to the present embodiment, and the first UE 300 may control the flight of the drone 100 and an operation of the first camera 41 through data communication with the drone 100.

Further, when data on a first video, which is an original video are input, the first UE 300 according to the present embodiment analyzes enlargement magnification and a view angle of the second camera used for production of the first video and a composition of the first subject included in the first video.

To this end, the first UE 300 splits the first video into frames per second to make a plurality of first split videos, and calculates a first area ratio occupied by the first subject for each first split video.

In addition, the first UE 300 receives a video in which the second subject is photographed from the drone 100 and splits the second video into frames per second to make a plurality of second split videos and calculates a second area ratio occupied by the second subject for each second split video. If a change amount in the first area ratio is greater than or equal to a first criterion in a specific section of the first video, the first UE 300 may determine that zoom-in photographing has been performed on the first subject, and if a change amount in the first area ratio is less than or equal to a second criterion in the specific section of the first video, the first UE 300 may determine that zoom-out photographing has been performed on the first subject. The first criterion may be set to a case where the change amount in the area ratio is 2 times or more, but it is not limited thereto and may be changed by a user or a manager. Further, the second criterion may be set to a case where the change amount in the area ratio is 1/2 or less, but it is not limited thereto and may be changed by a user or a manager.

Analysis of the first video and the second video may be performed by AI processing, and to this end, the first UE 300 may include a processor 301 capable of performing AI processing or may include a separate AI module.

The first UE 300 provides a control signal for the drone 100 and a control signal for the first camera 41 and transmits the control signals to the drone 100. The drone 100 and the first camera 41 photograph a second subject 2 by the control signal to generate a second video, which is a reproduction video giving a feeling identical to or similar to that of the first video.

Further, while analyzing the first video, the first UE 300 may identify a section including a zoom-in or zoom-out photographing technique, provide a photographing control signal so that the first camera may perform zoom-in or zoom-out photographing, and transmit the photographing control signal to the drone 100 to photograph the second object 2.

The control signal for the drone 100 is a signal for controlling a movement of the drone 100 so that the drone 100 may be offset by a predetermined distance from the second subject 2, and more specifically, the control signal for the drone 100 is a control signal that moves the drone 100 to a location that can photograph the second subject with enlargement magnification, a view angle, and a composition identical to or similar to enlargement magnification, a view angle, and a composition used when the second camera photographs the first subject included in the first video.

The control signal for the first camera 41 is a control signal that sets the first camera 41 to have enlargement magnification, a view angle, and composition identical to or similar to enlargement magnification, a view angle, and composition used when photographing the first subject included in the first video.

When the second subject 2 moves, the drone 100 is configured to photograph while tracking the second subject 2, and the drone 100 may be configured to recognize a face of the second subject 2 in order to recognize and track the second subject 2. The drone 100 may be configured to recognize the face of the second subject 2 through the sensing unit 130, but may also be configured to recognize the face of the second subject 2 through the first camera 41. Further, the drone 100 may be configured to track the second subject 2 by recognizing not only the face of the second subject 2 but also a portion capable of representing the characteristics of the second subject 2.

Further, the second subject 2 may be at least one of a user using the system 60 according to the present embodiment, an object designated by a user, a plurality of objects including a user, and a plurality of objects excluding the user. That is, in order to generate a reproduction video identical to or similar to the original video by photographing another person or another object, the user may use the system 60 according to the present embodiment and use the system 60 according to the present embodiment in order to photograph a user's own selfie. Further, when the system 60 according to the present embodiment is used, all of a plurality of second subjects including a user and another person may be used for photographing a reproduction video (second video), and a plurality of other persons, except for the user may be used for photographing a reproduction video. In all of these cases, the user may remotely control the drone 100 using the first UE 300. Further, when the user's setting is input to the first UE 300, even if the user no longer carries the first UE 300, the drone 100 photographs the second subject 2 while automatically adjusting a distance to the second subject 2. In particular, the system 60 according to the present embodiment achieves the enlargement effect and the distance change effect used in the original video through a movement of the drone 100 and a setting change of the first camera 41 in order to reproduce a feeling identical to or similar to that of the original video when photographing a reproduction video. Therefore, even if the first camera 41 mounted in the drone includes different hardware from that of a camera photographed the original video, the first camera 41 may photograph a reproduction video that gives a feeling almost similar to that of the original video.

The external server 200 may include a communication unit 210 and a storage unit 230 and perform data communication with the first UE 300 and the second UE 310 through the communication unit 210. The external server 200 may include a storage unit 230 that stores data on the first video, and the storage unit 230 also stores information about overall hardware specifications for the drone 100 in addition to the data on the first video.

Therefore, the first UE 300 may use video data stored in the first memory 303 therein as a first video, but download a video stored in the storage unit 230 of the external server 200 and use the video as a first video. When information about hardware specifications of the drone 100 is not stored in the memory of the first UE 300, the first UE 300 may be configured to access the storage unit 230 of the external server 200 to collect information about the hardware specifications of the drone 100.

Hereinafter, a scenario in which the drone control system 60 according to the present embodiment photographs a reproduction video will be described in detail with reference to FIGS. 20 to 22.

Figure 20:
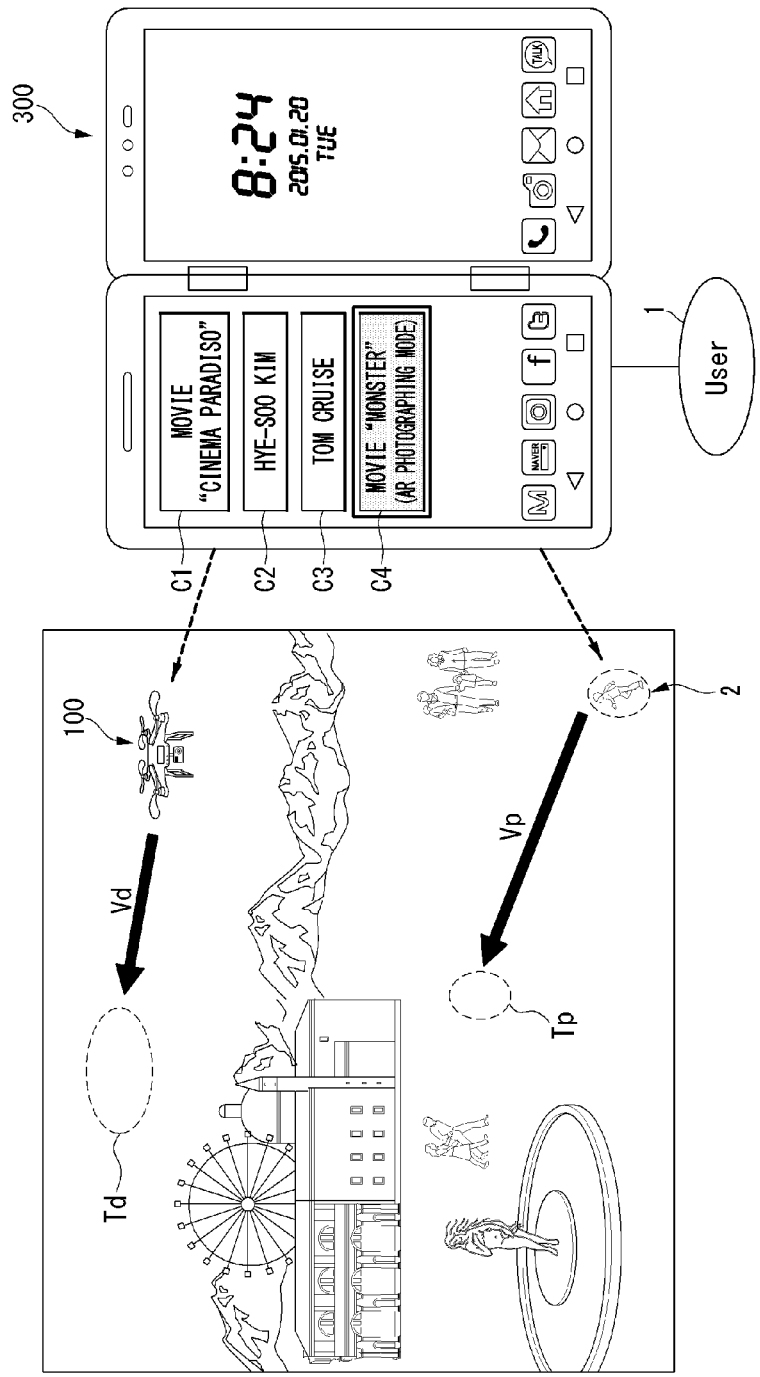
FIGS. 20 and 21 are conceptual diagrams illustrating that a drone control system photographs a reproduction video according to another embodiment of the present disclosure.
Figure 21:
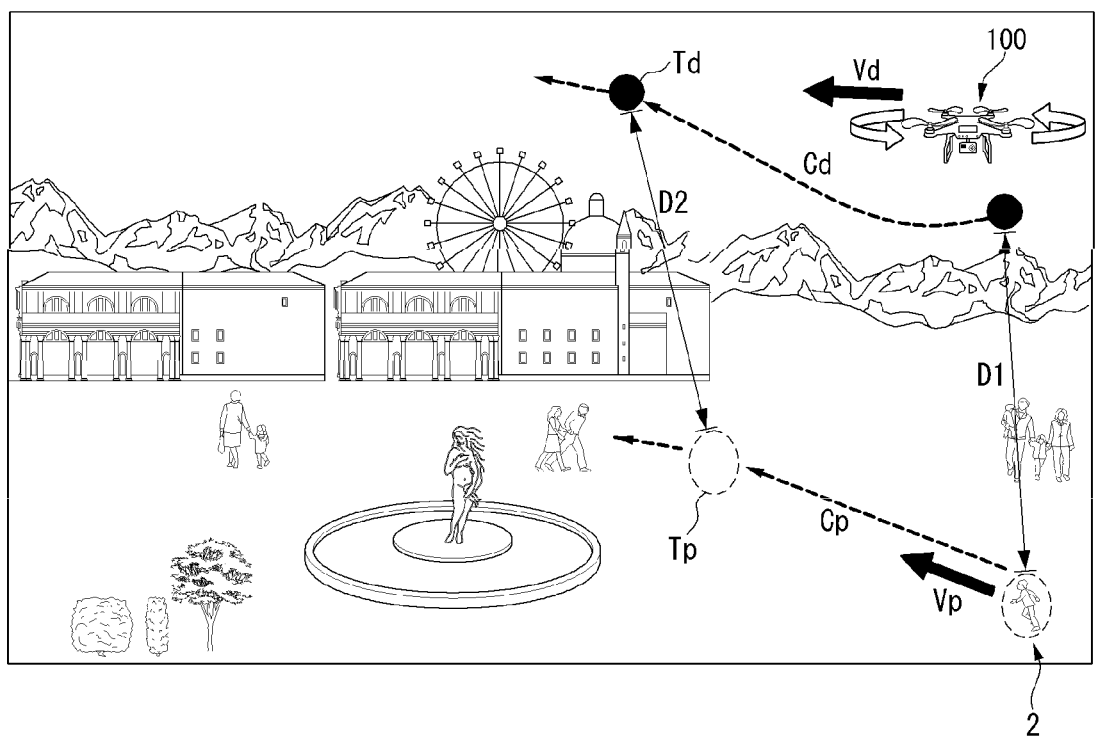

FIGS. 20 and 21 are conceptual views illustrating that a drone control system photographs a reproduction video according to another embodiment of the present disclosure.

Figure 22:
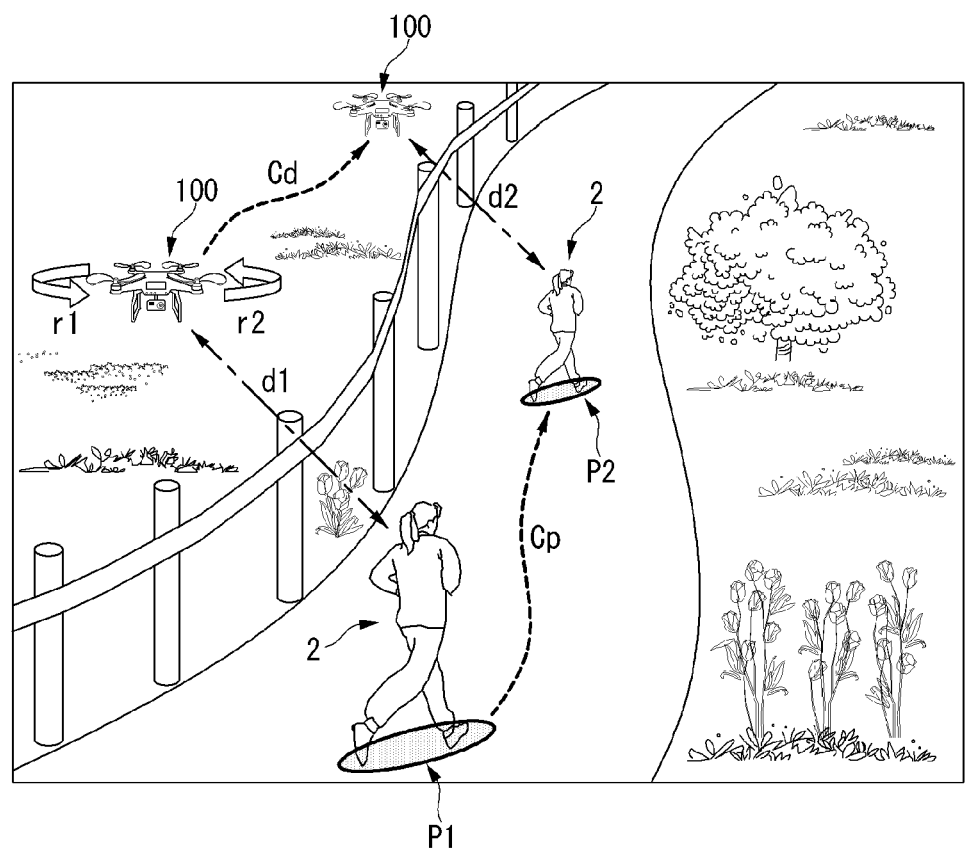
FIG. 22 is a conceptual diagram illustrating that a drone control system adjusts a distance between a moving subject and a drone according to another embodiment of the present disclosure.

Further, FIG. 22 is a conceptual diagram illustrating that a drone control system adjusts a distance between a moving subject and a drone according to another embodiment of the present disclosure.

Referring to FIG. 20, the UE 300 may recommend to the user 1 to use first to fourth contents c1, c2, c3, and c4 stored therein as an original video (first video). However, the UE 300 may recommend video data stored in the external server 200 to the user 1. When the user 1 selects the video data stored in the external server 200 to select to photograph the reproduction video (second video), the user 1 may download the video data stored in the external server 200 to the first UE 300 and use the video data as the first video, but the user 1 may also use the video data as the first video through a streaming method in a state in which video data stored in the external server 200 are downloaded. However, hereinafter, an example of downloading video data stored in the external server 200 to the first UE 300 and using the video data as the first video will be described.

The user 1 may download video data stored in the external server 200 to the first UE 300, and the first UE 300 may display the video data as a fourth content c4, as illustrated in FIG. 20.

When the user 1 selects the fourth content c4 as an original video, the first UE 300 may display a GUI requesting to designate the second subject 2 to be included in the reproduction video. In this case, the second subject 2 may be designated using the camera mounted in the UE 300, but the first camera 41 mounted in the drone 100 may be controlled to photograph a preview video of the second subject 2. When photographing the preview video, the drone 100 may recognize the face of the second subject 2, and the first UE 300 may recognize the face of the second subject 2 in the preview video transmitted from the drone 100.

When the first UE 300 recognizes the second subject 2, a direction Vp and a location Tp in which the second subject 2 is to move may be displayed on the display of the first UE 300 and the second UE 310. Further, the first UE 300 may also display both a direction and location in which the user 1 is to move.

A method of displaying a direction Vp and a location Tp in which the second subject 2 is to move may be represented in the form of a path on an electronic map. However, the direction Vp and the location Tp in which the second subject 2 is to move may be represented with an overlapping method in the actually photographing video.

The first UE 300 analyzes the first video, which is the original video selected by the user 1 to provide a first drone control signal and a first camera control signal and to transmit the first drone control signal and the first camera control signal to the drone 100. The drone 100 is located to be offset by a predetermined distance from the second subject 2 by the first drone control signal, and is changed to a setting for photographing the second subject 2 by the first camera control signal.

The first drone control signal includes a direction Vd in which the drone 100 is to move while photographing the second subject 2 as a vector value and includes a destination in which the drone 100 is to move as location data Td. The first camera control signal may include a setting value for adjusting enlargement magnification, a view angle, depth, and illuminance.

Thereafter, as illustrated in FIG. 20, when the second subject 2 moves in a direction Vp, the drone 100 flies to coordinates in which the location data Td indicates while tracking the second subject 2 according to a vector value Vd.

A path in which the second subject 2 actually moves may be a path Cp, as illustrated in FIG. 21. Because the drone 100 may recognize and track the second subject 2, the drone 100 may fly along the path Cp in which the second subject 2 actually moves, and in this case, an actual flight path of the drone 100 may be Cd. However, even if the drone 100 flies along the path Cd, the first camera 41 continuously adjusts enlargement magnification, a photographing view angle, depth, and illuminance of the second subject 2 by the first camera control signal.

Further, when the first UE 300 determines that it is impossible to photograph the second subject 2 only by changing the setting of the first camera 41, the first UE 300 controls the drone 100 to adjust in real time a distance D between the drone 100 and the second subject 2.

That is, as a moving direction and a speed of the second subject 2 are changed, when it is necessary to change a moving direction and a speed of the drone 100 or when the first camera 41 is compared with the second camera photographed the original video, if enlargement magnification or depth adjustment is additionally required when photographing the second subject 2 due to a difference in hardware, the first UE 300 may adjust in real time a distance D between the drone 100 and the second subject 2. Accordingly, as illustrated in FIG. 22, while the second subject 2 moves from a first location p1 to a second location p2, when a moving direction and a moving speed are continuously changed, the drone 100 may change a distance d1 to the second subject 2 at the first location p1 to be different from a distance d2 to the second subject 2 at a second location p2 to photograph the second subject 2.

Further, even if the first camera 41 is different in hardware from the second camera photographed the original video, it may be difficult to photograph the second subject 2 only by adjusting enlargement magnification or depth of the first camera 41 and thus the drone 100 may change a distance d1 to the second subject 2 at the first location p1 to be different from a distance d2 to the second subject 2 at the second location p2 to photograph the second subject 2.

The drone 100 may calculate a distance to the second subject 2 to perform distance adjustment to the second subject 2, but the drone 100 may transmit data on a distance between the drone 100 and the second subject 2 to the UE 100, and distance adjustment between the drone 100 and the second subject 2 may be performed by a flight control signal provided in the UE 100.

The drone control system 60 according to the present embodiment may include at least one AP capable of performing wireless communication with each of the drone 100, the first UE 310, and the second UE 320. The AP may communicate with the drone 100, the first UE 310, and the second UE 320 using an IEEE 802.11mc protocol, and hereinafter, a scenario in which the drone control system 60 according to the present embodiment measures a location of the drone and the UE using an access point will be described with reference to FIGS. 23 and 24.

Figure 23:
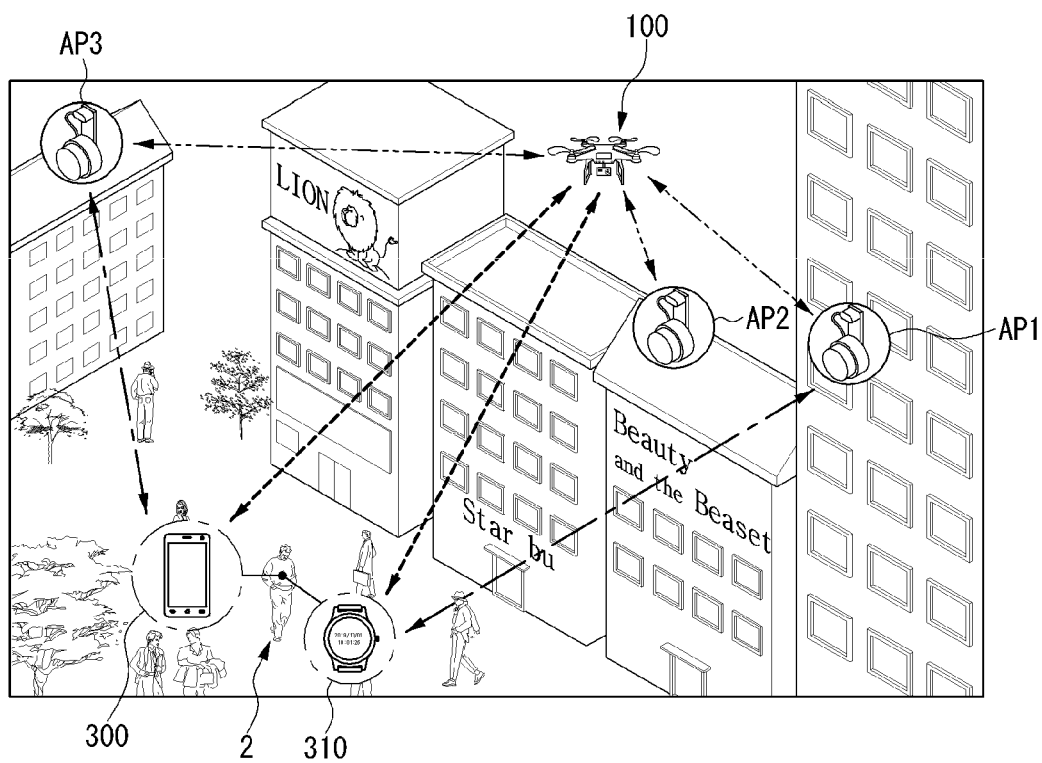
FIG. 23 is a conceptual diagram illustrating that a drone control system measures a location of a subject and a drone using a nearby access point according to another embodiment of the present disclosure.
Figure 24:
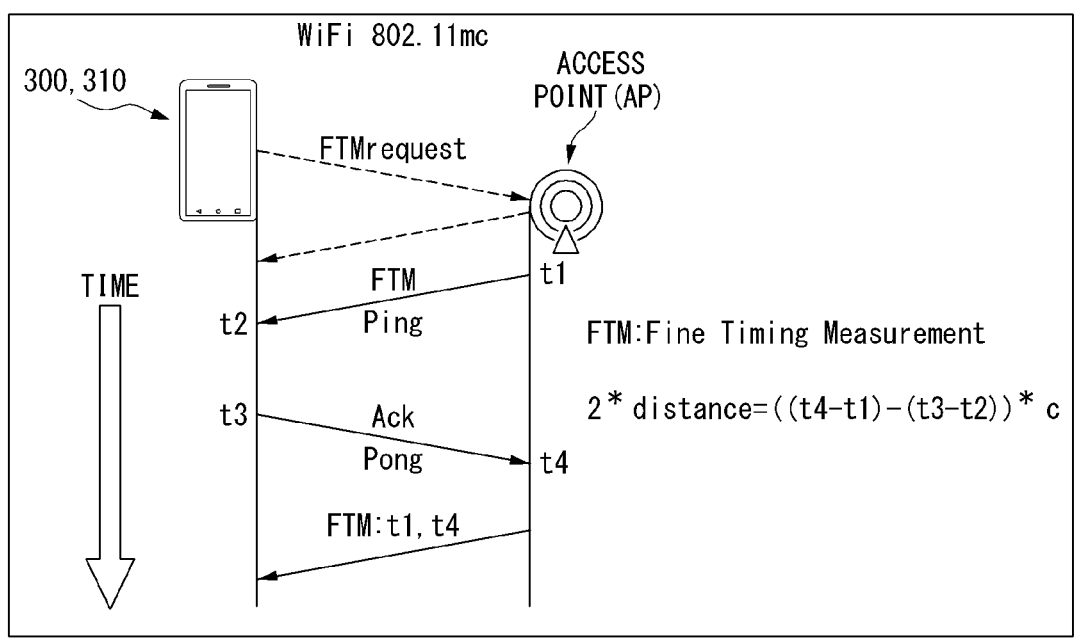
FIG. 24 is a conceptual diagram for a WiFi 802.11mc communication standard used by a drone control system according to another embodiment of the present disclosure.

FIG. 23 is a conceptual diagram illustrating that a drone control system measures a location of a subject and a drone using a nearby access point according to another embodiment of the present disclosure, and FIG. 24 is a conceptual diagram for a WiFi 802.11mc communication standard used by a drone control system according to another embodiment of the present disclosure.

Referring first to FIG. 23, a plurality of access points AP1, AP2, and AP3 may be distributedly disposed in a specific area. The drone 100, the first UE 300 and the second UE 310 may perform data communication with the access points AP1, AP2, and AP3, respectively.

Referring to FIG. 24, a communication method of the IEEE 802.11mc protocol is disclosed, and by measuring a time interval in which the AP and the UEs 300 and 310 transmit and receive signals to each other, a distance between the AP and the UEs 300 and 310 is measured. That is, by a Round Trip Time (RTT) method of calculating a distance by measuring a time in which a signal transmitted from the UEs 300 and 310 is returned to the UEs 300 and 310 via the AP, a distance between the UEs 300 and 310 and the AP is measured. Accordingly, while the UEs 300 and 310 and the drone 100 illustrated in FIG. 23 exchange signals with a plurality of access points AP1 and AP2, and AP3, the UEs 300 and 310 and the drone 100 calculate a distance to each of the access points AP1, AP2, and AP3.

Further, by using a triangulation method between at least two access points AP1, AP2, and AP3 and the UE or the drone, locations of the UEs 300 and 310 and the drone 100 are calculated in real time. Therefore, a system 60 according to the present embodiment may measure precise locations of the drone 100 and the UEs 300 and 310 indoors and outdoors. Through such precise location measurement, the system 60 according to the present embodiment may remotely and automatically photograph the second subject 2 using the drone 100 not only outdoors but also indoors.

The UEs 300 and 310 and the drone 100 may generate GPS coordinate correction data thereof based on location data measured using the AP, also generate GPS coordinate correction data on other devices, and transmit the correction data to other devices. Therefore, location measurement of the UEs 300 and 310 and the drone 100 may be performed very precisely.

Figure 25:
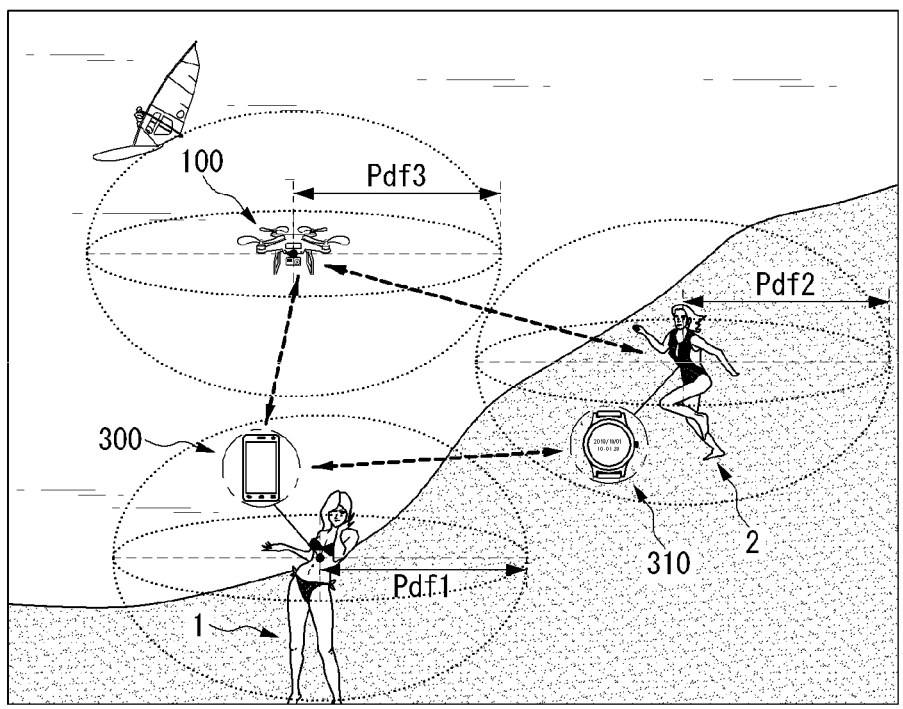
FIG. 25 is a conceptual diagram illustrating that a drone control system measures a location of a subject and a drone through communication with a user equipment according to another embodiment of the present disclosure.

However, even when there is no AP, the drone control system 60 according to the present embodiment may measure a distance between devices through communication between different devices, and measure a location of each device based on such distance measurement. Referring to FIG. 25, when there is no AP, a method will be described in which a UE and a drone measure each location. FIG. 25 is a conceptual diagram illustrating that a drone control system measures a location of a subject and a drone through communication with a UE according to another embodiment of the present disclosure.

Referring to FIG. 25, the UEs 300 and 310 and the drone 100 communicate with each other using the IEEE 802.11mc protocol, and as illustrated in FIG. 24, the UEs 300 and 310 and the drone 100 may measure a time at which a ping signal is transmitted and received, and measure a distance therebetween. That is, while the first UE 300, the second UE 310, and the drone 100 exchange a ping signal with each other, the first UE 300, the second UE 310, and the drone 100 measure a time at which the corresponding signal is transmitted and received, thereby measuring a distance between the first UE 300, the second UE 310, and the drone 100.

Although the first UE 300 has previously generated data on GPS coordinates, a predetermined error range is allowed and thus the first UE 300 includes an error Pdf1 of a first GPS coordinate, as illustrated in FIG. 25. This is applied to both the second UE 310 and the drone 100, the second UE 310 includes an error Pdf2 of a second GPS coordinate, and the drone 100 includes an error Pdf3 of a third GPS coordinate. In this case, the first UE 300, the second UE 310, and the drone 100 may correct GPS location coordinate errors thereof through two different devices and triangulation.

For example, as illustrated in FIG. 25, while the first UE 300 communicates with each of the second UE 310 and the drone 100 using the IEEE 802.11mc protocol, the first UE 300 gives and receives a ping signal to and from the second UE 310 and the drone 100. The first UE 300 measures a time in which the ping signal transmitted to the second UE 310 returns to the first UE 300 to measure a distance between the first UE 300 and the second UE 310 by a round trip time (RTT) method. The first UE 300 measures a time in which the ping signal transmitted to the drone 100 returns to the first UE 300 to measure a distance between the first UE 300 and the drone 100 by the RTT method.

The first UE 300 applies a triangulation method to a distance between the first UE 300 and the second UE 310, a distance between the first UE 300 and the drone 100, an azimuth angle between the first UE 300 and the second UE 310, and an azimuth angle between the first UE 300 and the drone 100 to derive location data of the first UE 300. By applying the derived location data to the error Pdf1 of the first GPS coordinates, accurate location coordinates of the first UE 300 are calculated. That is, location data of the first UE 300 derived by the triangulation method become a correction value for the error Pdf1 of the first GPS coordinates.

Such a method is equally applied to both the error Pdf2 of the second GPS coordinates of the second UE 310 and the error Pdf3 of the third GPS coordinates of the drone 100.

Therefore, when using the drone control system 60 according to the present embodiment, it is possible to accurately measure location coordinates of the drone 100 and the UE 300 and thus reproduction videos of the original videos for the second subject 2 may be easily photographed using the drone 100 even indoors.

Hereinafter, a method of controlling a drone using a UE and/or a system according to an embodiment of the present disclosure will be described in detail with reference to FIGS. 26 to 37. In describing the drone control method according to the present disclosure, in order to avoid repeated descriptions, a detailed description of the same configuration as that of the UE 300 according to an embodiment of the present disclosure will be omitted.

Figure 26:
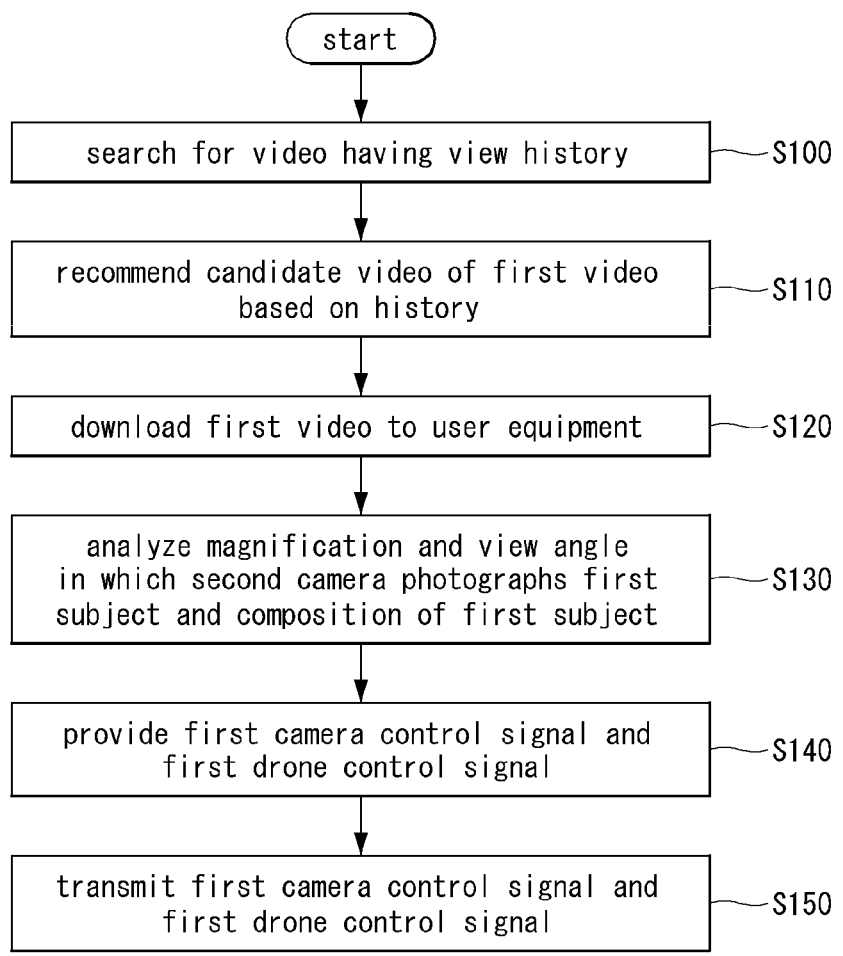
FIG. 26 is a flowchart illustrating a method of controlling a drone using a user equipment according to an embodiment of the present disclosure.

FIG. 26 is a flowchart illustrating a method of controlling a drone using a UE according to an embodiment of the present disclosure. As illustrated in FIG. 26, the UE 300 may search for a history of a video viewed by the user 1, a video found by the user 1 using the web, and a video found or viewed by the user 1 through a social networking service (SNS) (S100) and recommend a candidate video of the first video to be an original video to the user 1 based on the viewing history derived through the search result (S110).

The user 1 may select a video recommended by the UE 300. However, in addition to the recommended video, the user 1 may select a video directly found by the user 1 on the web or a video previously stored in the UE 300.

When the user 1 selects a video, the UE 300 downloads data on the video from a place where the video is stored (S120). For example, when the video selected by the user 1 is in the external server 200, as illustrated in FIG. 13, the UE 300 downloads a first video to be the original video from the external server 200 (S120).

The UE 300 analyzes the downloaded first video to analyze enlargement magnification, a view angle, depth, and illuminance of a second camera used for photographing the first video, which is the original video and analyzes a composition of the first subject included in the first video (S130). The first subject is an object to be photographed in the original video, and includes all of various objects such as humans, animals, objects, and natural landscapes.

The UE 300 sets a first camera control signal that sets enlargement magnification, a view angle, depth, and illuminance of the first camera to photograph the reproduction video (second video) based on the result of analyzing the first video (S140). In this case, the first camera 41 is a camera mounted in the drone 100, as illustrated in FIG. 12. Further, when the first camera photographs the second subject (i.e., an object to be photographed in the second video), the first camera control signal means a signal that controls the first camera to photograph the second subject with enlargement magnification, a view angle, depth, and illuminance identical to or similar to enlargement magnification, a view angle, depth, and illuminance used by the second camera when photographing the first video.

Further, the UE 300 provides a first drone control signal for moving the drone 100 to a location capable of photographing the second subject 2 (S140). The first drone control signal is a control signal provided based on a result of analyzing the first video by the UE 300. When the first camera 41 compares with the second camera, if there is a difference in a hardware configuration, when the second video is photographed using the first camera 41, the second video may give a feeling much different from that of the first video or generate a different effect. Accordingly, in order to minimize the difference between these effects, the first drone control signal is a control signal that controls the drone 100 so that the drone 100 and the second subject 2 are offset by a predetermined distance so as to adjust a distance between the second subject 2 and the first camera 41.

The UE 300 transmits the generated first drone control signal and first camera control signal to the drone 100 (S150), and the drone 100 may photograph the second subject 2 while moving as illustrated in FIGS. 20 and 21 by these control signals.

Figure 27:
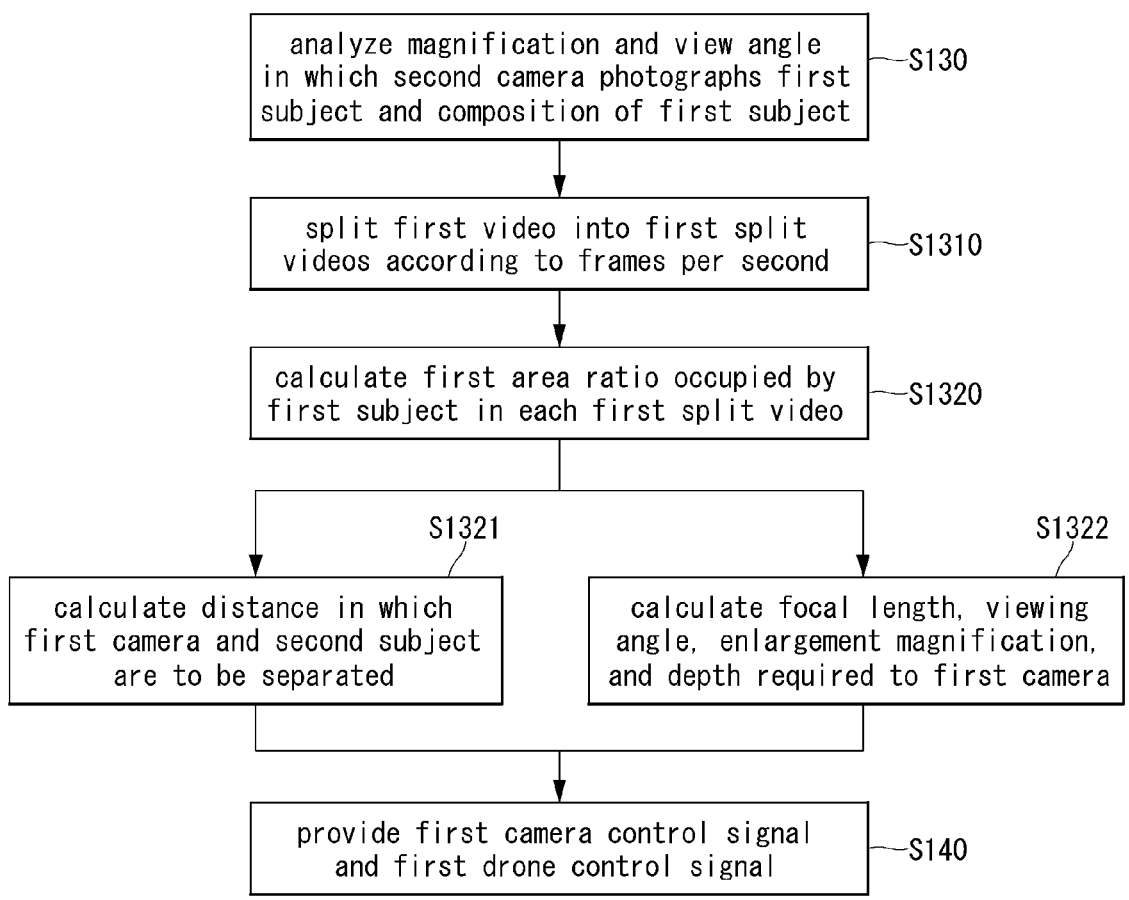
FIG. 27 is a flowchart illustrating a process of analyzing an original video by a user equipment according to an embodiment of the present disclosure.
Figure 28:
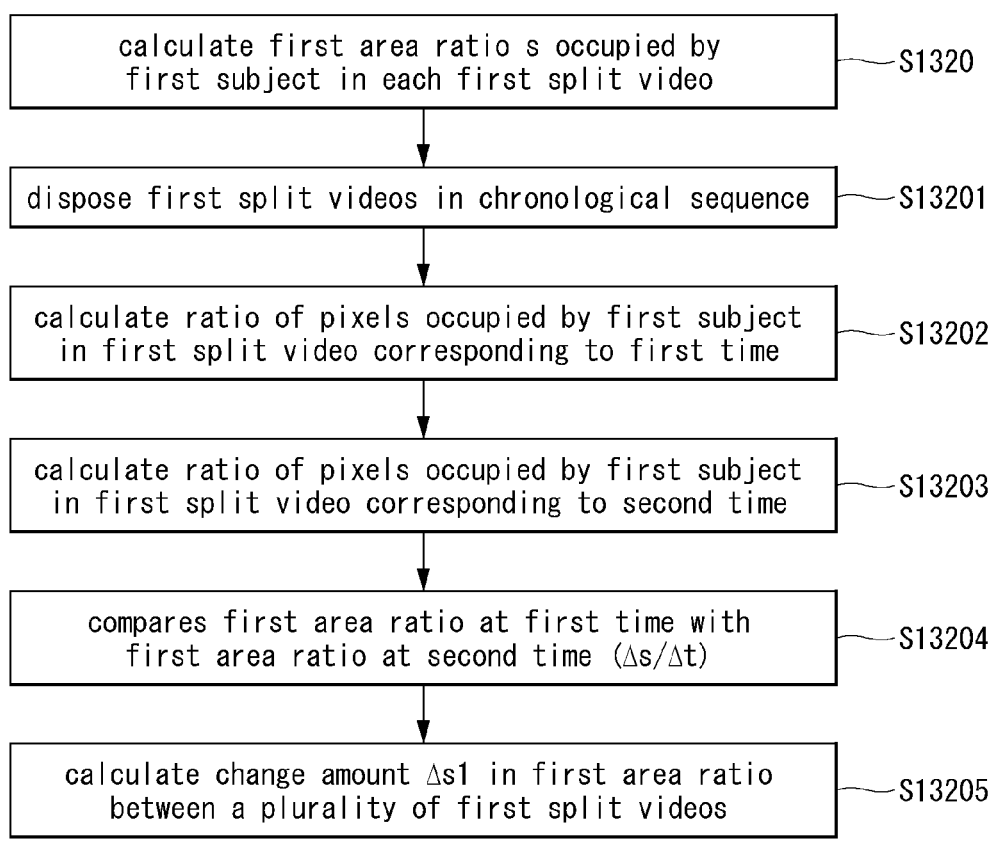
FIG. 28 is a flowchart illustrating a method in which a user equipment calculates a change amount in which an area ratio occupied by a subject in an original video sequentially changes according to an embodiment of the present disclosure.
Figure 29:
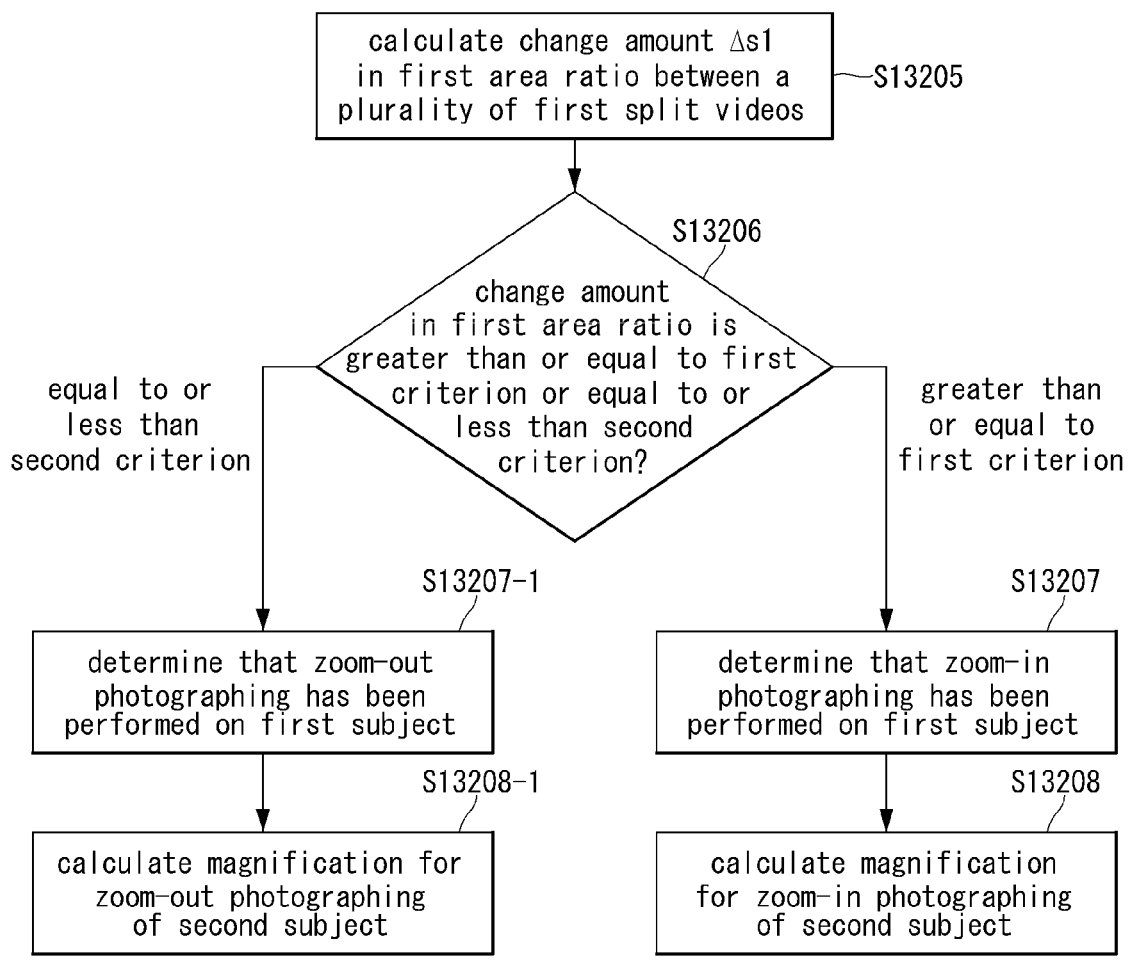
FIG. 29 is a flowchart illustrating a method in which a user equipment analyzes a zoom-in or zoom-out scene included in an original video according to an embodiment of the present disclosure.
Figure 30:
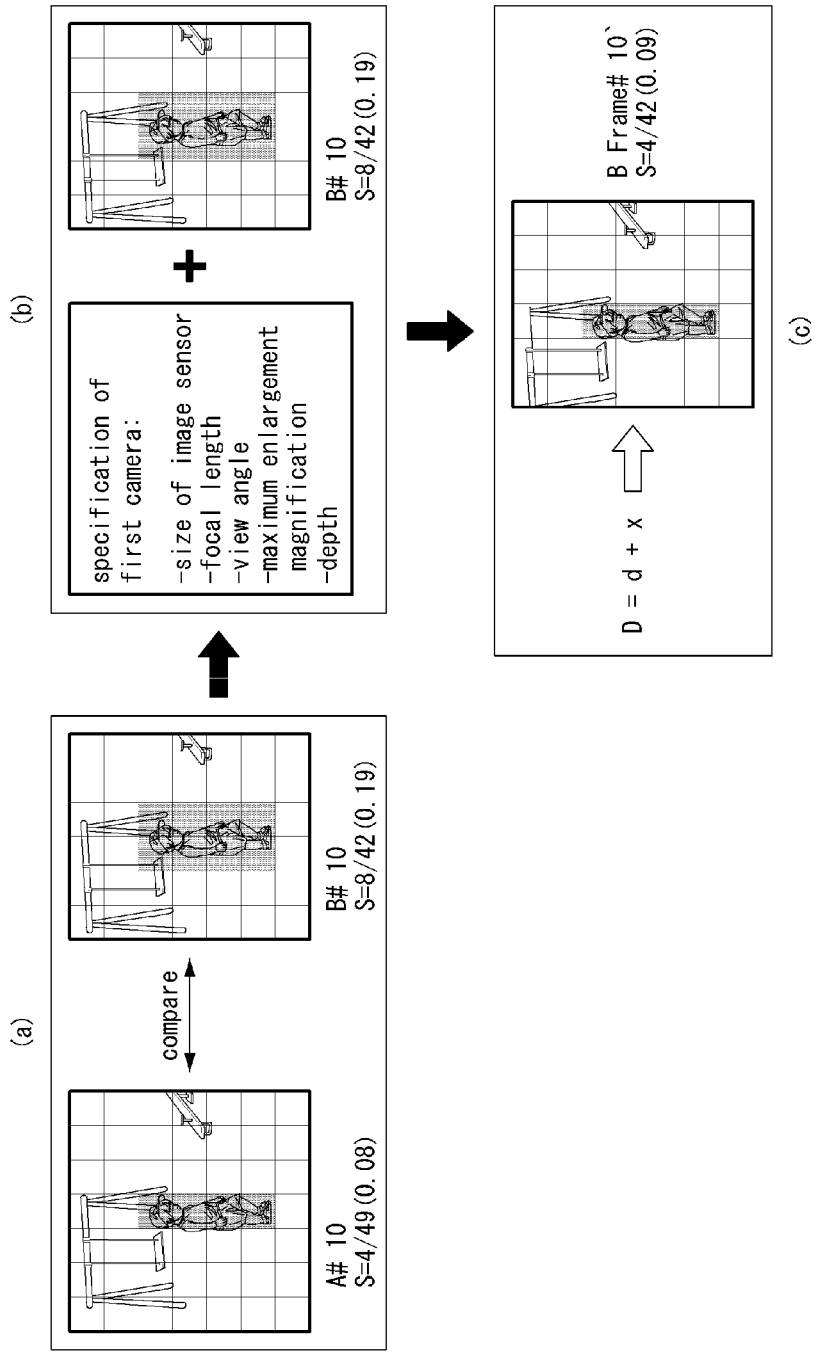
FIG. 30 is a conceptual diagram illustrating that a user equipment splits an original video into frames per second and analyzes the video according to an embodiment of the present disclosure.
Figure 31:
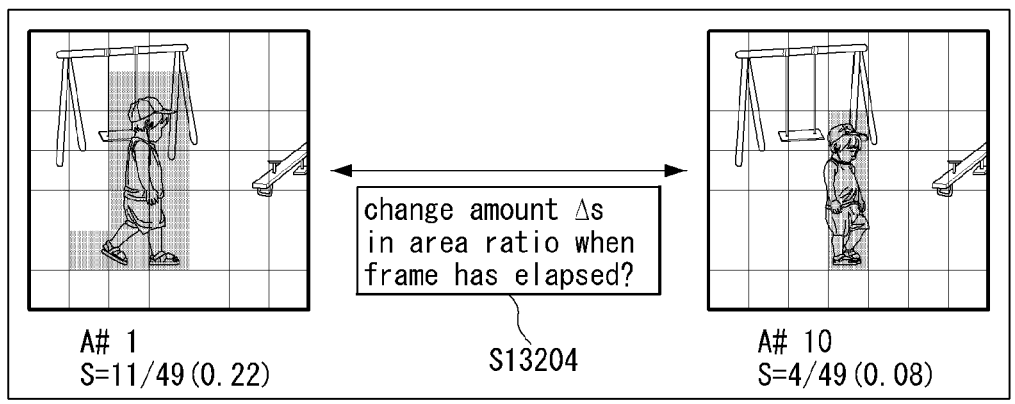
FIG. 31 is a conceptual diagram illustrating a method in which a user equipment calculates a change amount in which an area ratio occupied by a subject in an original video sequentially changes according to an embodiment of the present disclosure.
Figure 32:
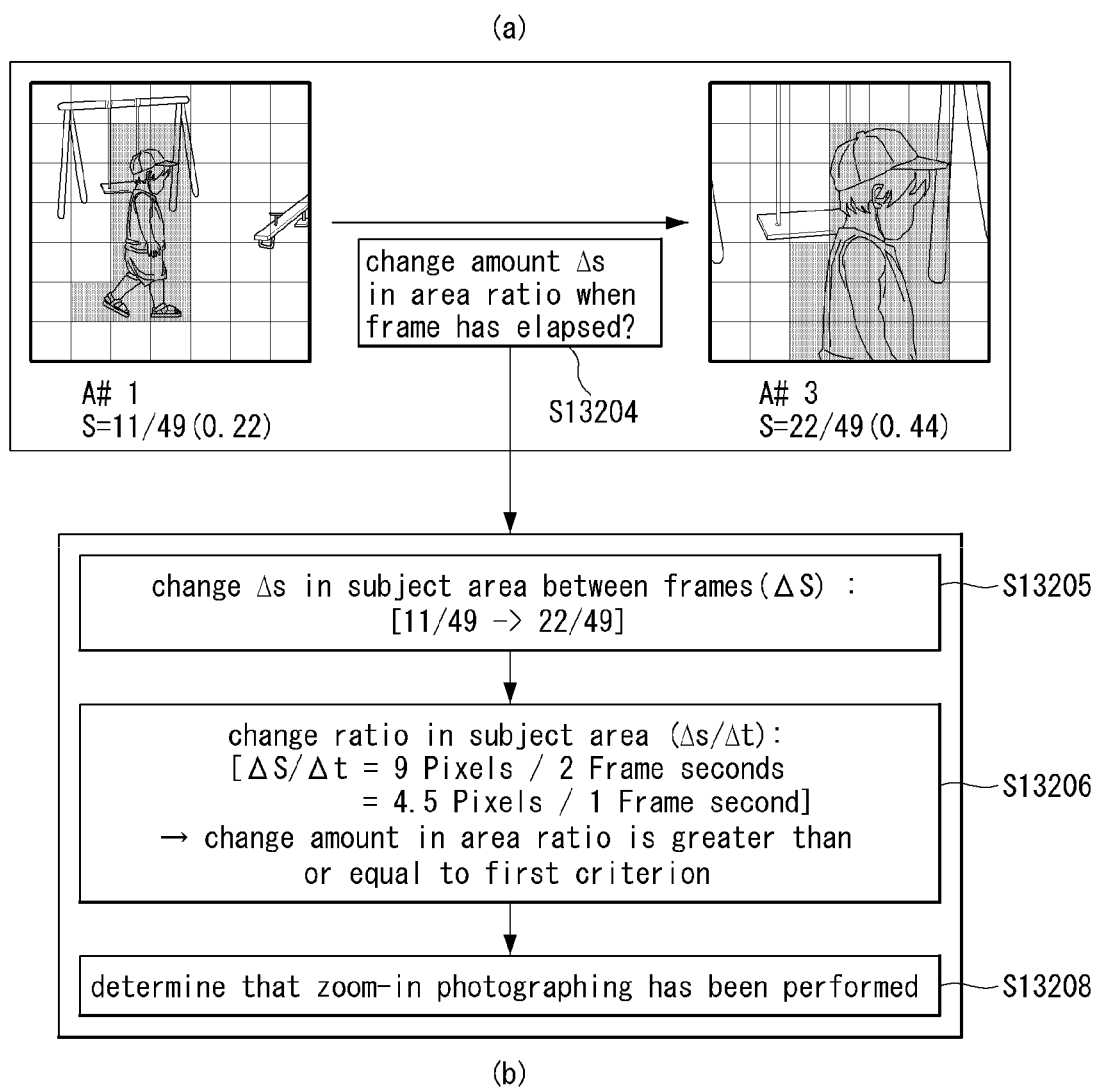
FIG. 32 is a conceptual diagram illustrating that a user equipment analyzes a zoom-in scene included in an original video according to an embodiment of the present disclosure.

Referring to FIGS. 27 to 32, a process of analyzing the first video by the UE 300 will be described in detail. FIG. 27 is a flowchart illustrating a process in which a UE analyzes an original video according to an embodiment of the present disclosure, FIG. 28 is a flowchart illustrating a method in which a UE calculates a change amount in which an area ratio occupied by a subject in the original video sequentially changes according to an embodiment of the present disclosure, and FIG. 29 is a flowchart illustrating a method of analyzing a zoom-in or zoom-out scene included in an original video by a UE according to an embodiment of the present disclosure. Further, FIG. 30 is a conceptual diagram illustrating that a UE analyzes a video by dividing an original video into frames per second according to an embodiment of the present disclosure, and FIG. 31 is a conceptual diagram illustrating a method in which a UE calculates a change amount in which an area ratio occupied by the subject in the original video sequentially changes according to an embodiment of the present disclosure. FIG. 32 is a conceptual diagram illustrating that a UE analyzes a zoom-in scene included in an original video according to an embodiment of the present disclosure.

In step S130, the UE 300 splits a first video into frames per second to generate a plurality of first split videos (S1310). Referring to FIG. 30(*a*), the UE 300 may determine a first split video A #10 corresponding to a 10th frame among a plurality of first split videos generated by dividing the first video into frames per second. The first split videos may be temporarily stored in the first memory 303 and be deleted without being stored in a storage space after a video analysis operation.

The UE 300 calculates an area ratio occupied by the first subject in the first split video (S1320). In this case, an area ratio occupied by the first subject in the first split video may be referred to as a first area ratio. Referring to FIG. 30(*a*), an area occupied by the first subject in the tenth first split video is four pixel areas of 49 pixels. Therefore, S becomes 0.08. S denotes an area ratio occupied by the subject in the split video.

In this way, the UE 300 may analyze an area occupied by the first subject for each first split video split for each frame per second.

Further, as illustrated in FIG. 27, the UE 300 calculates a focal length, a view angle, enlargement magnification, depth, and illuminance required when the first camera 41 photographs the second subject 2 using the calculated first area ratio (S1321).

A video of the second subject 2 photographed by the first camera 41 is referred to as a second video, and split videos obtained by dividing the second video into frames per second are referred to as second split videos, and when an area ratio occupied by the second subject for each of the second split videos is referred to as a second area ratio, the UE 300 calculates a setting value of the first camera 41 that makes the second area ratio to be equal to or near the first area ratio in step S1321.

Further, as illustrated in FIG. 27, the UE 300 calculates a distance to space apart the first camera from the second subject using the calculated first area ratio (S1322). In step S1322, the UE 300 calculates a distance value between the drone 100 and the second subject 2, which makes the second area ratio to be equal to or near the first area ratio.

The UE 300 generates a first camera control signal and a first drone control signal using the setting value of the first camera 41 and the distance value between the drone 100 and the second subject 2 calculated by the UE 300 in this way (S140).

In step S1320, the UE 300 may compare first area ratios of each of the plurality of first split videos and hourly calculate a change amount in the first area ratio.

Referring to FIG. 28, when describing step S1320 in more detail, the UE 300 disposes the first split videos split into frames per second in chronological sequence (S13201).

The UE 300 calculates a ratio of pixels occupied by the first subject in the first split video corresponding to the first time (S13202), and calculates a ratio of pixels occupied by the first subject in the first split video corresponding to the second time (S13203). Thereafter, the UE 300 compares the first area ratio at the first time with the first area ratio at the second time (S13204) and calculates a change amount in a first area ratio of the first subject in which the first split video is included in the first video as a time has elapsed (S13205).

For example, as illustrated in FIG. 31, the UE 300 disposes the first split video (A #1) corresponding to the first frame to the first split video (A #10) corresponding to the 10th frame in chronological order (S13201), and calculates the first area ratio in the first split video A #1 corresponding to the first frame (S13202).

Referring to FIG. 31, in the first split video A #1 corresponding to the first frame, the first subject occupies 11 pixels of 49 pixels and thus S becomes 0.22.

The UE 300 calculates the first area ratio in the first split video A #10 corresponding to the 10th frame (S13203).

Referring to FIG. 31, in the first split video A #10 corresponding to the 10th frame, the first subject occupies 4 pixels of 49 pixels and thus S is becomes 0.08.

Thereafter, a difference between the first area ratio of 0.22 in the first frame and the first area ratio of 0.08 in the 10th frame is obtained (S13204), and by dividing the difference by a time difference between the first frame and the 10th frame, a change amount in which the first area ratio has changed is calculated (S13205).

Further, the UE 300 may determine whether zoom-in or zoom-out photographing of the first subject has been performed in the original video through step S13205. This process will be described in more detail with reference to FIG. 29.

Referring to FIG. 29, when the UE 300 derives a change amount in the first area ratio at a specific section (e.g., as illustrated in FIG. 31, a first section representing 1 second to 10 seconds of the first video) of the first video (S13205), the UE 300 determines whether a change amount in the first area ratio is greater than or equal to the first criterion or equal to or less than the second criterion (S13206).

If a change amount in the first area ratio is greater than or equal to the first criterion, when photographing an original video, the UE 300 determines that zoom-in photographing has been performed on the first subject in the corresponding section (S13207), and the first camera 41 calculates enlargement magnification required to photograph the second subject (S13208). Here, the first criterion may be set to a case where the first change amount is twice or more than an initial value, but such a setting may be changed by a user or a manager.

If a change amount in the first area ratio is less than or equal to the first criterion, when photographing the original video, the UE 300 determines that zoom-out photographing has been performed on the first subject in the corresponding section (S13207-1), and the first camera 41 calculates enlargement magnification required to photograph the second subject 2 (S13208-1). Here, the first criterion may be set to a case where the first change amount is ½ times or more, compared with the initial value, but such a setting may be changed by a user or a manager.

For example, as illustrated in FIG. 32(*a*), a specific section of the first video is set between a first frame A #1 and a third frame A #3, and when the UE 300 derives a change amount in the first area ratio between the first frame A #1 and the third frame A #3 (S13205), the processor 301 of the UE 300 may determine that a change amount in the first area ratio increased by 2 times from 0.22 to 0.44 (S13206). The processor 301 of the UE 300 determines that zoom-in photographing has been performed on the first subject in the corresponding section because the change amount in the first area ratio satisfied the first criterion (S13207) and calculates enlargement magnification of the first camera 41 required to photograph the second subject 2 (S13208).

A process in which the UE 300 determines that zoomed-out photographing has been performed in the original video is similar to that described above.

A method in which the UE 300 calculates a distance in which the drone 100 is to be offset from the second subject 2 will be described in more detail with reference to FIGS. 33 to 34.

Figure 33:
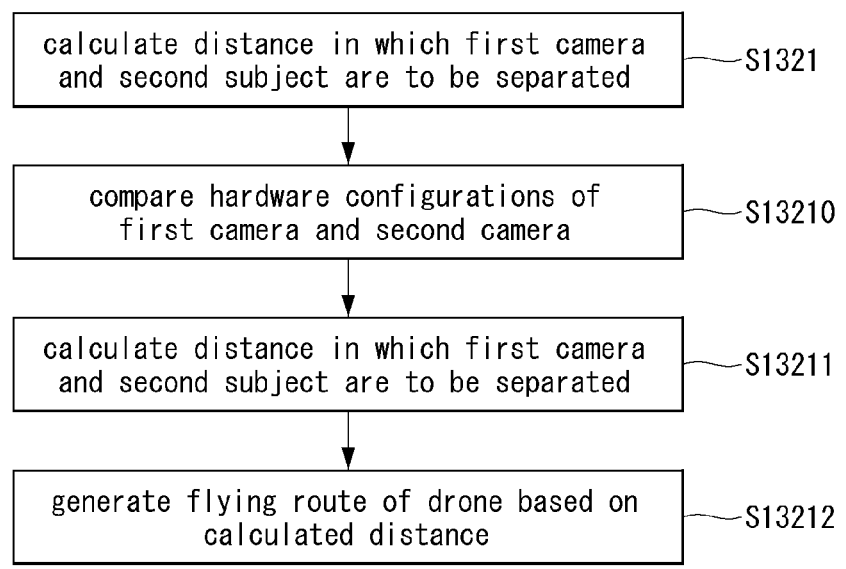
FIG. 33 is a flowchart illustrating a method in which a user equipment calculates a distance in which a drone and a second subject are to be separated according to an embodiment of the present disclosure.
Figure 34:
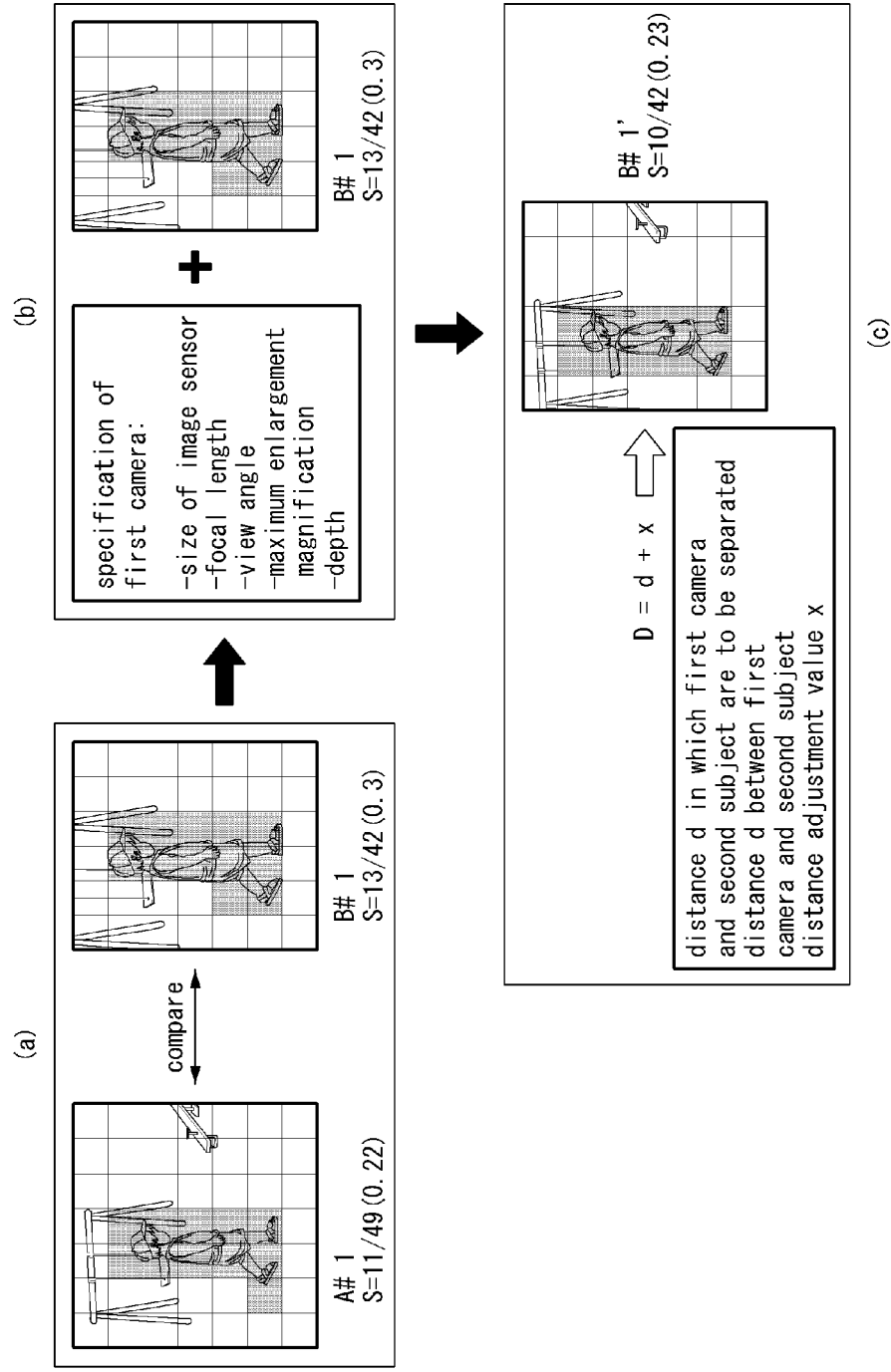
FIG. 34 is a conceptual diagram illustrating that a user equipment corrects a distance in which a drone and a second subject are to be separated according to an embodiment of the present disclosure.

FIG. 33 is a flowchart illustrating a method in which a UE calculates a distance in which a drone and a second subject are to be separated according to an embodiment of the present disclosure, and FIG. 34 is a conceptual diagram illustrating that a UE corrects a distance in which a drone and a second subject are to be separated according to an embodiment of the present disclosure.

Referring to FIG. 33, in step S1321, the UE 300 compares information about a hardware configuration of the first camera and information about a hardware configuration of the second camera (S13210). That is, the UE 300 compares types of image sensors included in the first and second cameras, sizes of the image sensor, the maximum resolutions, effective pixels, ISO, lens types, lens configurations, maximum and minimum aperture values, minimum photographing distances, used filters, exposure sensitivity, enlargement magnification, and focal lengths.

The UE 300 obtains information about the hardware configuration of the first camera through a search from storage thereof or the external server 200 or the web, and the information about the hardware configuration of the second camera may be obtained with the hardware configuration of the most similar model by searching for the external server 200 or the web based on first video analysis results.

Thereafter, the UE 300 determines that the first camera 41 may compensate for a portion in which the first camera 41 is insufficient in hardware compared to the second camera through distance adjustment to the second subject 2 and calculates a distance to be offset between the first camera 41 and the second subject 2 (S13211). For example, when the maximum resolution of the first camera 41 is 1024*768, and when the maximum resolution of the second camera is 1280*1024, the UE 300 may determine that it is necessary to photograph closer when the first camera 41 photographs the second subject 2 and calculate to reduce a distance between the first camera 41 and the second subject 2.

Thereafter, the UE 300 generates a flying route of the drone 100 based on the calculated distance (S13212).

Referring to FIG. 34, step S1321 will be described in more detail. First, it is assumed that the maximum resolution of the first camera 41 is 1024*768 and that the maximum resolution of the second camera is 1280*1024. Further, for convenience of description, it is assumed that the same second subject 2 has been photographed by the first camera and the second camera.

Referring to FIG. 34(*a*), both the first camera and the second camera are spaced apart by the same distance d from the second subject 2, and in this state, when the second subject 2 is photographed by the second camera, in the first frame A #1 of the first split videos, the second subject 2 is represented to occupy 11 pixels of 49 pixels. However, when the second subject 2 is photographed by the first camera, in the first frame B #1 of the second split videos, the second subject 2 is represented to occupy 13 pixels of 49 pixels.

In this case, in the reproduction video photographed by the first camera and the original video photographed by the second camera, area ratios occupied by the second subject 2 are different and thus the original video and the reproduction video give different feelings. Therefore, the UE 300 calculates an offset distance required between the first camera and the second subject 2 in order to overcome lack in a hardware performance of the first camera through distance adjustment with the second subject 2.

In this case, as illustrated in FIG. 34(*b*), the UE 300 calculates a distance D to be separated between the second subject 2 and the first camera with reference to the hardware specifications of the first camera. The distance D to be spaced apart is calculated by adding a distance correction value x to the distance d, and the UE 300 may calculate the distance correction value x in consideration of the hardware performance of the first camera.

Thereafter, as illustrated in FIG. 34(*c*), in a state in which the UE 300 is spaced apart from the second subject 2 by a distance D in which a calculated distance correction value x is added to the distance d, when the second subject 2 is photographed by the first camera 41, it can be seen that a first frame B #1' of the second split video in which the second subject 2 is photographed represents almost the same area ratio as that of the first frame A #1 of the first split videos (A #1=0.22, B #1=0.23).

As described above, even if a distance is calculated in which the first camera 41 and the drone 100 are to be offset from the second subject 2 in consideration of hardware specifications of the first camera 41 and the second camera, in some cases, it may be necessary to zoom-in or zoom-out and photograph the second subject 2.

Figure 35:
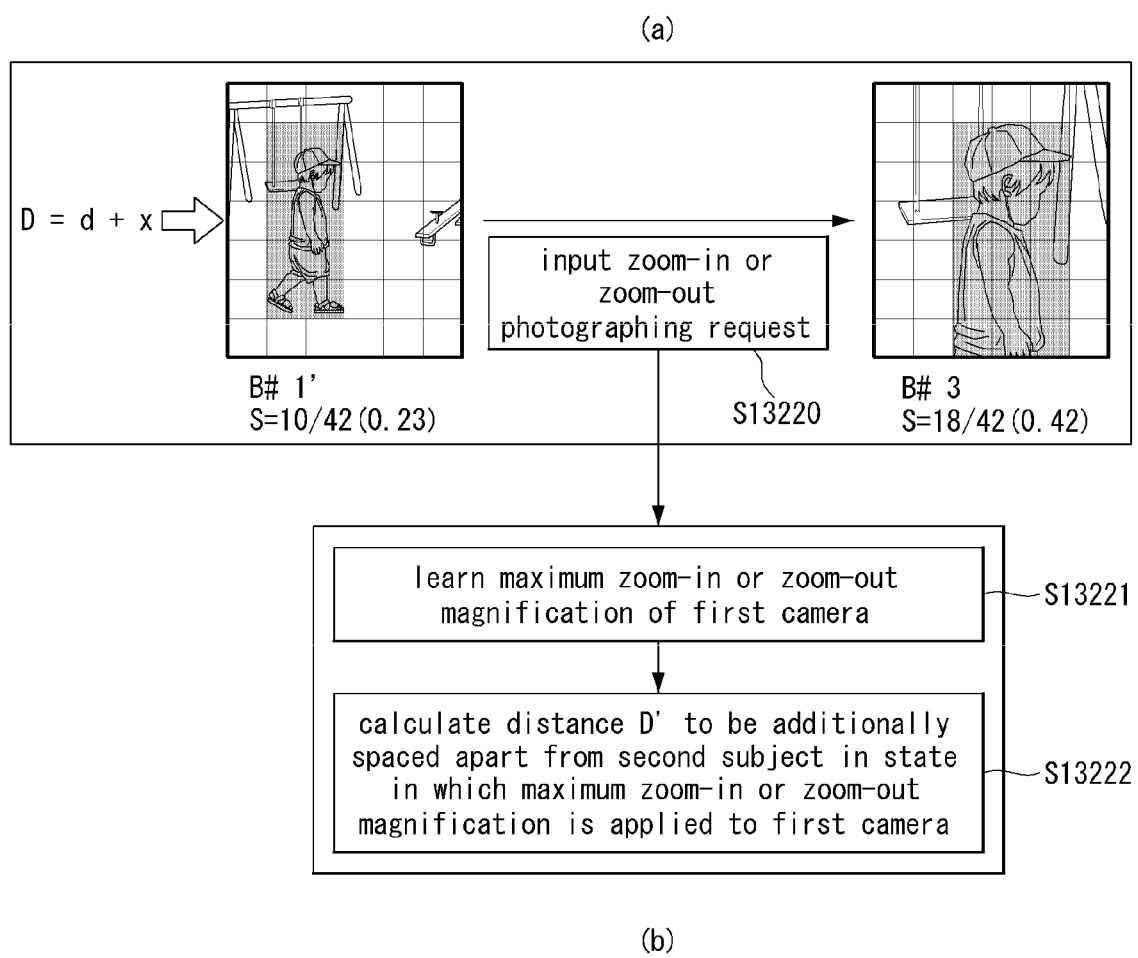
FIG. 35 is a diagram illustrating a method of calculating a distance in which a drone 100 is to be additionally offset from a second subject 2 when there is a zoom-in or zoom-out photographing request for the second subject 2.

This case will be described with reference to FIG. 35. FIG. 35 is a diagram illustrating a method of calculating a distance in which the drone 100 is to be additionally offset from the second subject 2 when there is a zoom-in or zoom-out photographing request for the second subject 2.

First, referring to FIG. 35(a), the UE 300 may review whether there is an additional zoom-in or additional zoom-out photographing request for the second subject 2 in step S1321. In this case, when the UE 300 determines that a zoom-in or zoom-out photographing request has been received (S13220), the UE 300 determines the maximum zoom-in or zoom-out magnification performance of the first camera (S13221), and calculates a distance D' to be additionally spaced apart from the second subject in a state in which the maximum zoom-in or zoom-out magnification is applied to the first camera (S13222).

Figure 36:
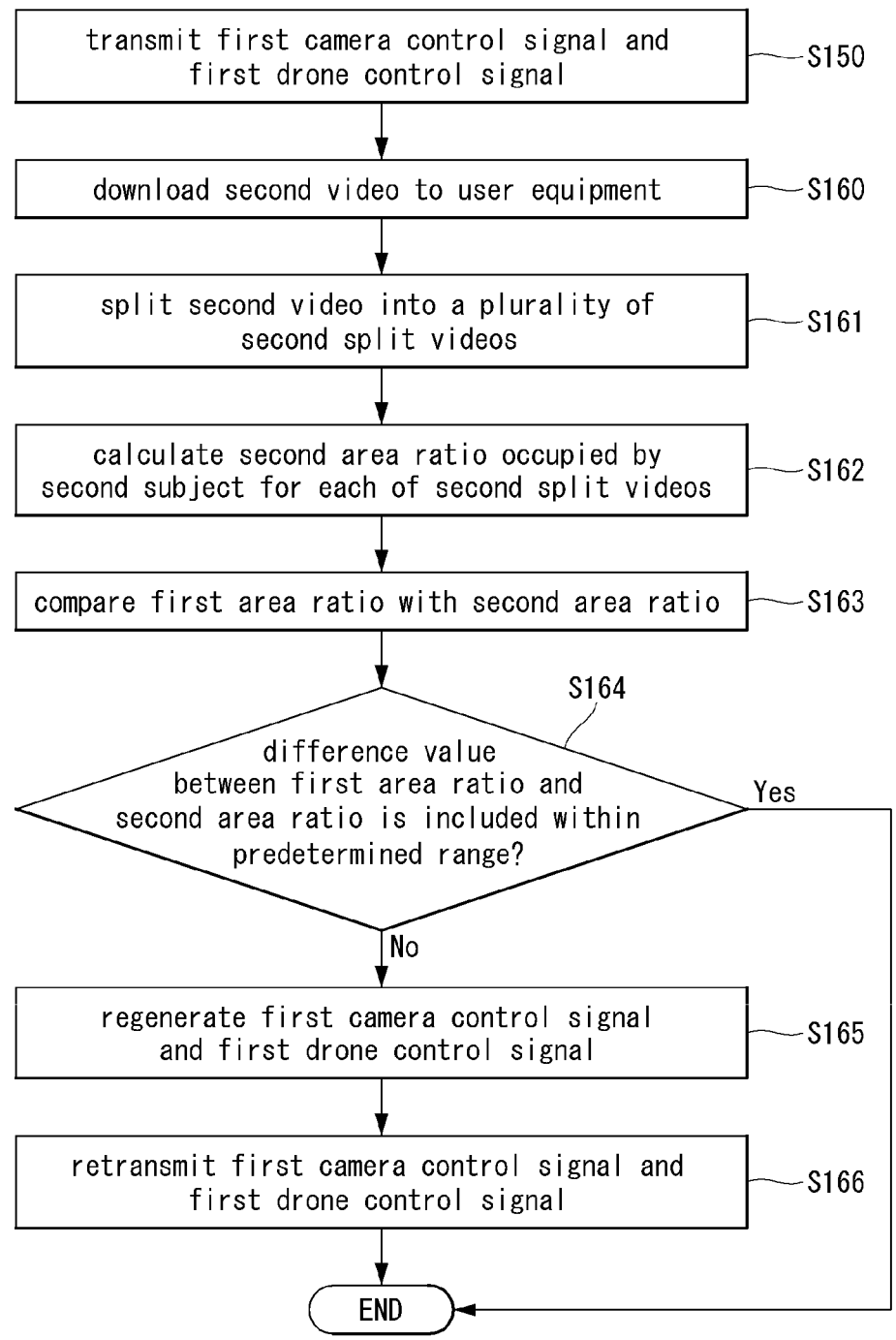
FIG. 36 is a flowchart illustrating a method in which a user equipment compares an original video with a photographed reproduction video to determine whether to re-photograph according to an embodiment of the present disclosure.

Referring to FIG. 36, after a reproduction video is photographed using the drone, when re-photographing is required, a method of controlling the drone will be described in detail. FIG. 36 is a flowchart illustrating a method in which a UE compares an original video with a photographed reproduction video to determine whether to re-photograph according to an embodiment of the present disclosure.

Referring to FIG. 36, after step S150, a second video in which the second subject 2 is photographed is downloaded from the drone 100 to the UE 300 (S160).

The UE 300 splits the second video into a plurality of second split videos in frames per second (S161), and calculates a second area ratio occupied by the second subject 2 for each of the second split videos (S162).

The UE 300 obtains a difference value between the first area ratio and the second area ratio to compare the first area ratio with the second area ratio (S163), and reviews whether a difference value between the first area ratio and the second area ratio is included within a predetermined range (S164). Here, the predetermined range may be set to 0.001 to 0.01. However, this range may be changed by a user or a manager. Hereinafter, for convenience of description, it is exemplified that a predetermined range is set to 0.001 to 0.01.

In step S164, when a difference value between the first area ratio and the second area ratio is not included within 0.001 to 0.01, the UE 300 regenerates the first camera control signal and the first drone control signal (S165) and retransmits the regenerated first drone control signal and first camera control signal to the drone 100 (S166) and thus the UE 300 enables the drone 100 to re-photograph the second subject 2.

In this way, the drone control method according to the present disclosure analyzes an original video and photographs a subject with enlargement magnification, depth, and illuminance identical to or similar to the original video to generate a reproduction video. Further, when analyzing the original video, the hardware specifications of a camera used for photographing the original video are analyzed and compared with hardware specifications of a camera used for photographing the reproduction video, and these comparison results are reflected to flight data of the drone to photograph the reproduction video and thus there is an advantage that the original video and the reproduction video differ only in the subject, and are photographed in almost the same composition.

Some embodiments or other embodiments of the present disclosure described above are not exclusive or distinct from each other. Some embodiments or other embodiments of the present disclosure described above may be together used or combined with each configuration or function.

For example, it means that a configuration A described in the specific embodiment and/or drawings and a configuration B described in other embodiments and/or drawings may be combined. That is, even if a combination between configurations is not directly described, it means that the combination is possible except for a case in which it is described that the combination is impossible.

The above detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

When using a UE, a system, and a drone control method according to the present disclosure, it is possible to automatically photograph a reproduction video giving a feeling identical to or similar to that of the original video.

DESCRIPTION OF SYMBOLS

100: drone
200: external server
300: UE

What is claimed is:

1. A user equipment for controlling a drone, the user equipment comprising:
 a first wireless communication unit; and
 a processor configured to control the drone in data communication with the drone through the first wireless communication unit,
 wherein the processor is configured to:
  analyze enlargement magnification and a view angle of a second camera used for photographing a first video, and a composition of a first subject included in the first video, when data on the first video are input to the user equipment,
  determine that zoom-in photographing has been performed on the first subject, when a change amount in a first area ratio is greater than or equal to a first criterion in a specific section of the first video,
  determine that zoom-out photographing has been performed on the first subject, when the change amount in the first area ratio is less than or equal to a second criterion in the specific section of the first video,
  provide a first camera control signal that controls a first camera in order to photograph a second subject with enlargement magnification, a view angle, and a composition identical to or similar to enlargement magnification, a view angle, and a composition used when the second camera photographs the first video,
  provide a first drone control signal that moves the drone to a location in which the drone can photograph the second subject by the first camera control signal, and
  transmit the first drone control signal and the first camera control signal to the drone through the first wireless communication unit.

2. The user equipment of claim 1, wherein the processor is configured to split the first video into a plurality of first split videos in frames per second and to calculate the first area ratio occupied by the first subject in each first split video.

3. The user equipment of claim 2, wherein the first drone control signal comprises a location control signal that adjusts a location of the drone so that the drone is offset by a predetermined distance from the second subject, and
wherein the first camera control signal comprises a photographing control signal that controls enlargement magnification, a view angle, depth, and illuminance of the first camera.

4. The user equipment of claim 1, wherein the processor is configured to provide a photographing control signal that zoom in or zoom out the first camera according to whether the zoom-in or zoom-out photographing is performed.

5. The user equipment of claim 1, wherein the processor is configured to:
perform artificial intelligence (AI) learning, and
learn enlargement magnification, a view angle, a focal length, depth, and illuminance of the second camera used for photographing the first video, a type and composition of a first subject included in the first video, and overall hardware specifications of the drone and the first camera by AI to provide the first drone control signal and the first camera control signal.

6. The user equipment of claim 1, further comprising a first memory configured to store information about the drone and data on the first video and the second video,
wherein the information about the drone comprises information about overall hardware specifications of the drone comprising a model name, a size, a distance between diagonal axes, a battery number and capacity, a weight, a maximum takeoff weight, a maximum payload, a hovering accuracy range, a maximum angular speed, a maximum pitch angle, a maximum ascending speed, a maximum descending speed, a maximum speed, a maximum practical ascending altitude limit, a maximum wind speed capable of resisting wind, a maximum flight time for each payload, a motor model name, a propeller model name, presence or absence of a landing gear, an operating temperature, a type and model name of a mounted sensor, a wireless signal reception distance, and a pixel, magnification, and a view angle of a mounted camera of the drone.

7. The user equipment of claim 1, further comprising a first location data processor capable of processing data on a location of the user equipment, a location of the second subject, and a location of the drone,
wherein the processor is configured to provide a second drone control signal that controls the drone to move to correspond to a movement direction and speed of the second subject when the second subject moves.

8. The user equipment of claim 1, wherein the first wireless communication unit is configured to:
communicate with at least two access points located around the drone and the user equipment using an IEEE 802.11mc protocol, and
provide location data of the user equipment and the drone by performing triangulation of the at least two access points with a round trip time (RTT) method.

9. The user equipment of claim 1, wherein the data on the first video are stored in at least one of an external server, a web-based server, a cloud server, and storage of the user equipment.

10. A system for controlling a drone, the system comprising:
a drone in which a first camera is mounted; and
a first user equipment capable of performing data communication with the drone and controlling a movement of the drone,
wherein the first user equipment is configured to:
analyze enlargement magnification and a view angle of a second camera used for production of the first video, and a composition of a first subject included in the first video, when data on a first video are input to the user equipment,
determine that zoom-in photographing has been performed on the first subject, when a change amount in a first area ratio is greater than or equal to a first criterion in a specific section of the first video,
determine that zoom-out photographing has been performed on the first subject, when the change amount in the first area ratio is less than or equal to a second criterion in the specific section of the first video,
provide a first camera control signal that controls the first camera to photograph a second subject with enlargement magnification, a view angle, and a composition of the second camera and to provide a second video, and
provide a first drone control signal that controls a movement of the drone so that the drone is offset by a predetermined distance from the second subject.

11. The system of claim 10, wherein the first user equipment splits the first video and the second video into a plurality of first split videos and second split videos, respectively, calculates the first area ratio occupied by the first subject for each first split video, and calculates a second area ratio occupied by the second subject for each second split video.

12. The system of claim 10, wherein the first user equipment transmits the first drone control signal and the first camera control signal to the drone to control a movement of the drone and photographing of the first camera.

13. The system of claim 10, wherein the first user equipment comprises an AI module capable of performing AI learning.

14. The system of claim 10, wherein the drone photographs while tracking the second subject.

15. The system of claim 10, wherein the first user equipment provides a photographing control signal such that the first camera is zoomed in or out according to whether the zoom-in photographing or the zoom-out photographing has been performed.

16. The system of claim 10, further comprising at least one access point that can be wirelessly connected to each of the drone and the first user equipment,
wherein the drone, the first user equipment, and the access point communicate with each other with an IEEE 802.11mc protocol.

17. A method of controlling a drone, performed by a processor, the method comprising:
downloading a first video to a user equipment;
analyzing enlargement magnification, a view angle, depth, and illuminance of a second camera used for photographing the first video, and a composition of the first subject included in the first video;
generating a first camera control signal that controls a first camera in order to photograph a second subject with enlargement magnification, a view angle, depth, and illuminance identical to or similar to enlargement magnification, a view angle, depth, and illuminance used when the second camera photographs the first video;
determining that zoom-in photographing has been performed on the first subject, when a change amount in a first area ratio is greater than or equal to a first criterion in a specific section of the first video;

determining that zoom-out photographing has been performed on the first subject, when the change amount in the first area ratio is less than or equal to a second criterion in the specific section of the first video;

generating a first drone control signal for moving the drone to a location capable of photographing the second subject by the first camera control signal; and transmitting the first drone control signal and the first camera control signal to the drone, wherein the first camera is a camera mounted in the drone.

18. The method of claim 17, wherein the analyzing of enlargement magnification comprises:

dividing the first video into a plurality of first split videos in frames per second; and calculating the first area ratio occupied by the first subject in each of the first split videos.

* * * * *